US008392997B2

(12) United States Patent
Chen et al.

(10) Patent No.: US 8,392,997 B2
(45) Date of Patent: Mar. 5, 2013

(54) VALUE-ADAPTIVE SECURITY THREAT MODELING AND VULNERABILITY RANKING

(75) Inventors: Yue Chen, Mountain View, CA (US); Barry W. Boehm, Santa Monica, CA (US); Luke Sheppard, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 1109 days.

(21) Appl. No.: 12/047,293

(22) Filed: Mar. 12, 2008

(65) Prior Publication Data

US 2009/0077666 A1 Mar. 19, 2009

Related U.S. Application Data

(60) Provisional application No. 60/894,431, filed on Mar. 12, 2007.

(51) Int. Cl.
 *G06F 11/00* (2006.01)
 *G06F 15/177* (2006.01)
(52) U.S. Cl. .......................................... 726/25; 709/224
(58) Field of Classification Search ...................... 726/25
 See application file for complete search history.

(56) References Cited

U.S. PATENT DOCUMENTS

| | | | | |
|---|---|---|---|---|
| 7,096,502 | B1* | 8/2006 | Fox et al. | 726/25 |
| 7,530,104 | B1* | 5/2009 | Thrower et al. | 726/22 |
| 7,552,480 | B1* | 6/2009 | Voss | 726/25 |
| 7,904,962 | B1* | 3/2011 | Jajodia et al. | 726/25 |
| 2005/0193430 | A1* | 9/2005 | Cohen et al. | 726/25 |
| 2005/0240999 | A1* | 10/2005 | Rubin et al. | 726/22 |
| 2006/0021048 | A1* | 1/2006 | Cook et al. | 726/25 |
| 2006/0021050 | A1* | 1/2006 | Cook et al. | 726/25 |
| 2006/0085858 | A1* | 4/2006 | Noel et al. | 726/25 |
| 2010/0192226 | A1* | 7/2010 | Noel et al. | 726/23 |

OTHER PUBLICATIONS

Bodin, L.D., et al., "Evaluating Information Security Investments Using the Analytic Hierarchy Process," *Communications of the ACM*, 48(2):79-83, Feb. 2005.

Boehm, B.W., "A Spiral Model of Software Development and Enhancement," *Computer*, 21(5):61-72, May 1988.

Boehm, B.W., et al., "An Initial Theory of Value-Based Software Engineering," *Value-Based Software Engineering*, Springer Berlin Heidelberg, 30 pages, Feb. 2005.

Boehm, B.W., et al., "Using the Incremental Commitment Model to Integrate System Acquisition, Systems Engineering, and Software Engineering," *Crosstalk*, 13 pages, Oct. 2007.

Boehm, B.W., *Software Engineering Economics*, Prentice Hall PTR, pp. 223-242, (1981).

Butler, S.A., "Security Attribute Evaluation Method: A Cost-Benefit Approach," *Proceedings-International Conference on Software Engineering*, 24th International Conference on Software Engineering (ICSE '02), Orlando FL, pp. 232-240, May 2002.

Chen, Y., et al., "Measuring Security Investment Benefit for COTS Based Systems—A Stakeholder Value Driven Approach," *29th Int. Conference on Software Engineering*, 10 pages, May 2007.

(Continued)

*Primary Examiner* — Nathan Flynn
*Assistant Examiner* — Abdullah Almamun
(74) *Attorney, Agent, or Firm* — Fish & Richardson P.C.

(57) ABSTRACT

Among others, techniques and systems are disclosed for analyzing security threats associated with software and computer vulnerabilities. Stakeholder values relevant for a software system are identified. The identified stakeholder values are quantified using a quantitative decision making approach to prioritize vulnerabilities of the software system. A structured attack graph is generated to include the quantified stakeholder values to define a scalable framework to evaluate attack scenarios. The structured attack graph includes two or more nodes. Based on the generated structured attack graph, structured attack paths are identified with each attack path representing each attack scenario.

25 Claims, 53 Drawing Sheets

OTHER PUBLICATIONS

Chen, Y., et al., "Measuring Security Investment Benefit for Off The Shelf Systems—A Stakeholder Value Driven Approach," *The 2007 Workshop on the Economics of Information Security (WEIS 2007)*, 18 pages, Jun. 2007.

Chen, Y., et al., "Stakeholder Value Driven Threat Modeling for Off The Shelf Based Systems," *29th International Conference on Software Engineering (ICSE Companion)*, pp. 91-92, May 2007.

Chen, Y., et al., "Value Driven Security Threat Modeling Based on Attack Path Analysis," *40th Annual Hawaii International Conference on System Sciences (HICSS)*, 9 pages, Jan. 2007.

ISO/IEC 15288:2002, Systems Engineering—System Life Cycle Processes, 70 pages, (2002).

Royce, W., "Managing the Development of Large Software Systems," *IEEE Proceedings WESCON*, pp. 328-338, Aug. 1970.

Schneier, B., "Attack Trees: Modeling Security Threats," *Dr. Dobb's Journal*, pp. 21-29, Dec. 1999.

\* cited by examiner

| | |
|---|---|
| Algorithm: | *List EnumerateAttackPath* (Structured_Attack_Graph *G*) |
| Return: | The complete set of *Structured Attack Paths* associated with G |
| 1: | list *attackPathList*; |
| 2: | StructuredAttackPath *p*; |
| 3: | for(each *sv* in *G.Vs*) { //*s* stands for stakeholder value |
| 4: | // find the associated host to this value |
| 5: | generate *es1*:=subset of *G.Ehs* where e1.s==sv, for ∀ *e1* ∈ *es1*; |
| 6: | for (each *ehs* in *es1*) { |
| 7: | // find the COTS associated with this host |
| 8: | generate *es2*:=subset of *G.Ech* where e2.h==ehs.h for ∀ *e2* ∈ *es2*; |
| 9: | for (each *ech* in *es2*) { |
| 10: | // find vulnerability that affect the COTS software |
| 11: | generate *es3*:=subset of *G.Evc* where e3.c == ech.c |
| | for ∀ *e3* ∈ *es3*; |
| 12: | for(each *evc* in *es3*) { |
| 13: | // Find attackers have privilege/access to the vulnerability |
| 14: | generate *es4*:=subset of *G.Eav* where e4.v == evc.v |
| | for ∀ *e4* ∈ *es4*; |
| 15: | for(each *eav* in *es4*) { |
| 16: | *p* ← <eav.a, evc.v, ech.c, ehs.h, sv>; |
| 17: | append *p* to *attackPathList*; |
| 18: | }}}}} |
| 19: | return *attackPathList*; |

FIG. 6

| | | | |
|---|---|---|---|
| 802 | S.VN | Affected stakeholder value. Clearly, $S \in G.Vs$; | 800 |
| 804 | S.IW | Level of importance of the stakeholder value S.VN in terms of a ratings value between 0 and 1. Details of obtaining the weight is presented in Section 4.4 | |
| 806 | H.HN | Affected host in the IT infrastructure. Clearly, $H \in G.Vh$; | |
| 808 | H.AA | The estimated motivation of attacker P.A to attack host P.H terms of a ratings value between 0 and 1. Details of obtaining the weight is presented in Section 3.5 | |
| 810 | C.AP | If automated patching service is provided by vendor | |
| 812 | V.VN | The Common Vulnerability Name (CVE) of the vulnerability that involved in this attack path [NIST]. Clearly, $V \in G.Vv$; | |
| 814 | V.TI | The impact of the vulnerability V can cause on victim host H in terms of confidentiality, integrity, and availability [NIST] | |
| 816 | V.AC | Specifies if the associated vulnerability requires victim activities to enable such an attack, for example, opening an email attachment [NIST]; | |
| 818 | V.ER | Specifies if the vulnerability associated with the attacking path can be exploited remotely or locally [NIST]; | |
| 820 | V.AN | Specifies if the associated vulnerability requires valid user account on the victim computer [NIST]; | |
| 822 | V.TFA | Specifies if the fixes of the associated vulnerability are publicly available in terms of Patch, Advisory, or None [NIST]; | |
| 824 | V.GP | How popular the vulnerability is exploited in a general sense, for example, if listed as top 20 by authority organizations such as SANS. | |
| 826 | V.NP | The network port(s) that the vulnerability uses, if there is any; | |

FIG. 8a

| | | |
|---|---|---|
| V.TS | The level of compromise to the victim host if exploited in terms of None, Partially, or Completely to confidentiality, integrity, or availability [NIST]; | |
| A.TN | The type of potential attackers, for example, insiders, hackers from internet, etc. | |
| A.AL | The level of authentication that the attackers of A.TN have on host H. | |
| A.R | If the attackers of A.TN have Local or Remote access to host H. | |
| A.SL | The estimated skill level of the attacker in terms of Low, Medium, High | |
| A.GS | The group size of this type of possible attackers | |
| A.MT | The level of motivation of this type of attackers | |

FIG. 8b

| Plan | Practice | Cost |
|---|---|---|
| 1 | Apply software patch and work around (manually) | $250 per patch |
| 2 | Deploy and configure a firewall segment | $6,884 |
| 3 | Tighten user account control (might affect other systems) | $750 |

FIG. 10

| Weight | Criteria | Stakeholders | | | Organizational Value Description |
|---|---|---|---|---|---|
| | | S1* | S2* | S3* | |
| 0.095 | 1. Productivity | + | + | ++ | Help faculties, students and staff create, acquire, and disseminate knowledge. |
| 0.738 | 2. Regulation | | + | ++ | Comply with applicable federal, state, and local laws |
| 0.167 | 3. Privacy | | | | Protect the privacy of software, files, and materials stored on or transmitted by university computer equipment |
| 0.648 | a. Student | + | | ++ | |
| 0.230 | b. Faculty | | ++ | ++ | |
| 0.122 | c. Staff | | | ++ | |

FIG. 11

| | Productivity | Regulation | Privacy | Weight |
|---|---|---|---|---|
| Productivity | 1 | 1/7 | 1/2 | 0.095 |
| Regulation | 7 | 1 | 6 | 0.738 |
| Privacy | 2 | 0.2 | 1 | 0.167 |

FIG. 12

| Weight Criteria | Confidentiality | Server X Integrity | Availability |
|---|---|---|---|
| *0.095* 1. Productivity | 0.12 | 0.65 | 0.23 |
| *0.738* 2. Regulation | 0.63 | 0.26 | 0.11 |
| *0.167* 3. Privacy | | | |
| *0.648* a. Student | 0.78 | 0.16 | 0.07 |
| *0.230* b. Faculty | 0.54 | 0.30 | 0.16 |
| *0.122* c. Staff | 0.60 | 0.20 | 0.20 |
| Evaluation Score | 0.593 | 0.287 | 0.121 |

FIG. 13

|     | AG1 | AG2 | AG3 | Weight |
|-----|-----|-----|-----|--------|
| AG1 | 1   | 1/9 | 1/3 | 0.07   |
| AG2 | 9   | 1   | 7   | 0.78   |
| AG3 | 3   | 1/7 | 1   | 0.15   |

FIG. 14

|      | Description | AG1  | AG2  | AG3  |
|------|-------------|------|------|------|
| A.GS | Group Size  | 0.07 | 0.78 | 0.16 |
| A.SL | Skill Level | 0.63 | 0.26 | 0.11 |
| A.MT | Motivation  | 0.72 | 0.22 | 0.06 |

FIG. 15

|      | Description | AG1  | AG2  | AG3  |
|------|-------------|------|------|------|
| A.GS | Group Size  | 0.07 | 0.78 | 0.16 |
| A.SL | Skill Level | 0.63 | 0.26 | 0.11 |
| A.MT | Motivation  | 0.72 | 0.22 | 0.06 |

FIG. 16

| Attribute (1710) | Rating (1720) | Rating value (1730) |
|---|---|---|
| V.ER<br>Exploit Range<br>(Access Vector) * | Remote | 1.0 |
| | Local | 0.7 |
| V.TFA<br>Type of Fix Available<br>(Remediation Level) * | Official Fix | 0.85 |
| | Temporal Fix | 0.9 |
| | Work around | 0.95 |
| | None | 1.0 |
| V.AN<br>Authentication Needed<br>(Authentication) * | Required | 0.6 |
| | Not Required | 1.0 |
| V.GP<br>Vuln. General Popularity | Listed as Top | 1.0 |
| | Not Listed as Top | 0.8 |
| H.AA<br>Attractiveness of Asset Computer | Attractive | 1.0 |
| | Neutral | 0.8 |
| | Not Attractive | 0.7 |

FIG. 17

| |
|---|
| Algorithm: *Void FastCalculateThreatKey*(Structured_Attack_Graph *G*) |
| Return: A updated *Structured Attack Graph G* wherein the *ThreatKey* of Each Node calculated |
| 1:     for(each $v$ in $G.Va \cup G.Vv \cup G.Vc \cup G.Vh \cup G.Vs$) { //multiply the severity drivers of each vertices together as the initial severity weight |
| 2:         $v.initialThreatKey = \prod v.Attribute_i$; |
| 3:     } |
| 4:     for(each v in G.Va) { |
| 5:         *CalculateBottomUpWeight*(G, v); |
| 6:     } |
| 7:     for(each v in G.Vs) { |
| 8:         *CalculateTopDownWeight*(G, v); |
| 9:     } |
| 10:    for(each $v$ in $G.Va \cup G.Vv \cup G.Vc \cup G.Vh \cup G.Vs$) { //multiply the severity drivers of each vertices together as the initial severity weight |
| 11:        $v.threatKey = v.bottomUpThreatKey * v.topDownThreatKey / v.initialThreatKey$; |
| 12:    } |
| 13:    return; |

FIG. 19

| Algorithm: float *CalculateBottomUpWeight* (Structured_Attack_Graph *G*, *Vertice v*) |
|---|
| Return: A updated *Structured Attack Graph G* with temp results toward getting ThreakKey |
| 1:   *v.bottomUpThreatKey* = 0; |
| 2:   if ($v \in$ *G. Vs*) {         //reach the top layer, the values in the graph |
| 3:         return *v.initialThreatKey*; |
| 4:   } else { |
| 6:         for(each *v'* where *v'* (is in the adjacent upper layer of *v*) and |
|                       (*v* is associated with *v'*) ) { |
| 7:               *v.bottomUpThreatKey* += *v.initialThreatKey* * *CalculateBottomUpWeight(G, v')*; |
| 8:         } |
| 9:         return *v.bottomUpThreatKey*; |
| 10: } |

FIG. 20

| Algorithm: float *CalculateTopDownWeight* (Structured_Attack_Graph *G*, *Vertice v*) |
|---|
| Return: A updated *Structured Attack Graph G* with temp results toward getting ThreakKey |
| 1:   *v.topDownThreatKey* = 0; |
| 2:   if ($v \in$ *G. Va*) {         //reach the bottom layer, the attackers in the graph |
| 3:         return *v.initialThreatKey*; |
| 4:   } else { |
| 6:         for(each *v'* where *v'* (is in the adjacent lower layer of *v*) and |
|                       (*v* is associated with *v'*) ) { |
| 7:               *v.topDownThreatKey* += *v.initialThreatKey* * *CalculateTopDownWeight(G, v')*; |
| 8:         } |
| 9:         return *v.topDownThreatKey*; |
| 10: } |

FIG. 21

Vulnerability Management

Load Vulnerability XML DB | Test

Sort by CVE Name
Sort by Discover Date
Sort by NVD Metrics

Vulnerability Information

| GainAccess | AvailabilityImpact | AccessVector | Patchable | Range | Port | CVE_Name | AccessComp |
|---|---|---|---|---|---|---|---|
| | | | | | | | |
| Admin; | C | R | PIA | R | 635/udp; | CVE-1999-0001 | L |
| Admin; | C | R | PIA | R | 0/udp;0/tcp; | CVE-1999-0002 | L |
| | C | R | A | R | | CVE-1999-0003 | L |
| Admin;User | C | R | PIA | R | 143/tcp; | CVE-1999-0004 | L |
| Admin | N | R | PIA | R | 110/tcp; | CVE-1999-0005 | L |
| | C | R | PIA | R | 143/tcp; | CVE-1999-0006 | L |
| Admin;User | C | R | PIA | R | | CVE-1999-0007 | L |
| Admin | C | R | PIA | R | 53/udp; | CVE-1999-0008 | L |
| | C | R | PIA | R | 143/tcp; | CVE-1999-0009 | L |
| | | | | | | CVE-1999-0010 | L |

FIG. 22

| Host | COTS Name | Version | Vendor |
|---|---|---|---|
| Server X | Solaris | 9.0 | SUN |
| | Directory Server | 5.2.x | SUN |
| | Oracle9i DBMS | 9.2.0.4 | Oracle |
| | Oracle9i Client | 9.2.0.2 | Oracle |

| Attack Path Attributes | Properties | Security Investment Plans | | | | | |
|---|---|---|---|---|---|---|---|
| | | Firewall | Patch | User Ctrl. | Data Encryption | Backup Server | Digital Signature |
| V.TFA | Official Fix | | 80% | | | | |
| | Temporal Fix | | 10% | | | | |
| | Work around | | 10% | | | | |
| | None | | | | | | |
| V.AN | Required | | | 100% | | | |
| V.TI | Confidentiality | | | | 95% | | |
| | Integrity | | | | | | 100% |
| | Availability | | | | | 80% | |
| AG1 | - | | 90% | 10% | | | |
| AG2 | - | | 90% | 90% | | | |
| AG3 | - | | | 100% | | | |

FIG. 25

| Weight | Criteria | Stakeholders | | | Organizational Value Description |
|---|---|---|---|---|---|
| | | S1* | S2* | S3* | |
| 0.767 | 1. Provide the student parents easy access to their children's academic progress information | + | ++ | ++ | Help students and their parents understand where students stand vis-à-vis LAUSD graduation requirements, and allow them to realistically assess whether or not they are in the running for admission to specific sets of colleges |
| 0.085 | 2. Regulation | | | ++ | Comply with the student academic records regulations required by the city of Los Angeles |
| 0.148 | 3. Privacy | | + | | Protect the student privacy mainly on academic progress |

(3510 = Weight/Criteria; 3520 = Stakeholders; 3530 = Organizational Value Description)

FIG. 35

| Weight | Criteria | MASH Server | | |
|---|---|---|---|---|
| | | Confidentiality (3620) | Integrity (3630) | Availability (3640) |
| 0.767 | Criteria 1 in Table 12 | 0.058 | 0.595 | 0.347 |
| 0.085 | Criteria 2 in Table 12 | 0.732 | 0.216 | 0.061 |
| 0.148 | Criteria 3 in Table 12 | 0.474 | 0.474 | 0.053 |
| | Evaluation Score | 0.192 | 0.529 | 0.279 |

(3610 header; 3650 Evaluation Score row)

FIG. 36

| Host | COTS Name | Version | Vendor |
|---|---|---|---|
| MASH Server | IIS | 6.0 | Microsoft |
| | SQL Server 2000 | SP3 | Microsoft |
| | ASP .Net | 1.1 SP1 | Microsoft |
| | Windows Server 2003 | SP1 | Microsoft |

FIG. 37

| Weight | Criteria | Stakeholders | | | Organizational Value Description |
|---|---|---|---|---|---|
| | | S1* | S2* | S3* | |
| 0.723 | 1. Productivity | ++ | ++ | + | Support the on-going research and teaching activities at the Center |
| 0.061 | 2. Privacy | | + | | The graduate students may have some grading information posted on the server, but it is not a major concern since SSN is not used at USC for course purposes any more. |
| 0.216 | 3. Reputation | ++ | | | If the Greenbay server get compromised, there may be significant impacts on the CSSE reputation because of the large number of users to the system from different sectors |

FIG. 39

| Weight | Criteria | Greenbay Server | | |
|---|---|---|---|---|
| | | Confidentiality | Integrity | Availability |
| 0.723 | Criteria 1 in Table 15 | 0.055 | 0.545 | 0.400 |
| 0.061 | Criteria 2 in Table 15 | 0.819 | 0.091 | 0.091 |
| 0.216 | Criteria 3 in Table 15 | 0.058 | 0.596 | 0.347 |
| | Evaluation Score | 0.103 | 0.528 | 0.370 |

FIG. 40

| Host | COTS Name | Version | Vendor |
|---|---|---|---|
| | PHP | 5.0.4 | PHP |
| | Apache | 2.0.54 | Apache |
| Greenbay | Tomcat | 5.0.19 | Apache |
| | Fedora | Core 3 | Redhat |
| | MySQL Server | 4.1.12 | MySQL |

FIG. 41

|  | ServerX Case Study (Total Comparisons 28) | | MASH Case Study (Total Comparisons 36) | | GreenBay Case Study (Total Comparisons 66) | |
|---|---|---|---|---|---|---|
|  | # of Clashes | Inaccuracy | # of Clashes | Inaccuracy | # of Clashes | Inaccuracy |
| T-MAP | 2 | 7.1% | 4 | 11.1% | 7 | 10.6% |
| CVSS v2.0 | 5 | 17.9% | 9 | 25% | 27 | 40.9% |
| CVSS v1.0 | 6 | 21.4% | 12 | 33.3% | 22 | 33.3% |
| IBM ISS | 9 | 32.1% | 17 | 47.2% | 46 | 69.7% |
| Microsoft | N/A | N/A | 21 | 58.3% | N/A | N/A |

FIG. 46

| Case study | Number of Years of Security Experience | Number of Years of in the organization | Professional Certification |
|---|---|---|---|
| ITS Server X | 11 | 7 | CISSP |
| MASH Server | 18 | 18 | None |
| GreenBay Server | 6 | 6 | CISSP |

FIG. 48

| Software/System Life-cycle models | T-MAP Capabilities | | |
|---|---|---|---|
| | Vulnerability Prioritization (4910) | COTS Evaluation and Selection (4920) | Effectiveness Estimation of Security Practices (4930) |
| Inception | | (1) Determine the feasible level of security that available COTS can achieve; (2) Evaluate the security performance of COTS candidates based on cost-effectiveness analysis from security perspective | (1) Determine the feasible range of the improvement that common security practices can make; (2) Determine strategy to assure system security; (3) compare and select security protection plans based on cost-effectiveness analysis |
| Elaboration | | Incorporate security considerations in COTS selection; design system security protection mechanisms | |
| Construction | Identify COTS vulnerabilities in a prioritized order and help to decide which ones to fix first | | |
| Transition | Identify high priority COTS vulnerabilities and apply necessary patches | | |
| Maintenance | Monitor COTS vulnerability updates and help to decide which ones to fix first | | (1) Re-evaluate and select the most effective security practices dynamically; (2) re-adjust security protection plans dynamically; (3) determine the high-payoff of security investment |

FIG. 49

| Software/System Life-cycle models | T-MAP Capabilities |||
|---|---|---|---|
| | Vulnerability Prioritization (5010) | COTS Evaluation and Selection (5020) | Effectiveness Estimation of Security Practices (5030) |
| Conceptualization | | (1) Determine the feasible level of security that available COTS can achieve; (2) Evaluate the security performance of COTS candidates based on cost-effectiveness analysis from security perspective | (1) Determine the feasible range of the improvement that common security practices can make; (2) Determine strategy to assure system security; (3) compare and select security protection plans based on cost-effectiveness analysis |
| Development | Identify COTS vulnerabilities in a prioritized order and help to decide which ones to fix first | Incorporate security considerations in COTS selection; design system security protection mechanisms | |
| Operation, Test & Evaluation | | Evaluate the system security risks that caused by COTS vulnerabilities | |
| Transition to Operation | Identify high priority COTS vulnerabilities and apply necessary patches | | |
| Operation, Maintenance | Monitor COTS vulnerability updates and help to decide which ones to fix first | | (1) Re-evaluate and select the most effective security practices dynamically; (2) re-adjust security protection plans dynamically; (3) determine the high-payoff of security investment dynamically |
| Replace or dismantle | | Evaluate the system security risks that caused by COTS vulnerabilities and make replacement/dismantle decisions | |

FIG. 50

| Software/System Life-cycle models | T-MAP Capabilities ||| 
|---|---|---|---|
| | Vulnerability Prioritization (5110) | COTS Evaluation and Selection (5120) | Effectiveness Estimation of Security Practices (5130) |
| Requirement | | (1) Determine the feasible level of security that available COTS can achieve; (2) perform relevant tradeoff/feasibility analysis; | |
| Design | | Incorporate security considerations in COTS selection; design system security protection mechanisms | Choose security protection design that has best cost-effectiveness |
| Construction | | | |
| Integration | Identify COTS vulnerabilities in a prioritized order and help to decide which ones to fix first | | |
| Testing | Help to decide the priority order to test COTS vulnerabilities and patches | | |
| Installation | Help to decide the priority order to install COTS vulnerabilities patches | | |
| Maintenance | Monitor COTS vulnerability updates and help to decide which ones to fix first | | (1)Re-evaluate and select the most effective security practices dynamically; (2)re-adjust security protection plans dynamically; (3) determine the high-payoff of security investment |

FIG. 51

| Software/System Life-cycle models | T-MAP Capabilities | | |
|---|---|---|---|
| | Vulnerability Prioritization (5210) | COTS Evaluation and Selection (5220) | Effectiveness Estimation of Security Practices (5230) |
| Exploration | | Determine the feasible level of security that available COTS can achieve | Determine the feasible range of the improvement that common security practices can make |
| Valuation | | Evaluate the security performance of COTS candidates based on cost-effectiveness analysis from security perspective | (1) Determine strategy to assure system security; (2) compare and select security protection plans based on cost-effectiveness analysis |
| Architecting | | Incorporate security considerations in COTS selection; design system security protection mechanisms | Design detailed security protection plan based on cost-effectiveness analysis |
| Development1 Arch.2 | Identify COTS vulnerabilities in a prioritized order and help to decide which ones to fix first | | |
| Operation1 Dev.2 Arch. 3 | Monitor COTS vulnerability updates and help to decide which ones to fix first | | (1) Re-evaluate and select the most effective security practices dynamically; (2) re-adjust security protection plans dynamically; (3) determine the high-payoff of security investment |

FIG. 52

Algorithm 5 *RuleSet generateOptimalRuleSet(Structured_Attack_Graph G,*
  *Integer maxNumberOfRules,*
  *RuleSet originalIdealRuleSet)*

Return: The *optimalRuleSet*. (after running the algorithm, it has the minimal *ThreatKey* value and have less than *maxNumberOfRules* rules)

1: RuleSet *optimalRuleSet*;
2: FastCalculateThreatKey(G); //Algorithm 2 as specified in Chapter 4;
3: if (the number of rules in the *originalIdealRuleSet* is less than *maxNumberOfRules*)
4:   return *originalIdealRuleSet*; //The number of rules meets the requirement.
5: QuickSort(The blocked regions for the *originalIdealRuleSet* by *ThreatKey* value);
    //Complexity: O[n*lg(n)]
6: //Greedy method
7: *optimalRuleSet* = *originalIdealRuleSet*;
8: while (number of rules in the *optimalRuleSet* > *maxNumberOfRules*) {
9:   merge the two adjacent rules in the *optimalRuleSet* that have the least
     *ThreatKey* value of the interim blocked region;
10: }
11: return *optimalRuleSet*;

FIG. 57

VALUE-ADAPTIVE SECURITY THREAT MODELING AND VULNERABILITY RANKING

CLAIM OF PRIORITY

This application claims priority under 35 USC §119(e) to U.S. Patent Application Ser. No. 60/894,431, filed on Mar. 12, 2007, the entire contents of which are hereby incorporated by reference.

FEDERALLY SPONSORED RESEARCH OR DEVELOPMENT

This invention was made with government support under Contract No. CCF0438931 awarded by the National Science Foundation. The government has certain rights in the invention.

BACKGROUND

This application relates to information systems, computers and software. In the past three decades, the information technology (IT) has changed and continues to change many aspects of the society. Applications based on computers and software have reshaped the technology landscapes and system capabilities in modern financial systems, communication systems, healthcare systems, military systems, aerospace systems, entertainment systems, and much more. As software becomes a key infrastructure in many domains, software security failure can cause severe damages and losses to system key stakeholders.

Vulnerabilities can be prioritized by static rankings recommended by authority organizations such Computer Emergency Response Team (CERT), National Institute of Standard Technology (NIST), Microsoft®, and Symantec®. However, these ratings are static and do not take the system stakeholder utilities into account. Measuring Commercial Off-The-Shelf (COTS) security threats and prioritizing vulnerabilities efficiently can be difficult due to lack of effective metrics to measure stakeholder utilities, lack of firm historical data, and the complex and sensitive nature of security.

SUMMARY

Techniques, systems and apparatus are disclosed for analyzing security threats associated with software and computer vulnerabilities. In one aspect, analyzing security threats associated with software and computer vulnerabilities includes identifying stakeholder values relevant for a software system. The identified stakeholder values are quantified using a quantitative decision making approach such as Analytical Hierarchy Process (AHP) to prioritize security vulnerabilities of the software system. A Structured Attack Graph is generated to include the quantified stakeholder values to evaluate attack paths in that Structure Attack Graph. Each attack path represents a respective attack scenario. The entire, or at least part of the Structured Attack Graph has a layered architecture. The Structured Attack Graph includes two or more nodes. Each layer in the Structured Attack Graph represents a key entity in security threat modeling, for example, the layers of System Key Stakeholders, Computer Hosts, Commercial Off The Shelf Software, Vulnerabilities, Network Ports, and Attackers, Based on the generated Structured Attack Graph, Structured Attack Paths are identified. The security severity of each Structured Attack Path are measured based on the relevant Stakeholder Values. The security criticalness of each node in the Structured Attack Graph is measured based on the Structured Attack Paths that go through the node. A fast algorithm based on the Structured Attack Graph is developed to efficiently prioritize the vulnerabilities, which makes this method scalable to large and complex software systems.

Implementations can optionally include one or more of the following features. A quantitative measure of security criticalness of each node in the Structured Attack Graph can be calculated in terms of Threat Key Values that represent security threats. In addition, a recommendation can be provided on a security investment plan including identifying at least one of the attack paths that a security practice can suppress. Identifying the stakeholder values can include identifying values that cannot be quantified in terms of tangible units. Generating the Structured Attack Graph can include generating a structured attack graph that includes two or more layers with each layer including one or more of the nodes. Also, generating the structured attack graph can include generating the structured attack graph that includes at least five layers that represent the identified stakeholder values, the computer host, software installed on the computer host, vulnerabilities of the software that is part of the software system, and possible attackers. Further, quantifying the identified stakeholder values can include quantifying the identified stakeholder values using a quantitative decision making approach that includes analytical hierarchy process. In addition, generating the structured attack graph can include generating a structured attack graph that includes information on one or more communication ports. Also, a quantitative measure of criticalness of each port can be calculated in terms of security threats. A greedy algorithm can be operated to calculate an optimal rule set that balances security and efficiency.

In another aspect, a system includes a communication network and two or more servers connected to the network to implement a software system and to perform operations. The servers are operable to identify stakeholder values relevant for the software system implemented in the two or more servers; quantify the identified stakeholder values using a quantitative decision making approach to prioritize vulnerabilities of the software system; generate a structured attack graph that includes the quantified stakeholder values to define a scalable framework to evaluate attack scenarios, wherein the structured attack graph includes two or more nodes; and, based on the generated structured attack graph, identify structured attack paths. Each structured attack path represents a respective attack scenario. The subject matter as described in this specification can be implemented as a computer program product, embodied on a computer-readable medium, operable to cause a data processing apparatus to perform operations as described above. In addition, the subject matter as described in this specification can be implemented as one or more systems.

The subject matter described in this specification potentially can provide one or more of the following advantages. The Threat Modeling Method Based on Attack Path Analysis (T-MAP) can quantify security threats by calculating the total severity weights of relevant attacking paths for Commercial Off The Shelf (COTS) based systems. Further, security economic analysis can be enabled by T-MAP. T-MAP is sensitive to system stakeholder value priorities and organizational information technology (IT) environment. T-MAP can distill the technical details of thousands of relevant software vulnerabilities into management-friendly numbers at a high-level. In addition, T-MAP can systematically establish the traceability and consistency from management-level organizational value propositions to technical-level security threats and corresponding mitigation strategies. For example, in a large IT organization, T-MAP can effectively demonstrate strength in prioritizing and estimating security investment cost-effectiveness and evaluate the security performance of COTS systems. T-MAP can be used to estimate and optimize the cost-effectiveness of security practices such as software patching, user account control and firewall.

BRIEF DESCRIPTION OF THE DRAWINGS

FIG. 6 shows an example algorithm to enumerate all structured attack path for a given structured attack graph G.

FIGS. 8a and 8b is a table showing descriptions of example class attributes.

FIG. 10 shows examples of estimated labor costs.

FIG. 11 shows example top-level stakeholders, stakeholder value propositions, and corresponding criteria weights that are relevant to Server X.

FIG. 12 shows an example calculation of top-level criteria weights.

FIG. 13 shows example results of a case study.

FIG. 14 shows example relative group size ratings (A.GS) calculated through Analytical Hierarchy Process (AHP) pair-wise comparison.

FIG. 15 shows the relative ratings of the A.GS, A.SL, and A.MT for each group can be calculated through AHP.

FIG. 16 shows an example summary of Attacker Groups' information in an example case study.

FIG. 17 shows examples of vulnerability technical attribute ratings.

FIG. 19 shows an example of an algorithm for calculating the ThreatKey of each node.

FIGS. 20 and 21 show example algorithms that include pseudo-code for calculating BottomUpWeight and TopDownWeight of each node.

FIG. 22 is an example screen shot from the T-MAP tool.

FIG. 23 shows example COTS software installed on Server X.

FIG. 24 shows an example screenshot of attach path calculation results.

FIG. 25 is a table showing an example suppressing matrix used to summarize the effectiveness of each alternative security investment plan.

FIG. 35 shows example system key stakeholder value propositions.

FIG. 36 is a table showing example evaluation scores for possible security breach scenarios.

FIG. 37 is a table showing example COTS components.

FIG. 39 shows the system key stakeholder value propositions for Center for Systems and Software Engineering (CSSE) GreenBay case study example.

FIG. 40 shows derived severity scores for possible security breach scenarios.

FIG. 41 is a table showing example COTS components.

FIG. 46 is a table showing example comparisons that compares prioritization performance across T-MAP and other value neutral approaches.

FIG. 48 shows an example summary of the profiles of security professionals who participated in the example case studies.

FIGS. 49, 50, 51 and 52 show example summaries for using T-MAP in Boehm's Spiral Model, ISO 15288 System Engineering Life-cycle Model, Royce's Waterfall Model and Boehm's Incremental Commitment Model (ICM) respectively.

FIG. 57 shows an example Greedy Algorithm.

Like reference symbols and designations in the various drawings indicate like elements.

DETAILED DESCRIPTION

Figure 1:
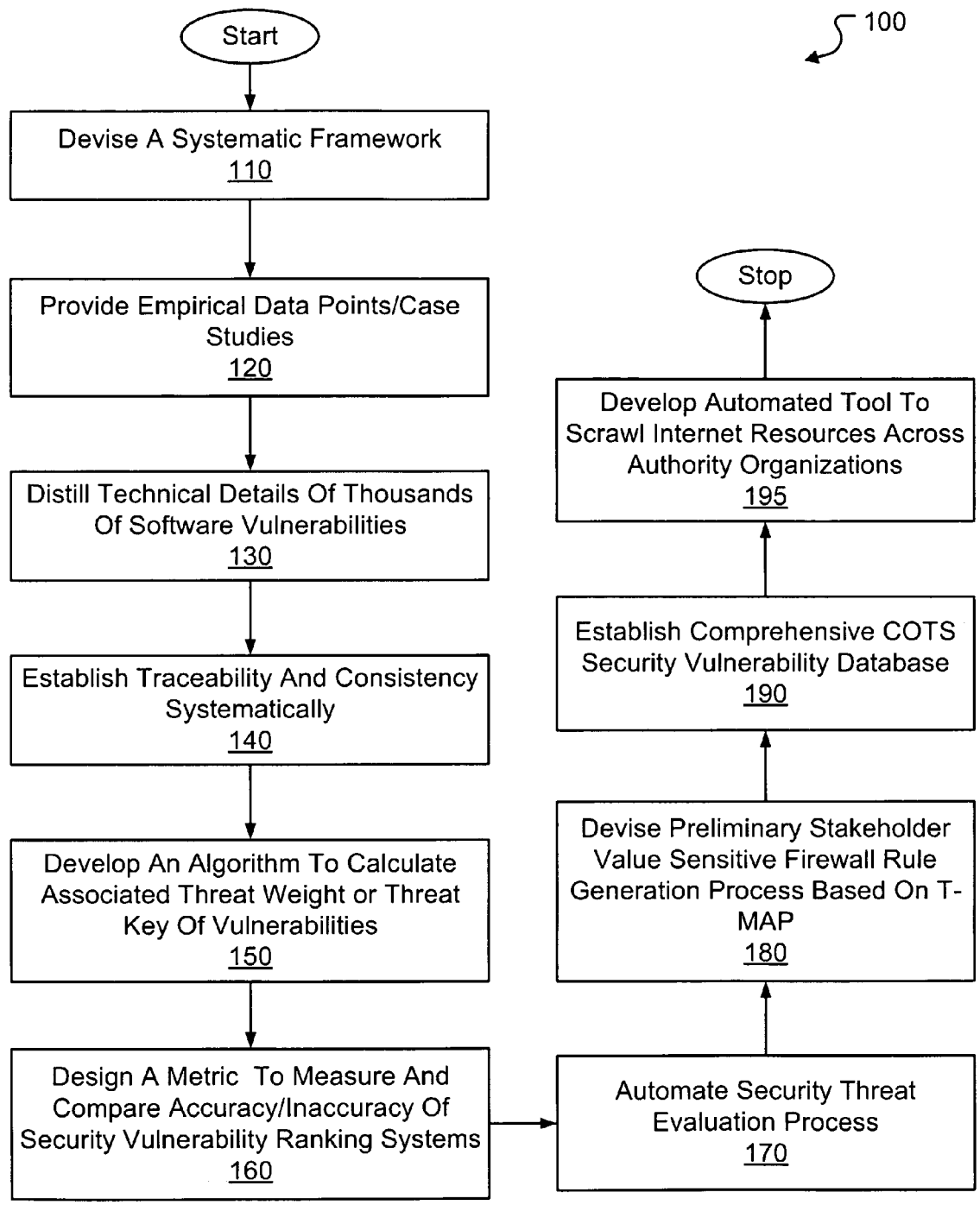
FIG. 1 shows an example process for providing key components of T-MAP analysis.

Techniques and systems are disclosed for assuring security under IT resource constrains. Assuring security under the existing limited IT resources can be challenging for various modern organizations that heavily relies upon a healthy IT infrastructure. To assure security, threats should be effectively prioritized to optimize resource allocation.

Vulnerabilities can be prioritized by ratings recommended by authority organizations such Computer Emergency Response Team (CERT), National Institute of Standards and Technology (NIST), Microsoft, and Symantec. However, these ratings tend to be static and may not take the system stakeholder utilities into account. Implementing such static ratings can require additional investigations to determine the criticalness of vulnerabilities under specific system context. Measuring COTS security threats and prioritize vulnerabilities efficiently can be difficult due to lack of effective metrics to measure stakeholder utilities, lack of firm historical data, and the complex and sensitive nature of security.

Additional difficulties may exist in measuring COTS security threat and prioritizing vulnerabilities. For example, there can be a lack of effective methods/metrics to measure and prioritize security threats from software vulnerabilities under specific stakeholder value/utility context. The vulnerability rating systems by authority organizations such as CERT, Microsoft, NIST, and Symantec are value neutral, static, and not sensitive to stakeholder utility functions. Critical features for security budgeting can include the ability to measure the "composition of forces" of possible thousands of COTS vulnerabilities in IT systems and the effectiveness of security investment. In addition, security assessment may need to be described and reported in a management friendly language.

These and other difficulties can cause various undesired events. For example, misidentification of critical security vulnerabilities can result in business loss. When the allocation of security resources fails to match the system stakeholder utility priorities, resource abuse can occur. Miscommunication between technical and management can result in security investment decisions based on inaccurate perceptions.

Techniques and systems described in this specification can be used to provide a set of Software Engineering methodologies, metrics, algorithms, guidelines and automated tools to help organizations balance the tradeoffs between security and resource constraints. Implementations can be applied on optimizing COT based systems, the key building blocks for most IT systems.

According to the NIST IT Security Guideline, the security impacts of all vulnerabilities can be specified in terms of Confidentiality, Integrity, and Availability (CIA). These security attributes may have very different business indications under different application context. Therefore, vulnerabilities associated with different type of CIA impacts are treated differently based on system stakeholder value context. Furthermore, traceability is established between the stakeholder value propositions and the treatments to vulnerabilities that involve different CIA impacts. As described above, COTS vulnerability ranking or ratings systems by authority organizations such as NIST, Cisco, ISS, Microsoft, SANS, CERT, Symantec/BugTraq, and Qualys are value-neutral and static. In these static rankings a coarse resolution of ranking scales such as "High/Medium/Low" or "Critical/Medium/Moderate/Low" are used to differentiate more than 27,400 known COTS vulnerabilities.

The techniques and systems described in this specification can implement a stakeholder value sensitive approach to prioritize COTS security vulnerabilities and measure the security threat associated with COTS based systems. In addition, T-MAP is implemented to better prioritize COTS security vulnerabilities than above described value-neutral approaches.

In this specification, "better" is measured by accuracy/inaccuracy in vulnerability rankings. For a COTS based system as described in this specification, the Confidentiality, Integrity and Availability have different indications to the system stakeholder values. The accuracy of T-MAP rankings are measured by inaccuracy that describes the ratio of the number of clashes between vulnerability priorities and stakeholder value priorities and the total number of comparisons made. A stakeholder value driven approach, namely the Security Threat-Modeling method based on Attacking Path analysis (T-MAP), is provided to inject stakeholder incentives into COTS vulnerability prioritization. The T-MAP analysis also enables the measurement of the cost effectiveness of common security protections such as Firewall, data encryption, and patching for COTS based systems.

FIG. 1 shows an example process 100 for providing key components of a T-MAP analysis. A systematic framework is devised 110 to capture the stakeholder value priorities through Analytical Hierarchy Process (AHP) analysis and inject the value propositions into COTS vulnerability ranking. Empirical data points/case studies are provided 120 where the value-driven method (i.e., T-MAP) significantly outperforms the value-neutral methods in COTS security vulnerability prioritization. The technical details of thousands of software vulnerabilities are distilled 130 into executive-friendly language at a high-level. The traceability and consistency are systematically established 140 from organizational-level value propositions to technical-level COTS security vulnerabilities and corresponding mitigation strategies.

An algorithm is developed 150 to calculate the associated threat weight or threat key of vulnerabilities that can considerably increase the method scalability to large COTS based systems. Achieving this scalability may limit the scope of analyses to single-step-exploits. In addition, a metric is designed 160 to measure and compare the accuracy/inaccuracy of security vulnerability ranking systems. The security threat evaluation process is automated 170 using a T-MAP software tool.

T-MAP tool automates T-MAP to reduce the necessary human effort involved in security assessment. T-MAP tool can enumerate the possible attack scenarios for IT systems based on a vulnerability database that includes the information of more than 27,400 known software vulnerabilities. Each attack scenario can be specified with the following information: (1) the organizational value affected; (2) the vulnerable computer; (3) the vulnerable software; (4) the CVE name of the vulnerability; (5) the impact type of the vulnerability in terms of confidentiality, integrity, and/or availability; and (6) the patch availability of the vulnerability Furthermore, T-MAP Tool can provide tangible evidence to assess the effectiveness of common security practices such as Firewall, system patching and hardening, enhancing physical security, creating backup systems, and data encryption.

A preliminary stakeholder value sensitive Firewall rule generation process is devised 180 based on T-MAP. This process can be automated using a tool, such as the T-MAP tool described above. The output Firewall rule set can have the minimal risk to stakeholder values among all other possible rule sets that have the same number of rules. The risk associated with a Firewall rule set is measured by ThreatKey as described with respect to FIG. X below.

A comprehensive COTS security vulnerability database is established 190 across current authority resources such as NIST, CERT, Microsoft, Symantec, and FrSIRT. Further, an automated tool is developed 195 to scrawl Internet resources across authority organizations such as NIST National Vulnerability Database (NVD), ISS, Microsoft, SANS, CERT, Symantec/BugTraq and FrSIRT to collect and update the vulnerability database continuously.

T-MAP is implemented based on a Value Based Software Engineering framework. T-MAP can adopt the Value Based Software Engineering philosophy that inject stakeholder value propositions into security threat evaluation to achieve consistency and traceability from high level stakeholder value propositions to low level security technical strategies. The identification of key stakeholders and their win conditions can be integrated. In addition, AHP can be employed to measure and prioritize stakeholder value propositions (Utility Theory). An attack tree can be implemented to analyze how stakeholder value propositions may be affected by system COTS vulnerabilities (Dependency Theory). Further, the Figure of Merit method can be employed for decision making (Decision Theory).

The T-MAP framework can be generated based upon the observations of: (1) the more security holes left open for an IT system, the less secure it is; (2) different IT servers might have different levels of importance in terms of supporting the business's core values; (3) the more vulnerabilities are exposed to motivated attackers, the more risk is involved. As a value driven approach, T-MAP uses the Attack Path concept to characterize possible scenarios wherein an attacker can jeopardize organizational values. T-MAP calculates the severity weight of each Attack Path (attack scenario) based on not only the technical severity of the relevant system vulnerability, but also its value impacts. T-MAP then quantifies the IT system threat with the total weight of all possible Attack Paths.

Figure 2:
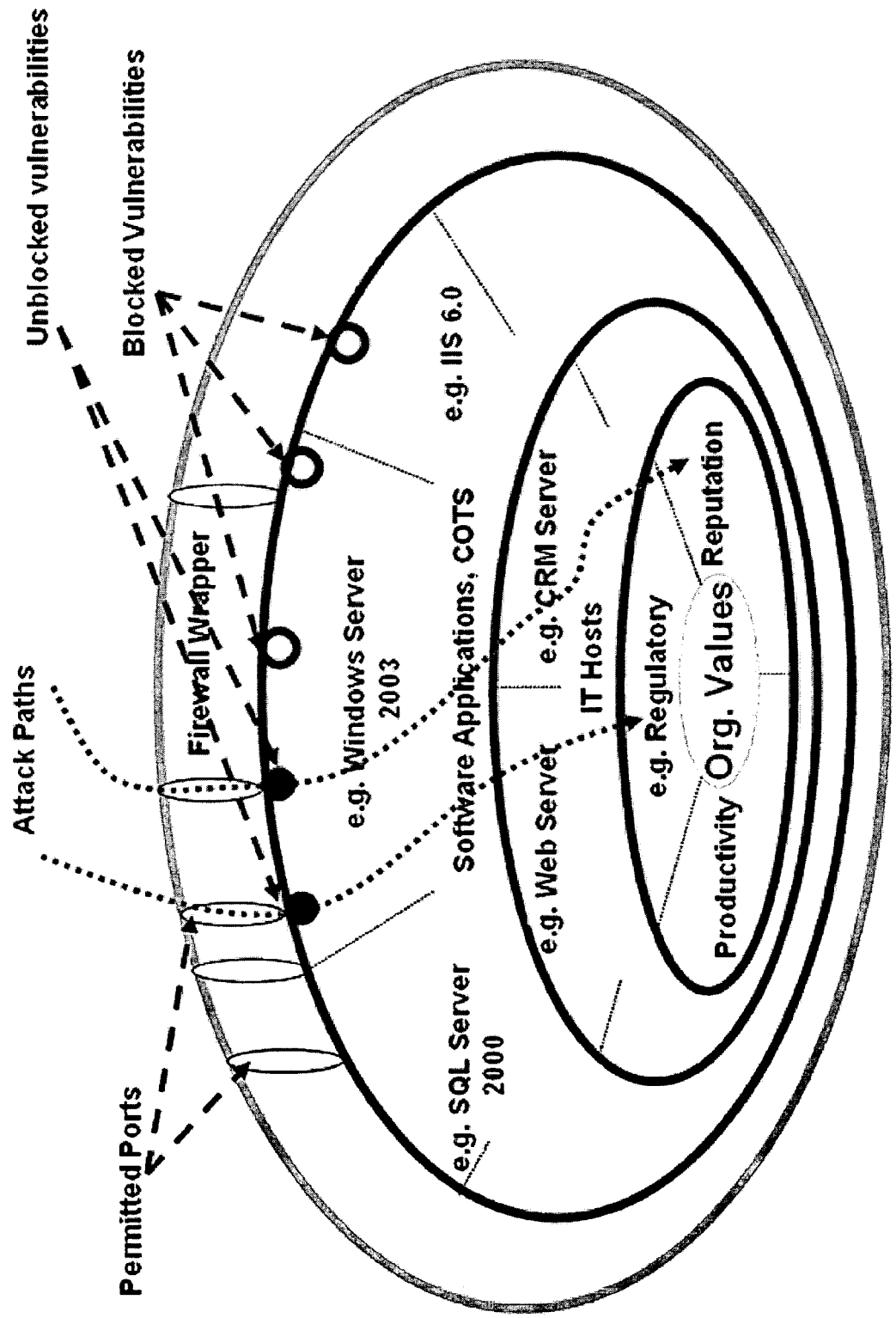
FIG. 2 shows an example scenario of how a successful attack can affect organizational values.

FIG. 2 shows an example scenario of how a successful attack can affect organizational values. The core with a caption of "Org. Values" represents the key values that are important to an organization, for example, reputation and productivity; the second layer from inside to outside with a caption of "IT Hosts" stands for the IT servers and hosts in organization's IT infrastructure. The third layer with a caption of "Software Applications, COTS" stands for the commercial off the shelf software installed on the IT servers. The outermost layer with a caption of "Firewall Wrapper" presents the Firewall or other types of security wrappers protecting the IT infrastructure. On the edge of the "Software Applications, COTS" layer, the small solid dots represent the software vulnerabilities that make attacks possible, while the small circles stands for the vulnerabilities that are made inaccessible to attackers by the firewall.

In a typical successful attack, for example, the attacker may first find and get access to the victim host, then exploit the vulnerabilities of the COTS software installed on the victim host, thus compromise the Confidentiality, Integrity or Availability (CIA) of the victim host, and result in further damages to stakeholder values. The COTS system security can be analogous to a castle defense. For example, the security of a castle can be measured by the value of treasures inside the case, the number of holes on the walls, as well as the size of the holes.

Figure 3:
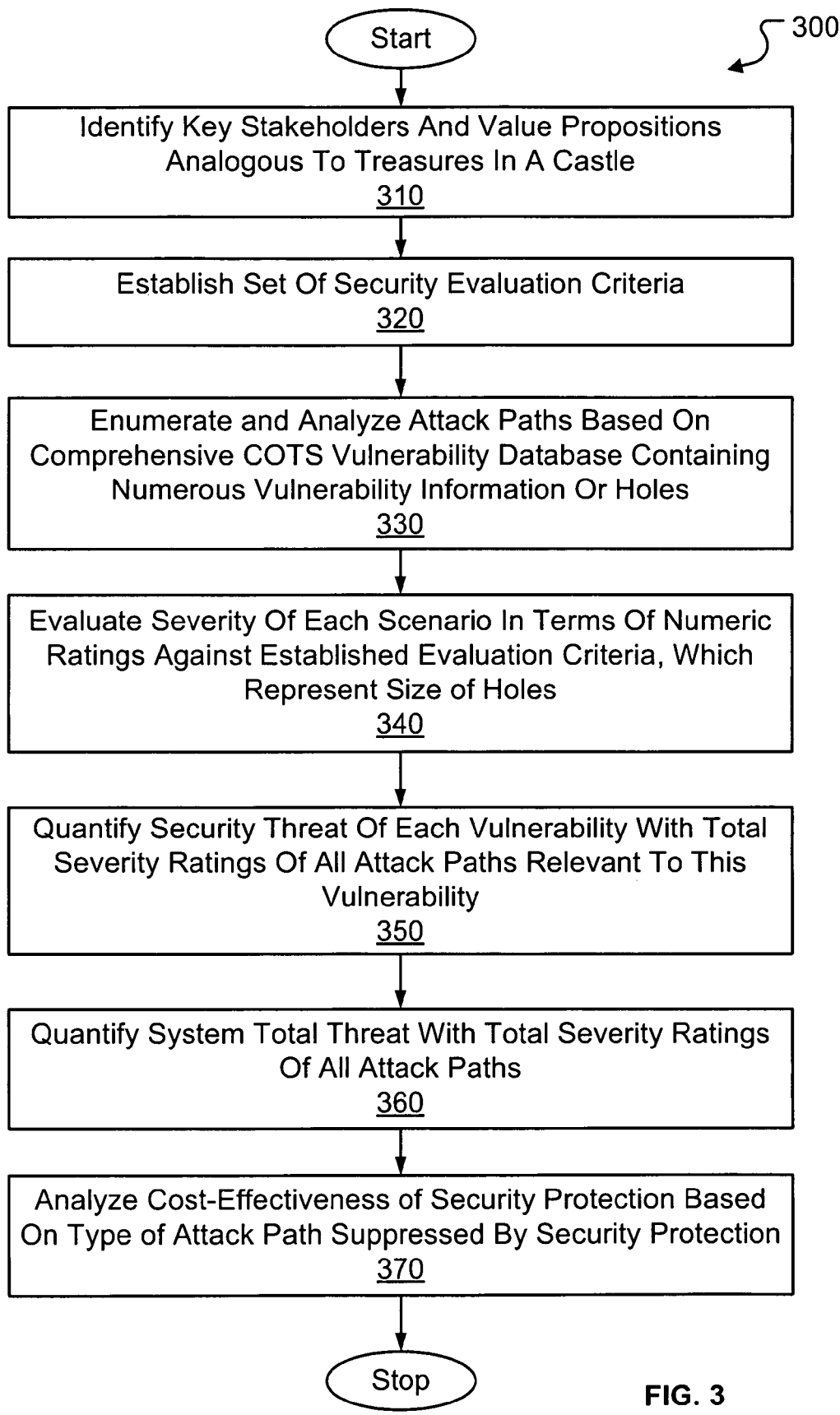
FIG. 3 shows an example process of implementing T-MAP.

FIG. 3 shows an example process 300 of implementing T-MAP. Key stakeholders and value propositions (the treasures in the castle) for a software intensive system are identified 310. A software intensive system may be distributed on one or more hardware devices, such as SISs or network devices. Thus, T-MAP targets computer systems such as a IT infrastructure that may involve multiple host computers. A set of security evaluation criteria is established 320 based on stakeholder value propositions. Attack paths are enumerated and analyzed 330 based on a comprehensive COTS vulnerability database containing numerous vulnerability information or the holes. For example, 27,400 vulnerability informa-tion were used in one implementation. The severity of each scenario is evaluate 340 in terms of numeric ratings against the established evaluation criteria, which represent the size of the holes. The security threat of each vulnerability is quantified 350 with the total severity ratings of all attack paths that are relevant to this vulnerability. System total threat is quantified 360 with the total severity ratings of all attack paths. The cost-effectiveness of security protections are analyzed in 370 based on what type of attack path are suppressed by the security protection. In addition, processes 330, 340, 350 and 360 can be automated using an automation tool.

T-MAP Framework Implementing Structured Attack Graph

Figure 4:
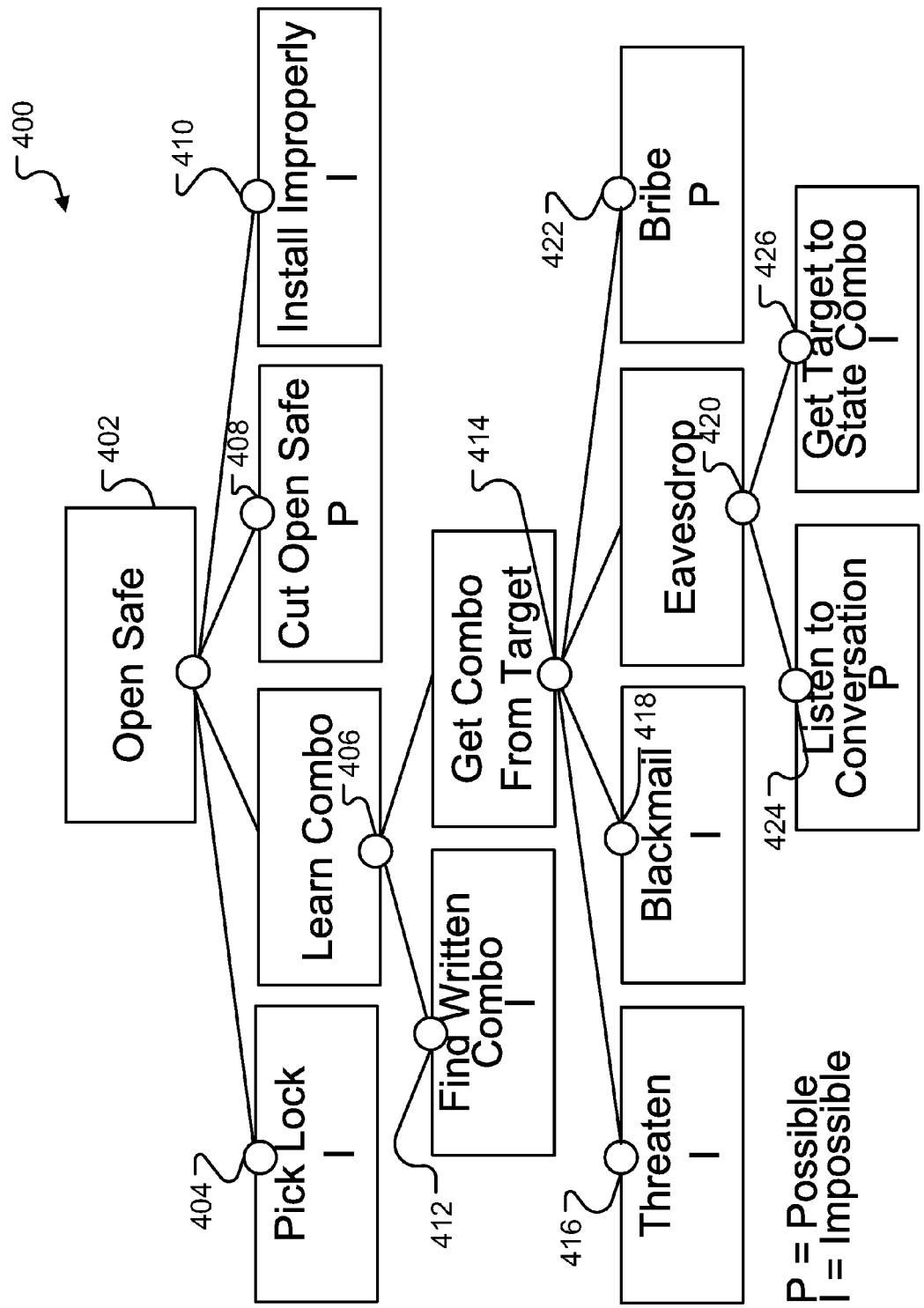
FIG. 4 shows an example Scheiner's attack tree.

T-MAP defines a formal framework to enumerate and evaluate attack scenarios based on attack graph analysis. T-Map can implement a structured attack graph that incorporates an attack tree. An attack tree is also known as "And/Or Tree." FIG. 4 shows an example non-structured attack tree 400. The example non-structural attack tree 400 can be implemented using a Scheiner's attack tree based on the Fault Tree developed by Bell Labs and the U.S. Air Force in 1960s [B. Schneier (Dec. 1999). "Attack trees: Modeling security threats." Dr. Dobb's Journal.] Instead of the non-structured Scheiner's attack tree 400, T-MAP can implement a structured attack tree to generate a tool for analyzing attack scenarios. An example structured attack tree implemented for use with T-MAP is described with respect to FIG. 5 below.

FIG. 4 shows possible attack paths of an attacker to achieve the goal of "Open Safe" 402. The possible attack paths are shown through the nodes 402, 404, 406, 408, 410, 412, 414, 416, 418, 420, 422, 424, 426 and connections between nodes. On each node 402, 404, 406, 408, 410, 412, 414, 416, 418, 420, 422, 424, 426, the actions that the attacker may take are clearly noted (e.g., pick lock, learn combo, etc.). Also, the possible or impossible next-process scenarios associated with each node are also specified by connecting nodes in the next layer. When a defender is able to block all the possible attack paths on the tree 400, the defender will be safe, assuming the attack tree 400 is complete.

Implementing the attack tree analyses into practice is can be hindered by difficulties in collecting accurate information necessary for building practical attack graph, for example, the exploit pre-condition and post-condition of large volume of software vulnerabilities. In addition, a lack of a standard for building, simulating and analyzing attack trees may also add difficulties. Further, accuracy of any tool generated may be affected by user errors.

T-MAP employs a structured attack graph, a specialized attack tree, to model the stakeholder value impact path from COTS vulnerability exploits. The structured attack tree is customized with the classic IT risk management framework. The structured attack graph as described in this specification incorporates stakeholder value/utility into the tree structure. Also, the layered structure of the T-MAP structured attack graph can reduce the complexity in graph analysis to enable a fast algorithm to analyze the attack graph in O(n) time complexity, where n is the sum of total number of nodes of all layers and the total number of edges in the Structured Attack Graph.

Figure 5:
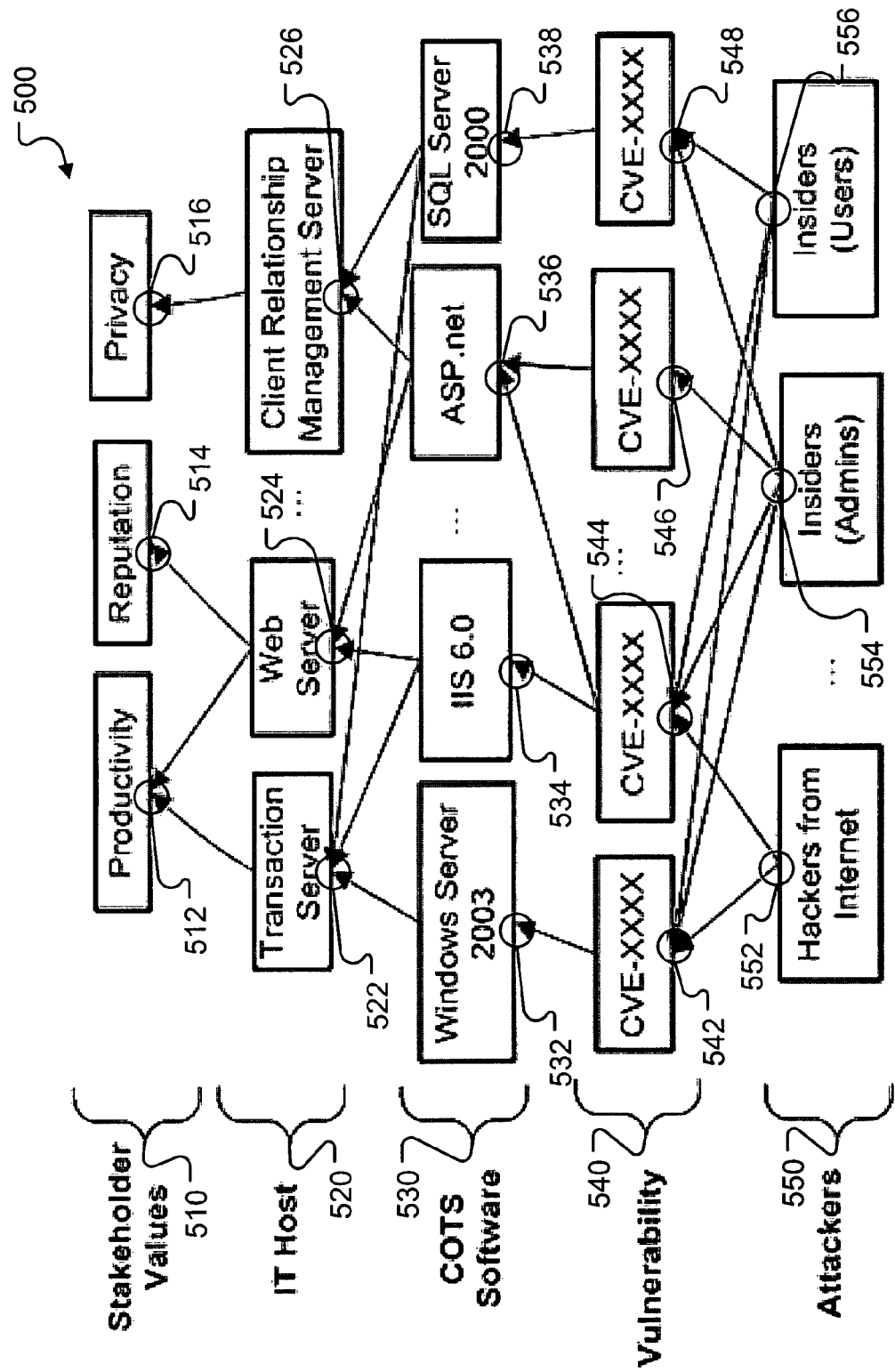
FIG. 5 shows an example T-MAP structured attack graph.

FIG. 5 shows an example T-MAP structured attack graph 500. The T-MAP structured attack graph 500 includes various nodes 512, 514, 516, 522, 524, 526, 532, 534, 536, 538, 542, 544, 546, 548, 552, 554, 556 structured into various layers including a first layer 510, a second layer 520, a third layer 530, a fourth layer 540 and a fifth layer 550. The first layer 510 can represent stakeholder values. For example, the first layer 510 can include associated nodes that represent stakeholder values such as productivity 512, privacy 514, or reputation 516 respectively. The second layer 520 can represent one or more IT hosts. For example, the second layer 520 can be associated with nodes that represent IT hosts that the stakeholder values rely upon, such as a transaction server 522, a Web server 524, a client relationship management server 526, etc. The third layer 530 can represent COTS software installed on the one or more IT hosts. For example, the third layer 530 can be associated with nodes that represent COTS software including an operating system, such as the Microsoft® Windows® Server 532, a set of Internet-based services for servers such as the Microsoft® Internet Information Services (IIS) 6.0 534, a web application framework such as the APS.net 536, a relational database management system such as the Microsoft® SQL Server 2000, etc. The fourth layer 540 can represent software vulnerabilities that reside in the COTS software. For example, the fourth layer 540 can be associated with various nodes 542, 544, 546, 548 that represent the various vulnerabilities. The fifth layer 550 can include nodes that represent possible attackers, such as hackers from the Internet 552, insiders 552, external hackers 554, etc. The associations between the fifth layer nodes 552, 554, 556 and fourth layer nodes 542, 544, 546, 548 represent that the associated attacker has adequate privilege and access to the vulnerabilities. The layers in the Structured Attack Graph can be added or removed. Thus, while FIG. 5 shows 5 layers, a Structured Attack Graph can be implemented to have more than 5 or less than 5 layers. The number of layers implemented may depend on the type of software system involved and/or adjustments to the T-MAP analysis.

Under this framework, the nodes 512, 514, 516, 522, 524, 526, 532, 534, 536, 538, 542, 544, 546, 548, 552, 554, 556 in the structured attack graph can be characterized as "OR nodes" in real world. For example, when a COTS software has multiple vulnerabilities, the software can be compromised upon the exploit of any of the associated vulnerability. Thus, the T-MAP structured attack tree 500 can be derived from analyzing the stakeholder value result chains, data flow of organizational IT operations, and the system use/abuse cases.

T-MAP can be extended to analyze more complex multi-step-exploit attack graph by chaining the exploit steps between the layers of "IT hosts", "COTS Software", and "Vulnerability" in the Structured Attack Graph, if the connectability between exploits is known.

As described in this specification, the structured attack graph 500 and the associated structured attack paths can be defined as follows: The structured attack graph G=<Va, Vv, Vc, Vh, Vs, Eav, Evc, Ech, Ehs> includes various vertices and edges. In the example shown in FIG. 5, G includes five finite nonempty sets of vertices Va, Vv, Vc, Vh, Vs objects together with four possibly empty sets Eav, Evc, Ech, Ehs of ordered pairs of distinct vertices of G called edges. The finite nonempty sets of vertices Va, Vv, Vc, Vh, and Vs represent the sets of attacker nodes, vulnerability nodes, COTS software nodes, IT host nodes, and Stakeholder Value nodes, respectively. Eav=<a, V> only contains ordered pairs of vertices where a∈Va and v∈Vv; Evc=<v, C> only contains ordered pairs of vertices where V∈Vv and c∈Vc; Ech=<c, h> only contains ordered pairs of vertices where c∈Vc and h∈Vh; and Ehs=<h, s> only contains ordered pairs of vertices where h∈Vh and s∈Vs.

For a given attack graph G, a structured attack path is a tuple. For the example shown in FIG. 5, the structured attack path is a 5-tuple P=<A, V, C, H, S>, where A∈Va, V∈Vv, C∈Vc, H∈Vh, S∈Vs, and the associations or edges between elements from adjacent layers must exist. P characterizes an attack scenario in terms of attacker, vulnerability, COTS software, IT Host, and Stakeholder Values, respectively. This tuple can be extended to include other elements as well, for example, network ports.

FIG. 6 shows an example algorithm 600 to enumerate all structured attack path for a given structured attack graph G. The algorithm 600 is a brutal force algorithm that enumerates all structured attack paths for a given structured attack graph G.

Figure 7:
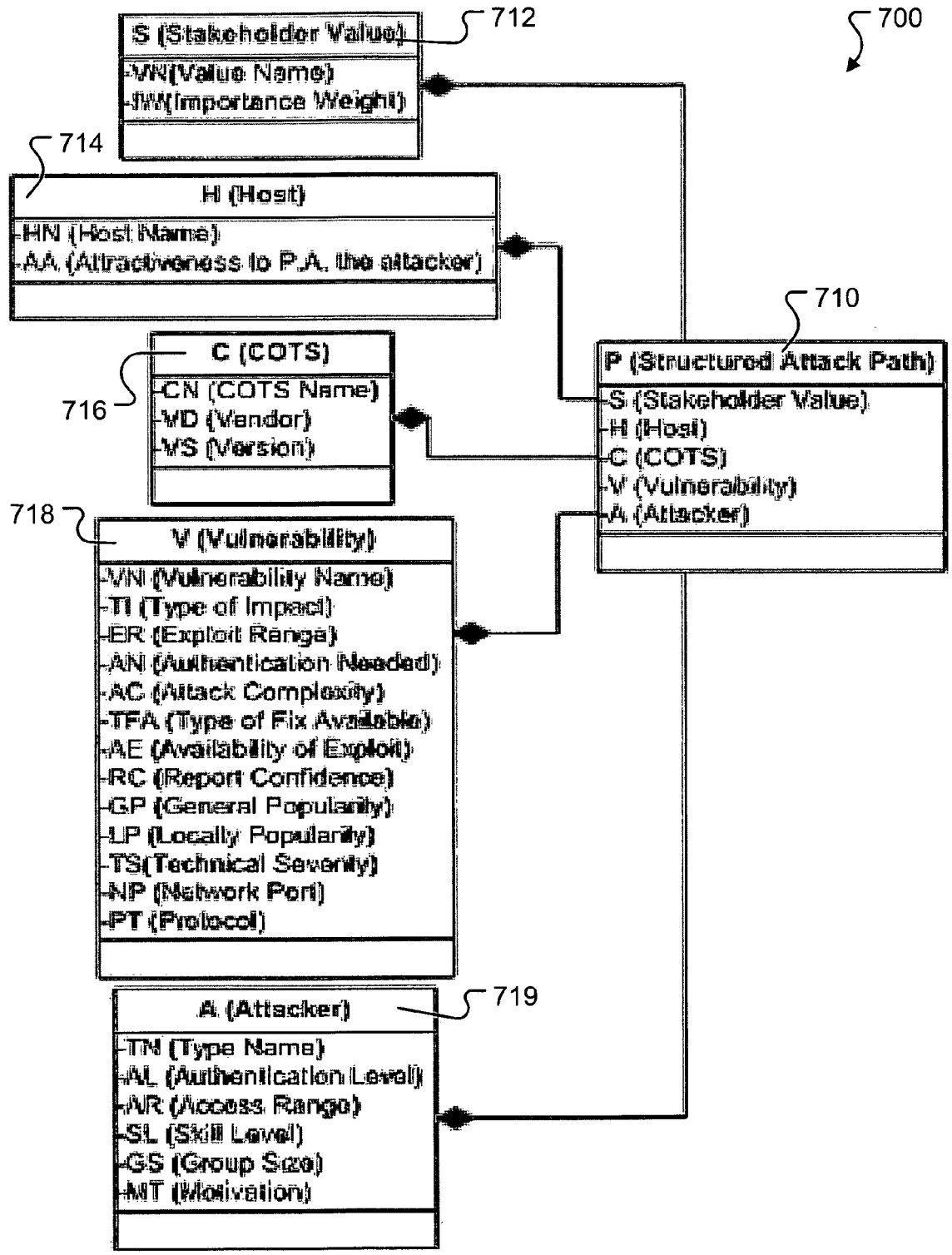
FIG. 7 shows an example Unified Modeling Language (UML) model of a structured attack path.

FIG. 7 shows an example Unified Modeling Language (UML) model 700 of a structured attack path. To enable fine-grained threat assessment of attack scenarios, T-MAP can define a set of threat-relevant attributes for each compositing elements 712, 714, 716, 718, 719 of 710. The class of structured attack path has 1-to-1 composition associations with class attributes 712, 714, 716, 718, 719. These class attributes 712, 714, 716, 718, 719 can be classified into three categories: probability-relevant, size-of-loss relevant and descriptive. The selection of the class attributes 712, 714, 716, 718, 719 can be based on, but not limited to the NIST IT Risk Guide and the emerging national standard Common Vulnerability Scoring System (CVSS), a joint effort across CERT, Cisco, MITRE, eBay, ISS, Microsoft, Qualys, and Symantec.

CVSS is a vulnerability ranking system that brought in-depth-evaluation on comprehensive technical details of vulnerabilities. Comparing to most High/Medium/Low ranking systems, CVSS established a mechanism to interpret the technical features of a vulnerability into a numeric score which ranges from 1 to 10, which greatly improved the ranking granularity to differentiate vulnerabilities. However, missing the system stakeholder value context, the rating generated by CVSS can be misleading to security managers sometimes. For example, the vulnerability that can only compromise availability has a max rating of 3.3 out of 10 (low) in the NIST Common Vulnerability Scoring System (CVSS) Version 1.0 (i.e., the CVE-2006-3468). But for many production servers, wherein availability can be mission-critical, this rating suggests this vulnerability is only at a "Low" priority.

FIGS. 8a and 8b is a table 800 showing descriptions of example class attributes. When P is a structured attack path in structured attack graph G, the class attributes 802, 804, 806, 808, 810, 812, 814, 816, 818, 820, 822, 824, 826, 828, 830, 832, 834, 836, 838, 840 of P can be summarized as shown in FIG. 8.

A vulnerability database can be established that contains numerous published COTS vulnerabilities. For example, a database is established that contains 27,400 published COTS vulnerabilities affecting 31713 COTS software based on the comprehensive NIST National Vulnerability Database (NVD). The datase extends NVD by adding severity ratings, recommended solutions, and network ports and protocol information from other sources such as Microsoft, SecurityFocus, Frsirt, SANS, and CERT. In addition, security managers usually are aware of the stakeholder value propositions, the value dependencies on the IT infrastructure, the installed COTS software, as well as the most-likely attackers.

Value Driven Evaluation of Attack Scenarios

As a descriptive model of attack scenarios, the adverse impact of an attack path can be characterized in terms of confidentiality, integrity and availability (CIA). However, CIA is a value neutral concept and does not reflect the utility function of stakeholders. To capture the stakeholder value perception of the attack path impact, the system relevant key stakeholder values are identified. A set of evaluation criteria is established based on the identified key stakeholder values. Also, the system CIA is evaluated against each criterion.

Figure 9:
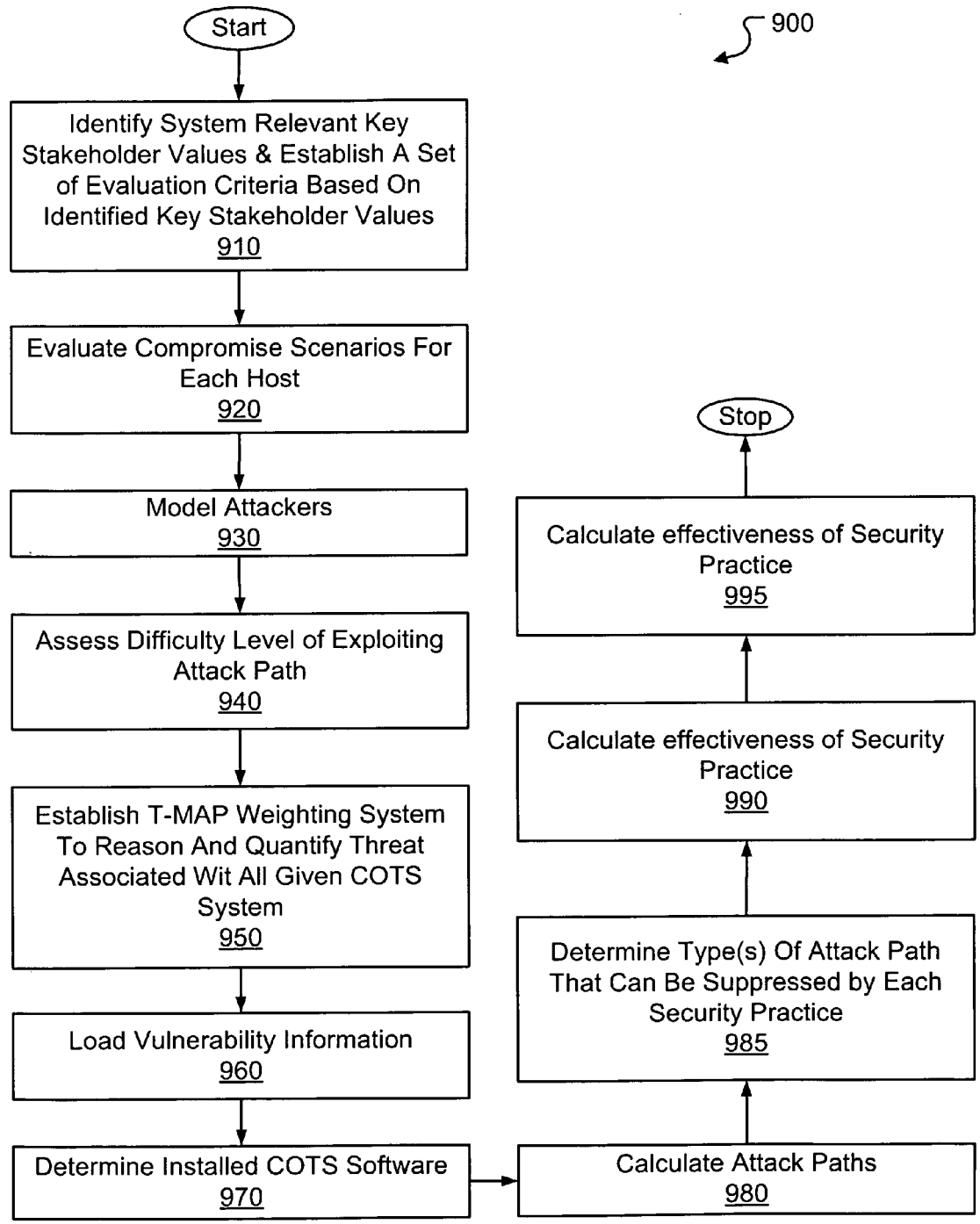
FIG. 9 shows an example process for performing value driven evaluation of attack scenarios.

FIG. 9 shows an example process 900 for performing value driven evaluation of attack scenarios. Key stakeholders/values are identified and evaluation criteria are established 910. Compromise scenarios is evaluated 920 for each host. Also, attackers are modeled 930. The difficulty level of exploiting attack path is assessed 940. The T-MAP weighting system is established 950 to reason and quantify the threat associated with given COTS system. Vulnerability information is loaded 960. The COTS software installed are determined 970. Attack paths are calculated 980. The type(s) of attack path that can be suppressed by each security practice are determined 985. The effectiveness of security practices are calculated in 990. Further economic analysis are conducted in 995.

Some of the stakeholder values can be quantified in terms of tangible units such as dollars while others are not. For example, the organizational reputation is not a quantifiable value. To account for both types of stakeholder values, an evaluation method is developed based on Figure of Merit method and AHP to evaluate the impact severity of Attack Paths. Traditionally used in Decision Sciences as well as tradeoff analysis in System Engineering, the Figure of Merit method has unique strength in multiple criteria evaluation that involves quantitative and qualitative criteria. The Figure of Merit method is described in by Boehm [Boehm, B. (1981). Software Engineering Economics, Prentice Hall PTR.], contents of which are incorporated by reference. An example of applying AHP in security investment evaluation can be found in a recent work of Bodin et al [L. D. Bodin, L. A. Gordon, M. P. Loeb (February 2005). "Evaluating Information Security Investment Using the Analytic Hierarchy Process." Communications of The ACM], contents of which are incorporated by reference.

Example Case Study

The value driven evaluation of attack scenarios is described in an example case study. Server X is an important development server that communicates with a sensitive database Y. A hacker crime against database Y-driven web application is detected. To improve system security, the security manager identified three alternative plans: 1) patch server X and harden its Operating System; 2) build a firewall segment for server X to deny all access from remote external IPs; 3) tighten user accounts. Given a budget around $6,000, the security manager is wondering what plan could produce the best cost-effectiveness for improving the security of Server X. FIG. 10 shows examples of estimated labor costs. In FIG. 10, the labor cost is set at, as an example, $125 per hour.

To evaluate the severity of attack paths, stakeholder values dependent on IT system security are identified (see FIG. 9, reference no. 910). Furthermore, a set of criteria is established to evaluate the value-criticality of attack paths.

For example, FIG. 11 shows example top-level stakeholders, stakeholder value propositions, and corresponding criteria weights that are relevant to Server X. In FIG. 11, S1 represents students; S2 represents faculties; and S3 represents ISD Staff. The "+" symbol indicates relevance. The "++" indicates high relevance. FIG. 11 shows weight criteria 1110 such as productivity, regulation and privacy for various stakeholders (e.g., students, faculty and staff.) The relevance 1120 of each weight criterion 1110 to the stakeholders are also shown. FIG. 11 also shows the organizational value description 1130.

The weight values 1110 in the first column are determined through AHP. FIG. 12 shows an example calculation of top-level criteria weights. The rows 1210 and the columns 1220 represent the weight criteria including productivity, regulation and privacy. The number in each cell 1202, 1204, 1206, 1208, 1210, 1212, 1214, 1216, 1218 represents the value pair-wise relative importance. In particular, the numbers 1, 3, 5, 7, or 9 in row i and column j represent that the stakeholder value in row i is equally (1), moderately (3), strongly (5), very strongly (7), and extremely strongly (9) more important than the stakeholder value in column j, respectively. The value in cell (i,j) equals the 1/cell(j,i). For example, the value in cell (3,1) 1206 is "½" and the value in cell (1, 3) is 2. In order to calculate the weight, each cell 1202, 1204, 1206, 1208, 1210, 1212, 1214, 1216, 1218 is divided by the sum of its column, and then averaged by each row. The results of the final averaged weight 1230 are listed in the bolded Weight column in FIG. 12. The sum of weights for each weight criterion equals 1. Similar process is used to determine the weights for sub-criteria.

Referring back to FIG. 9, compromise scenarios for each host are evaluated (see FIG. 9, reference no. 920). The adverse impact of an attack path can be specified in terms of CIA of the victim host, and thus the relative severity of loss of confidentiality, integrity and availability against the established evaluation criteria are evaluated.

FIG. 13 shows example results 1300 of a case study. FIG. 13 shows weight criteria 1310 such as productivity, regulation and privacy for various stakeholders (e.g., students, faculty and staff.) The relevance confidentiality 1320 of each weight criterion are also shown. In addition, FIG. 13 shows the integrity 1330 of server X for each weight criterion Further, the availability 1340 against the established evaluation criteria are shown. Each cell, cell(i,j), represents the evaluation score of compromise condition j against evaluation criteria i. The weights of each row are derived through AHP pair-wise comparison. The sum of the weights of each row equals 1. In the example case study, since the stakeholder values are additive, weight of sum is used as the evaluation function. The confidentiality and integrity have high score because they might result in regulation violation that has a high penalty.

Thus, for a given attack path, the value impact score can be identified by S.VN (stakeholder value name) and V.TI (type of impact) in FIG. 13. The score values reflect the stakeholder value priorities.

Selecting an appropriate evaluation function based on the stakeholder values is a critical step toward generating meaningful evaluation scores. For example, an inappropriate evaluation function can lead to wrong selection of technologies.

Referring back to FIG. 9, attackers are modeled (see FIG. 9, reference no. 930). The attacker is another factor that can drive the severity of security incidents. T-MAP models attacker groups with attributes of skill level, group size, and the motivation, represented by A.SL, A.GS and A.MT, respectively. The accurate values of these attributes can be difficult to estimate. For example, the group size of hackers from internet can be difficult to estimate. Thus, in order to compare and prioritize attacker groups, AHP can be used to determine the relative weights of these attributes.

In the example case study, the security manager identified three top attacker groups: (1) AG1 that represents the skilled internet hackers who know how to escalate user privileges on the victim; (2) AG2 that represents less skilled internet hackers who don't know how to escalate user privileges; and (3) AG3 that represents insiders who usually have user accounts. FIG. 14 shows example relative group size ratings (A.GS) calculated through AHP pair-wise comparison. FIG. 15 shows the relative ratings of the A.GS, A.SL, and A.MT for each group can be calculated through AHP.

Furthermore, not all vulnerabilities are exploitable for all attackers. For example, some vulnerability requires attackers to have valid user account on the victim host, thus they are not vulnerable to hackers who do not have such privileges. Some vulnerability requires attackers to have local access to the victim host, so they are not vulnerable to hackers who do not have local access. T-MAP reflects these differences in attack path generation based on the values of authentication level and remote/local access, which are represented by A.AL and A.R, respectively. FIG. 16 shows an example summary of information of Attacker Groups of AG1, AG2, and AG3 in the example case study.

Referring back to FIG. 9, the difficulty level of exploiting attack path is assessed (see, FIG. 9, reference no. 940). The difficulty level of exploiting an attack path is modeled based on CVSS. The ratings of all relevant attributes are between 0 and 1.

FIG. 17 shows example vulnerability technical attribute ratings. The first column shows the various vulnerability attributes 1710. The second column shows the ratings 1720. The third column shows the ratings value 1730.

T-MAP Weighting System

After the attack path attribute-ratings are determined through the above value driven evaluations (see FIGS. 9-17), the T-MAP weighting system can be established to reason and quantify the threat associated with a given COTS system. Moreover, a stakeholder value sensitive method is proposed to assess the effectiveness of common security practices such as patching and firewalls.

A. Weight of Attack Paths

T-MAP scores the severity of the Attack Path by a numeric weight. Based on the classic risk calculation formula that defines Risk=Probability*Size of Loss, the weight of each attack path is calculated by multiplying its threat relevant attribute ratings together. The weight of an attack path can be defined as follows: For a given attack $$\text{path } P, \text{Weight}(P) = \prod_i \text{Rating}(P.\text{Attribute}_i)$$

where $P.\text{Attribute}_i$ enumerates once each of the probability relevant and the size-of-loss relevant attributes of P.

The probability relevant attributes include H.AA, V.ER, V.AN, V.AC, V.TFA, V.GP, A.GS, A.MT, and A.SL. The size of loss relevant attributes include S.IW, and V.TS. Other attributes are descriptive, including S.VN, H.HN, C.CN, V.VN, V.TI, A.TN, A.AL, and A.AR. (Attributes descriptions are in Table 1.) By nature, the weight serves as a heuristic or proxy of the risk associated with the Attack Path. It is a rating number ranges between 0 and 1.

Total Threat of IT System

Under the assumption that the more attacking scenarios or attacking paths exist, the more an organization's core values are vulnerable, the total weight of all attacking paths can be used to quantify the overall security threat to stakeholder values. For a given structured attached graph G, $$\text{TotalThreat}(G) = \sum_i \text{Weight}(\text{AttackPath}_i)$$

where i varies from 1 to the total number of attacking paths of G and $\text{AttackPath}_i$ represents the i-th Attack Path of G.

ThreatKey

Each node of the structured attack graph is associated with a set of attack paths that pass through that node. Thus, by comparing the total weight of all attacking paths passing through the node, a determination can be made on which entities are most vulnerable.

For a given node N in a structured attach graph G, $$\text{ThreatKey}(N) = \sum_i \text{Weight}(\text{AttackPath}_i)$$

where i varies from 1 to the total number of attacking paths that go through node N, and $\text{AttackPath}_i$ enumerates all the Attack Paths that go through N.

As the value of the ThreatKey of a node increases, the node becomes more vulnerable. For example, those vulnerabilities which have a higher Threat Key value should be patched at a higher priority than others. The COTS software associated with higher ThreatKey values is more vulnerable than those that have lower values. The attackers that have higher Threat-Key values are more dangerous than others.

A Fast Algorithm to Calculate ThreatKey

The ThreatKey of a node is the sum of the weight of all attack paths that go through that node. The calculation of the ThreatKey may be completed without emulating the Attack Paths. A fast algorithm with a time complexity of O(n) has been devised for ThreatKey calculation, where n is the sum of total number of nodes of all layers in G and the total number of edges in G.

Figure 18:
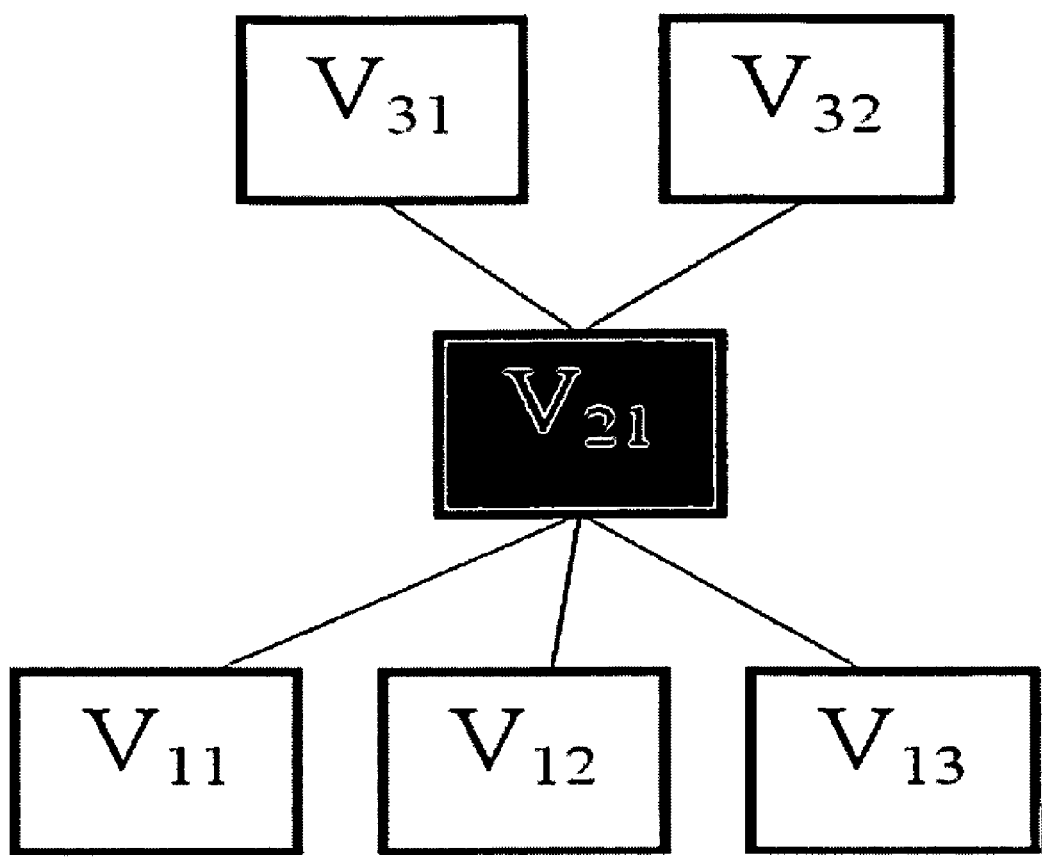
FIG. 18 shows an example of ThreatKey calculation for a three-layer-attack-graph.

Specifically, for a given structured attack graph G, the weight of each node can be calculated by multiplying the ratings of all its attack path relevant attributes together. So, the weight of a attack path can be computed by multiplying the weights of all nodes on that attack path. FIG. 18 shows an example of ThreatKey calculation for a three-layer-attack-graph. In the example shown in FIG. 18, when $$\text{ThreatKey}(V_{21}) = \Sigma \text{Weight}(\text{AttackPath}_i) \text{ then}$$

$$\text{ThreatKey}(V_{21}) = \text{TopDownWeight} * \text{BottomUpWeight} / W(V_{21}),$$

where $$\text{TopDownWeight} = W(V_{21}) * [W(V_{31}) + W(V_{32})] \text{ and}$$

$$\text{BottomUpWeight} = W(V_{21}) * [W(V_{11}) + W(V_{12}) + W(V_{13})].$$

This ThreatKey calculation can be expanded to a standard structured attack graph. For each node, all the attack paths that go through the node form two trees, one above the node and one below the node, as illustrated in FIG. 18. The BottomUpWeight represents the ThreatKey weight contributed by the lower tree. The TopDownWeight represents the ThreatKey weight contributed by the upper tree. FIG. 19 shows an example of an algorithm for calculating the ThreatKey of each node.

Both BottomUpWeight and TopDownWeight of each node can be calculated recursively. FIGS. 20 and 21 show example algorithms that include pseudo-code for calculating BottomUpWeight and TopDownWeight of each node. For prioritizing purposes, the nodes can be sorted in $O(n*\lg(n))$ time with quick sort or similar algorithms.

Effectiveness of Security Practices

Under T-MAP framework, the goal of many security practices can be understood as to block a certain set of attacking paths from the existing attacking path set. For example, firewalls are designed to block those attacking paths that pass through controlled network ports. Enforcing physical access to important computers is done to block those attacking paths that require local access. Patching software vulnerabilities is done to block those attacking paths that are caused by the vulnerabilities.

In this sense, the effect of a security practice can be simulated by removing the corresponding attack paths and nodes that this security practice can suppress in the graph. For example, the effect of vulnerability patching can be simulated by removing all attacking paths that have vulnerability patches available from the attacking path set that is before applying patches. For a given security practice SP, Effectiveness(SP)=1−TotalThreat(AfterSP)/TotalThreat(BeforeSP). SP represents the percentage of the total threat weight (before the security practice) that has been suppressed because of taking that security practice.

Example Case Study Continued

The stakeholder/value impacts of possible compromise scenarios of server X as well as and identified/evaluated the major sources of possible attackers. With the T-MAP weighting system established, the example case study is further analyzed. The results are the snapshots at the time when the case study was conducted.

Referring to 960 in FIG. 9, vulnerability information is loaded. For example, 17,731 vulnerabilities published by NIST from 1999 to 2006 can be loaded into an automation tool, such as the T-MAP tool. FIG. 22 is an example screen shot from the T-MAP tool. Specifically, FIG. 22 shows a screenshot of load vulnerability database.

Referring back to 970 in FIG. 9, the installed COTS software are determined subsequent to loading the vulnerability information. FIG. 23 shows example COTS software installed on Server X. The T-MAP tool takes this information as input.

Figure 24:
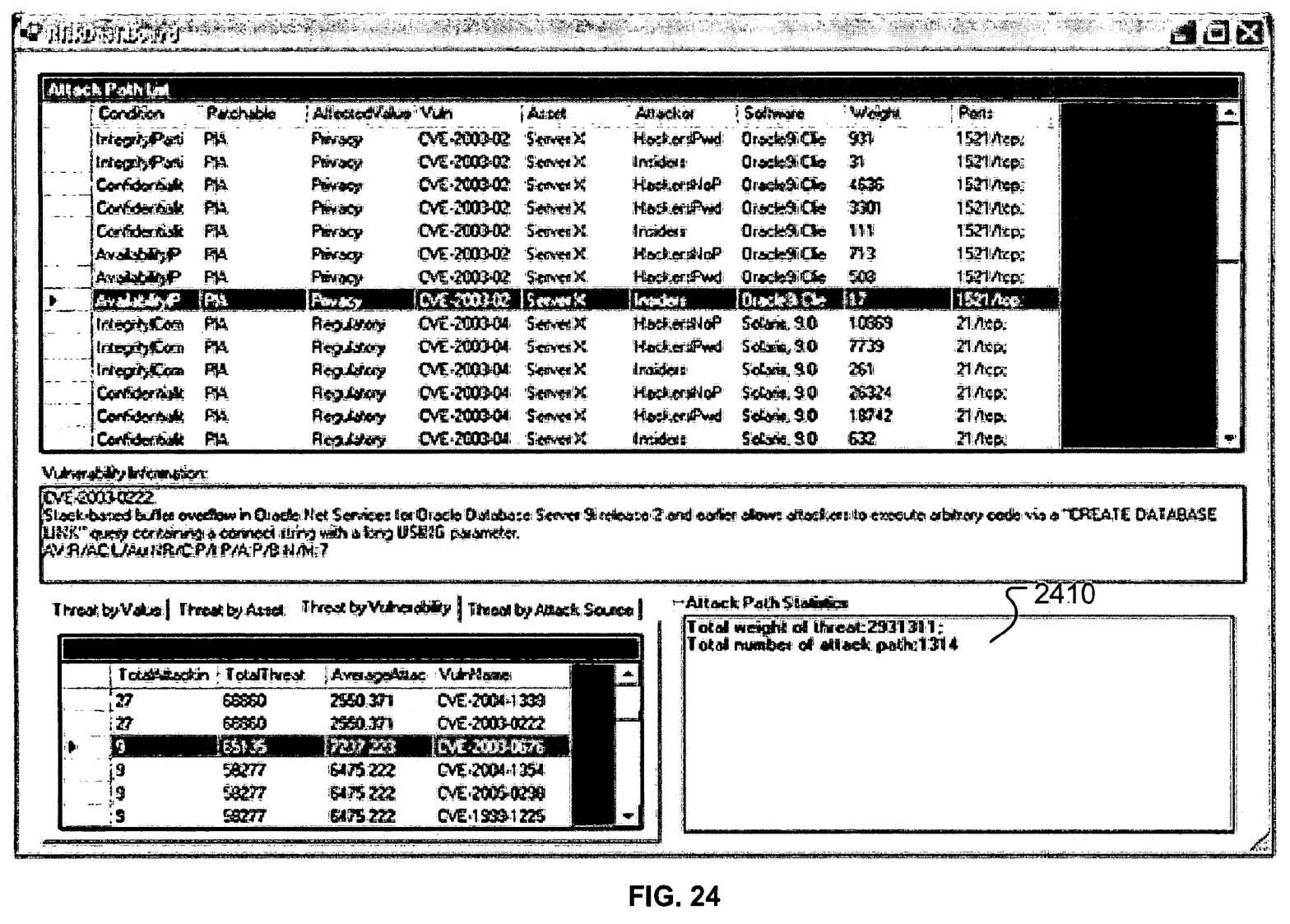

Referring to 980 in FIG. 9, the attack paths are calculated. The initial attack paths and associated severity weights are calculated for the current system without any security protection. FIG. 24 shows an example screenshot of attach path calculation results. The output 2410 shows that there are a total of 1314 attack paths with a total weight of 29.311. In addition, there are 106 COTS vulnerabilities reside in the current system. The top 3 vulnerabilities are shown to be CVE-2002-0858, CVE-2003-0722, and CVE-2004-1351 [NIST], associated with ThreatKey values of 1.539, 1.157 and 0.984, respectively.

Referring back to FIG. 9, a determination is made on what type of attack path can be suppressed by each security practice (see FIG. 9, reference no. 985.) FIG. 25 is a table showing an example suppressing matrix used to summarize the effectiveness of each alternative security investment plan.

The first column 2510 represents the relevant Attack Path attributes. The second column 2520 represents possible ratings of each attribute. The percentage p in table cell at row i and column j stands for the security practice of column j can suppress p percent of the threat of those attack paths that have the attribute rating represented by row i. The suppressing percentages should be justified by experienced security managers.

Figure 26:
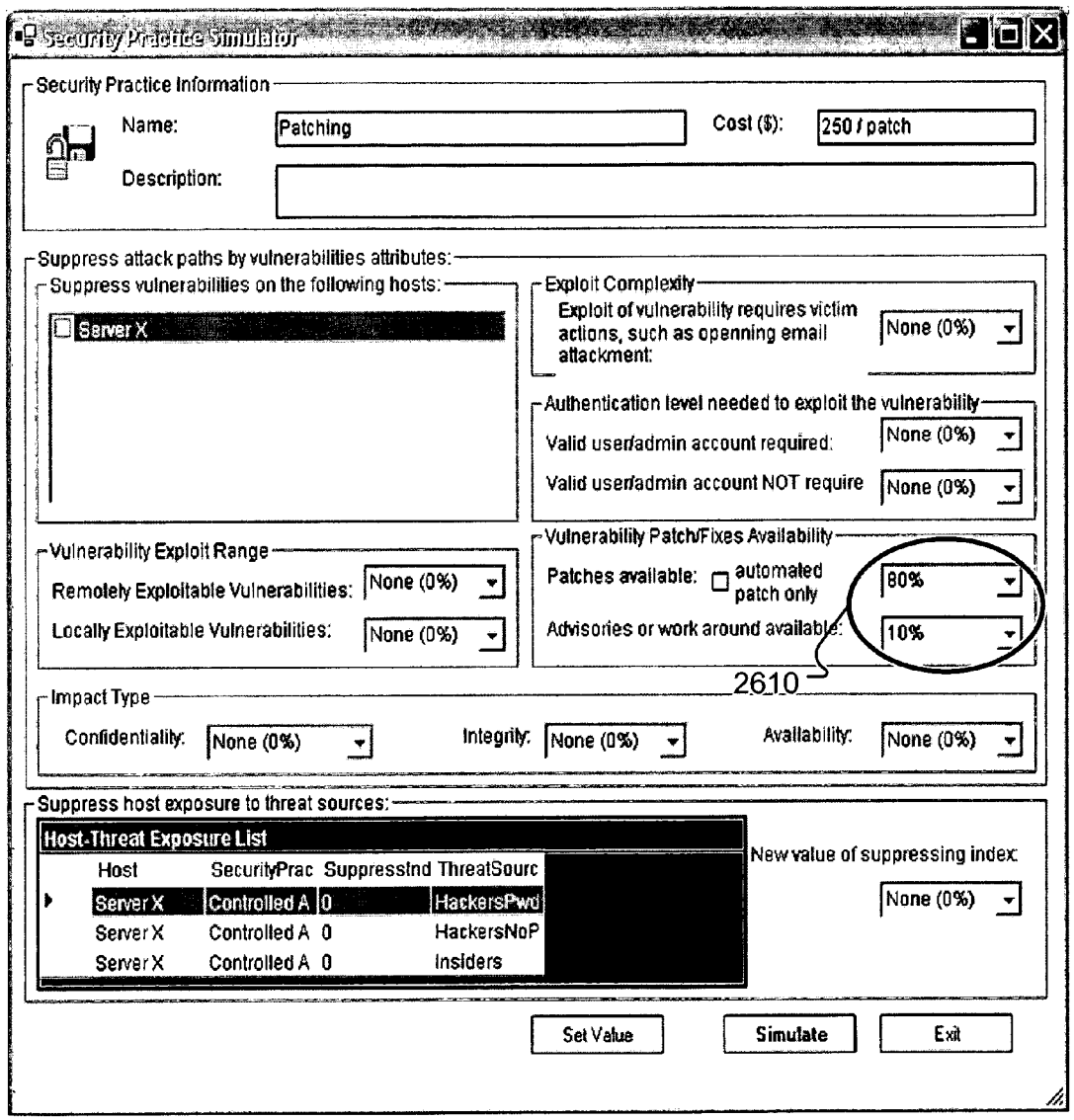
FIG. 26 shows an example screenshot from a T-MAP tool for evaluating the effectiveness of patching Server X.

For example, in the example case study, it was estimated that 90% of the threats from internet hackers (Attack Group AG1 and AG2) can be suppressed by firewall, thus the rows representing remote attackers are marked with 90% in column 1. The column of "Patch" 2532 under the "Security Investment Plans" 2530 column represents that when the plan is to patch COTS software, in practice, only about 80% of the patches are applicable because of system compatibility and stability considerations. The column of "User Ctrl." 2534 represents that by enforcing strict user account control, it can almost avoid all the attacks that need valid user account on Server X. In addition, by periodically changing system password and restricting system access, almost all insiders can be suppressed, for example about 90% of the total threat from unskilled hackers. Only about 10% of the skilled hackers can be suppressed. FIG. 26 shows an example screenshot from a T-MAP tool for evaluating the effectiveness of patching Server X. In particular, FIG. 26 shows a screenshot of a Security Practice Simulator in the T-MAP Tool.

The T-MAP assessment outputs for each security practice alternatives are summarized as follows. For Server X, the vulnerability of CVE-2005-1495, 2002-2089, 1999-0795, and 1999-0568 do not have patch or workaround immediately available. Assuming the top 80% of the vulnerability has applicable patches 2610, there is about 106*80% equals 85 applicable patches. Thus the cost of applying patches increases linearly along with the number of patches to apply at an approximate cost of $250 per patch.

Figure 27:
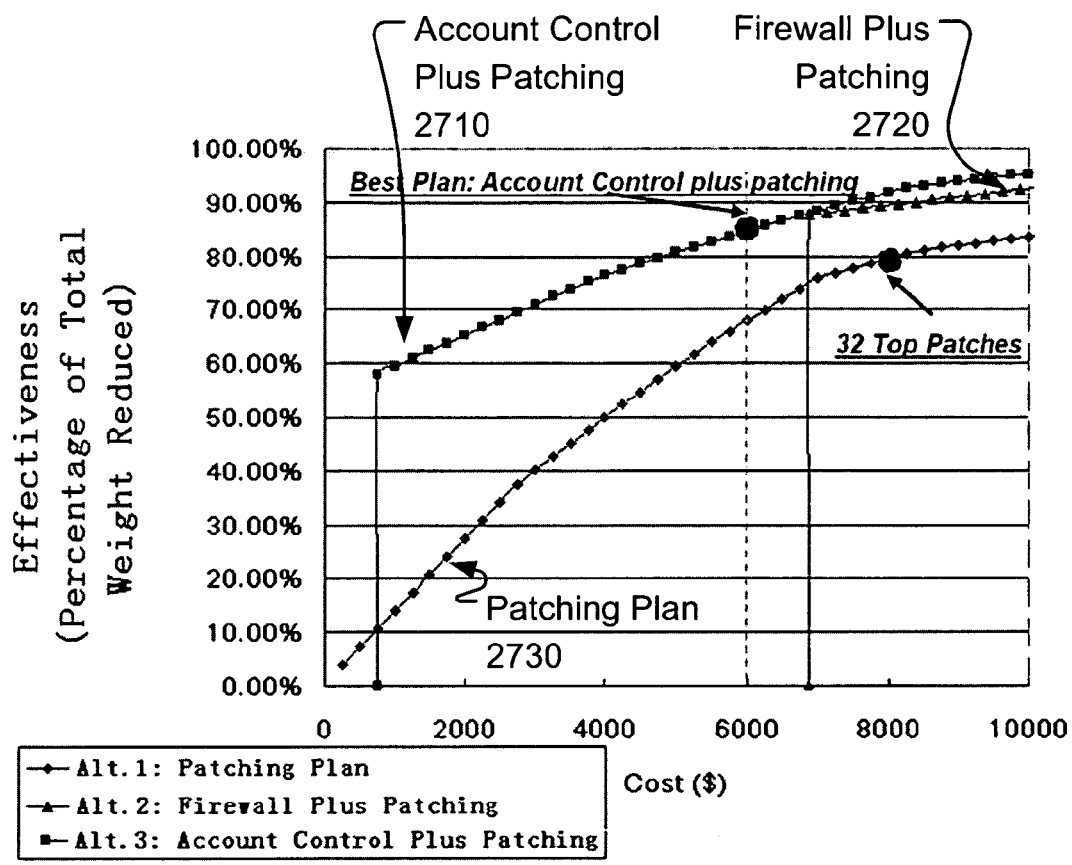
FIG. 27 shows a plot of an example optimal security practice plan.

In order to determine the optimal plan for a budget around $6,000, the relationship between investment effectiveness and the number of patches applied. FIG. 27 shows a plot of an example optimal security practice plan. The diamond shaped data symbol 2730 represents the effectiveness of a patching plan. The triangle shaped data symbol 2720 represents the effectiveness of a firewall plus patching. The square shaped data symbol 2710 represents the effectiveness of account control plus patching. Assuming the vulnerabilities that have higher ThreatKey values are fixed first, the security manager should first tighten the user account on Server X, and then patch the top 22 vulnerabilities to achieve the best Effectiveness while stay in the budget. According to the T-MAP output, the investment Effectiveness of this plan is 87.6%.

FIG. 27 does not directly identify the optimal amount to invest. As the percentage measure of the total threat weight is reduced by certain security practice, Effectiveness does not reflect the absolute value of security investment benefit, thus such cannot be directly used for Net Value analysis.

Figure 28:
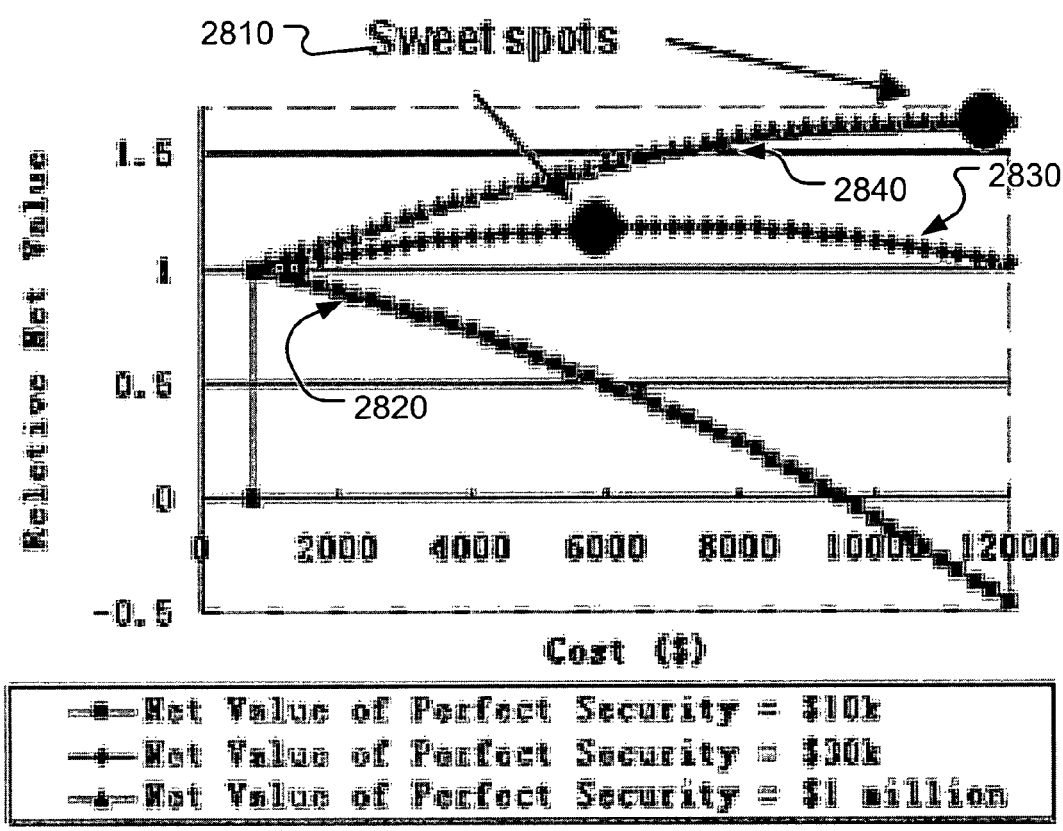
FIG. 28 shows a graph showing example sweet spots of investment.

To calculate effectiveness of security practice as described in FIG. 9 (reference no. 995), example sweet spots of investment are calculated. FIG. 28 shows a graph showing example sweet spots of investment. The square shaped data symbol 2820 represents the relative net value when the net value of perfect security equal $10K. The diamond shaped symbol 2830 represents the relative net value when the net value of perfect security is $30K. The triangle shaped symbol 2840 represents the relative net value when the net value of perfect security is $1 million. Under the assumption that Net Value (n)=A*Effectiveness(n)−Cost(n), where A is the net value of perfect security and n is the number of patches to apply, the Relative Net Value (RVN) analysis is plotted in FIG. 28 for Alt.2 for the example case study, where RVN(n)=NV(n)/NV (0). As shown in FIG. 28, the sweet spots 2810 are achieved at n where $$\frac{d\,RVN(n)}{dn} = 0.$$

The trend shown in FIG. 28 illustrate that as the value of perfect security increases, a higher optimal amount should be invested.

T-MAP Tool

An automated T-MAP software tool ("T-MAP tool") can be developed to take three inputs: (1) the general vulnerability information; (2) an organization's IT infrastructure information; and (3) how an organization's business values depend on its IT infrastructure. The T-MAP tool calculates a complete list of associated Attacking Paths, and outputs the overall threats in terms of the total weights of Attacking Paths. The T-MAP tool is designed to perform various function including: (1) Automate vulnerability information collection from multiple authority sources including NIST NVD, CERT, Symantec BugTraq, Microsoft, FrSIRT, SANS, ISS; (2) Allow security professionals to specify the COTS software in their IT systems from a comprehensive COTS software inventory list; (3) Prioritize COTS vulnerabilities under given stakeholder value/utility context; (4) Estimate the effectiveness of common security practices such as vulnerability patching, firewall, data encryption, etc.; 5) Export report data into a spreadsheet, such as Microsoft® Excel®.

Figure 29:
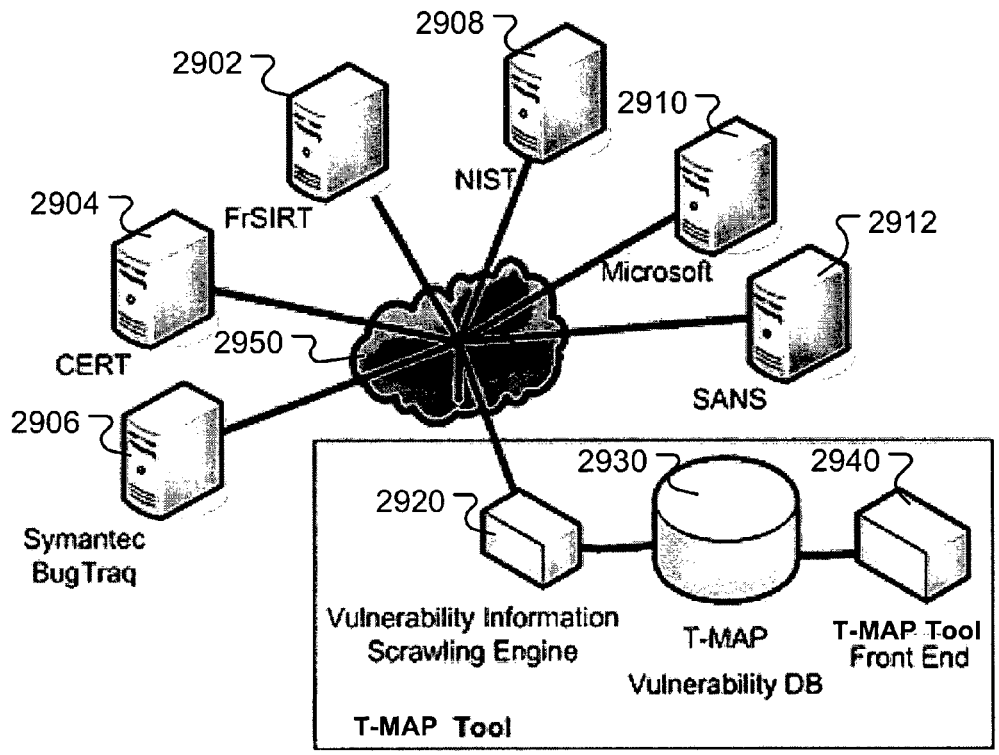
FIG. 29 shows an example component model of a T-MAP tool.

FIG. 29 shows an example component model of the T-MAP tool. The vulnerability information is collected from authority organizations 2902, 2904, 2906, 2908, 2910, 2912 through a scrawling engine 2920. The collected vulnerability information is stored into a vulnerability data repository, such as a database (DB). The T-MAP Tool Front End 2940 performs data analysis and interacts with system users. The information collected from the authority organizations 2902, 2904, 2906, 2908, 2910, 2912 can be collected from one or more computing systems, such as a server that supports each organization. Further these computing systems can be connected to the T-MAP Tool over a network 2950, such as the internet.

Figure 30:
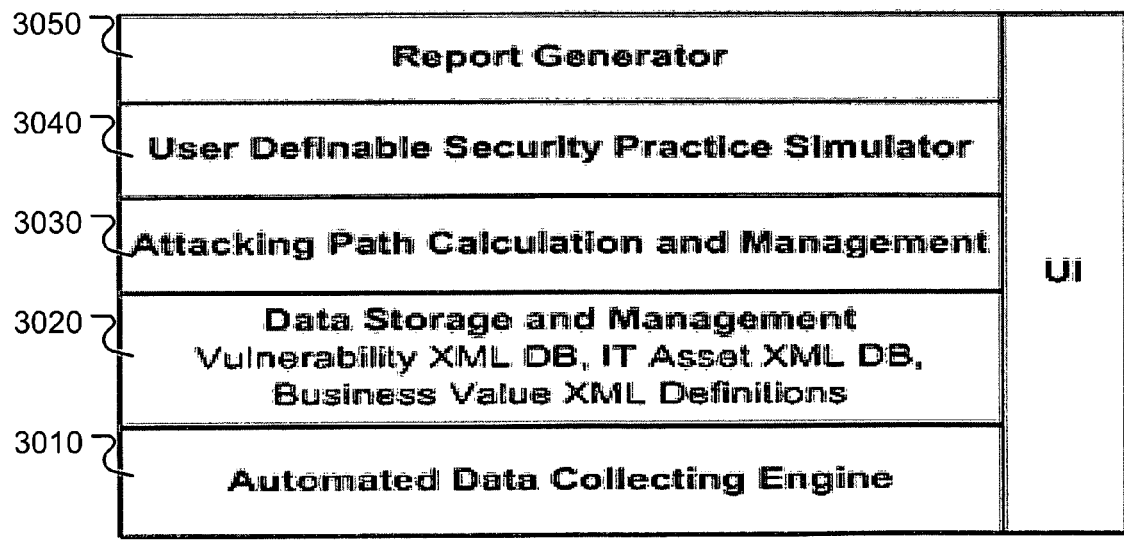
FIG. 30 shows an example layered software architecture employed by a T-MAP tool.

FIG. 30 shows an example layered software architecture employed by the T-MAP tool. The layered software architecture includes various layers 3010, 3020, 3030, 3040 and 3050. From the bottom to the top, the "Automated Data Collecting Engine" 3010 collects the latest published vulnerability reports from CERT/CC, NIST, SANS, SecurityFocus, Symantec, and Microsoft websites automatically, formats and populates the data into the second layer "Data Storage and Management" 3020. A sample database can contain information on numerous (e.g., 27,400) vulnerabilities that have been published on NIST since 1999 with extended information such as associated network ports, recommended solutions (by CERT, NIST, SecurityFocus respectively), if listed as top vulnerabilities by SANS, and so forth.

The "Data Storage and Management" layer 3020 includes an XML database implementing the ontology of vulnerabilities, IT asset computers, organizations' key business values, and the relationships among these entities. Through a Graphical User Interface (GUI), users can easily specify the types of operating systems and COTS software installed on their IT servers, and specify how organizations' core business values can be affected by security breaches such as compromises of confidentiality, integrity, and/or availability on different IT servers.

The "Attacking Path Calculation and Management" layer 3030 consumes the data provided in the "Data Storage and Management" layer 3020 to generate a complete list of Attacking Paths, and calculates the severity weights of Attacking Paths based on user input.

The "User Definable Security Practice Simulator" layer 3040 allows user to specify what kind of attacking paths can be blocked by certain security practices. This feature of calculating the total weight of attacking paths that are suppressed by certain security practices helps security managers estimate the effectiveness of different security practices.

The "Report Generator" layer 3050 organizes the system output into a spreadsheet, such as Microsoft® Excel® friendly format and save information upon user's request. This capability allows the users to leverage the data processing function provided by Excel® for further analyses.

Validation and Results

The foundation of T-MAP is based on effective COTS vulnerability prioritization under stakeholder value context. However, a stakeholder value is a subjective and complex concept by nature, and is very difficult to measure and quantify. Therefore, as an overall strategy, an empirical approach is implemented to validate T-MAP through real-world case studies by comparing the vulnerability priorities generated by T-MAP and the priorities generated by experienced security professionals.

IEEE defines accuracy as a quantitative measure of the magnitude of error. In T-MAP, prioritization errors are identified by a vulnerability ranking system through counting the mismatches between the priorities generated by the ranking system and the ones by experienced security professionals. Furthermore, inaccuracy is used as the metric to measure the performance of vulnerability ranking systems.

Specifically, when there are n software vulnerabilities in a COTS system S, say $v_1, v_2 \ldots v_n$, these vulnerabilities may already have been sorted. For example, these vulnerabilities may have already been sorted by the truth of priority from high to low under system stakeholder value context.

When ranking system R prioritizes the n vulnerabilities from high to low in a different order, say $v_{r1}, v_{r2} \ldots v_{rn}$, various processes are performed to measure the inaccuracy of ranking system R in prioritizing the n vulnerabilities.

Figures 31, 32:
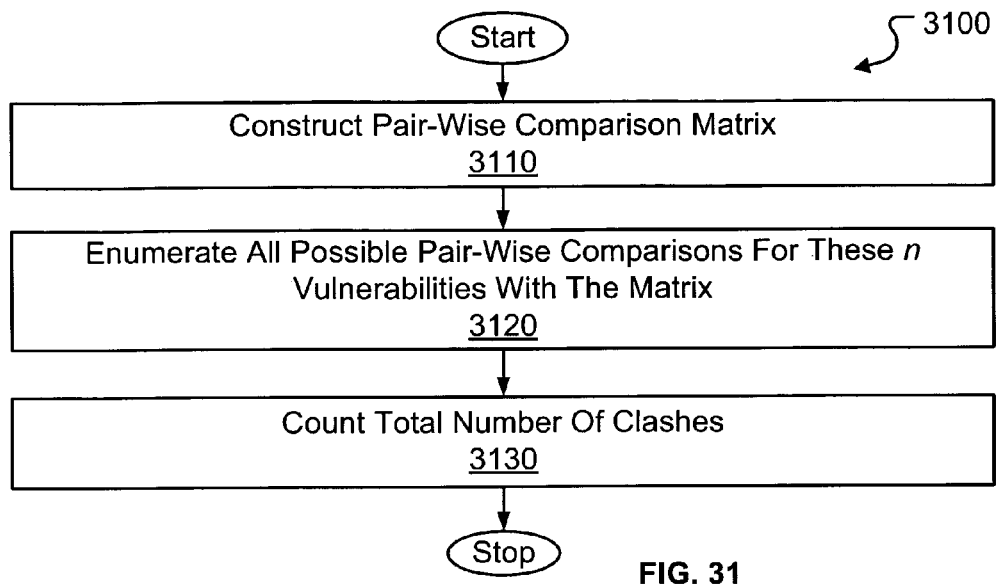
FIG. 31 is a process flow diagram showing an example process for measuring inaccuracy of ranking system R in prioritizing n vulnerabilities.
FIG. 32 shows an example pair-wise matrix.

FIG. 31 is a process flow diagram showing an example process 3100 for measuring inaccuracy of ranking system R in prioritizing n vulnerabilities. A pair-wise comparison matrix is constructed 3110. FIG. 32 shows an example pair-wise matrix, where $v_1, v_2 \ldots v_n$ are marked on each dimension of the matrix respectively. In particular, FIG. 32 shows prioritization clash counting.

Referring back to FIG. 31, all possible pair-wise comparisons are enumerated 3120 for these n vulnerabilities with the matrix. All enumerations can be listed by the dotted-lined cells in the above matrix (FIG. 32), wherein cell(a, b) represents the pair-wise comparison between $v_a$ 3210 and $v_b$ 3220. For each none-grey cell(a, b), if the priority order of $v_a$ 3210 and $v_b$ 3220 given by ranking system R clashes (or disagrees) with the truth priority order, then cell(a, b) is marked with an 'X' 3230. Thus, there are a total of $$C_n^2 = \frac{n*(n-1)}{2}$$

possible pair-wise comparisons whose results are recorded in the dotted-line cells in the comparison matrix.

In FIG. 31, the total number of clashes in the comparison matrix is counted and represented with the variable, m. Thus, the inaccuracy of ranking system R in prioritizing $v_1, v_2 \ldots v_n$ can be calculated by:

$$\text{inaccuracy} = \frac{m}{C_n^2} = \frac{m}{\frac{n*(n-1)}{2}} = \frac{2*m}{n*(n-1)}$$

The inaccuracy is a percentage between 0 and 1 (or 100%) representing the error ratio that ranking system R makes in prioritizing $v_1, v_2 \ldots v_n$.

Figure 33:
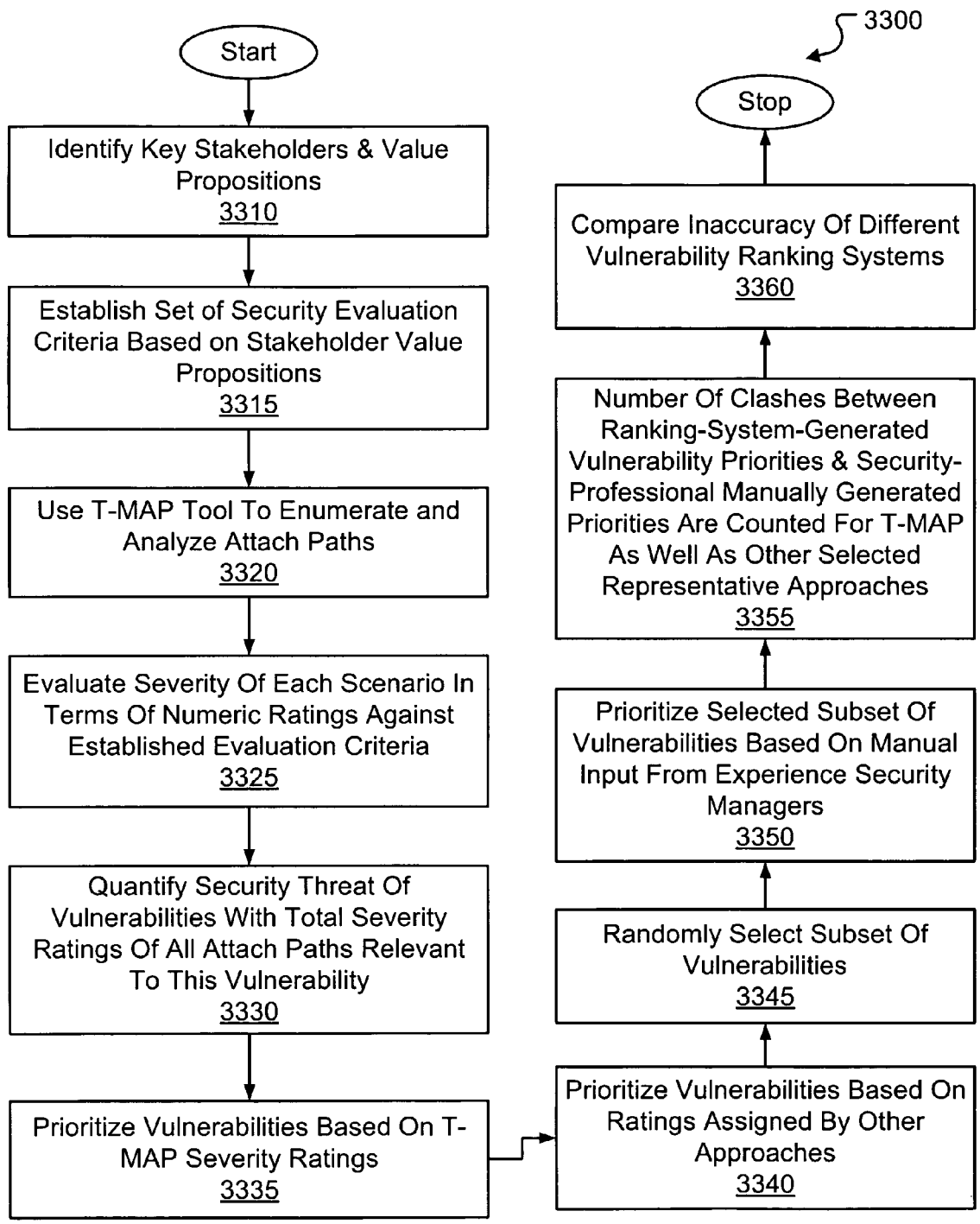
FIG. 33 shows an example process for conducting various case studies.

Validation of T-MAP is shown through three representative case studies: (1) the Server X case study conducted at the USC Information Technology Services division (ITS), (2) the Student Academic Progress Web System case study conducted at the Manual Art Senior High-school (MASH); and (3) the GreenBay Server case study conducted at CSSE. FIG. 33 shows an example process 3300 for conducting various case studies.

For each project, the system key stakeholders and value propositions are identified 3310. A set of security evaluation criteria is established 3315 based on stakeholder value propositions. The T-MAP tool is used to enumerate and analyze 3320 attack paths based on comprehensive COTS vulnerability database. The T-MAP Tool vulnerability database can maintain at least 27,400 vulnerabilities information.

The severity of each scenario is evaluated 3325 in terms of numeric ratings against the established evaluation criteria. The security threat of vulnerabilities is quantified 3330 with the total severity ratings of all attack paths that are relevant to this vulnerability. The vulnerabilities are prioritized 3335 based on their T-MAP severity ratings. Also, the vulnerabilities are prioritized 3340 based on the ratings assigned by representative of current leading approaches, such as BugTraq/Symantec, CERT, Microsoft, NIST, and SANS, if applicable. A subset of the vulnerabilities is randomly selected 3345 from the full vulnerability list. The selected subset of vulnerabilities are prioritized 3350 using manual input from experienced security professionals who have well understanding on both security vulnerabilities and the system stakeholder value propositions.

The number of clashes between the ranking-system-generated vulnerability priorities and the security-professional manually generated priorities are counted 3355 for T-MAP as well as other selected representative approaches.

Because of the subjective nature of stakeholder values/utilities, the truth of the right prioritization of vulnerabilities can be very difficult to obtain. Opinions are used on prioritization from experienced security managers as the best approximation to the truth. By doing so, a certain degree of threats is created to the validation process. Mitigation actions are proactively taken to minimize the threats to the validation process by carefully selecting the security professionals used. Then inaccuracy of different vulnerability ranking systems is compared 3360 to determine whether T-MAP is better than mainstream value neutral approaches.

Case Study Results and Evaluation

Results of the various example case studies are presented and evaluated to show the effectiveness of the T-MAP and its superiority over the value-neutral approaches in COTS security vulnerability prioritization. The results of each example case study are presented as follows.

First Example Case Study (Server X Case Study) Results

As the main demonstration example, the results of the ServerX case study are disclosed. The correctness of the economic analyses as shown in FIGS. 27 and 28 above relies upon a correct prioritization of COTS vulnerabilities. Thus, assuming security manager's ranking is a good approximation to the truth, the ability of T-MAP method to capture the security manager's opinion on vulnerability rankings in the Server X case study is described.

Figure 34:
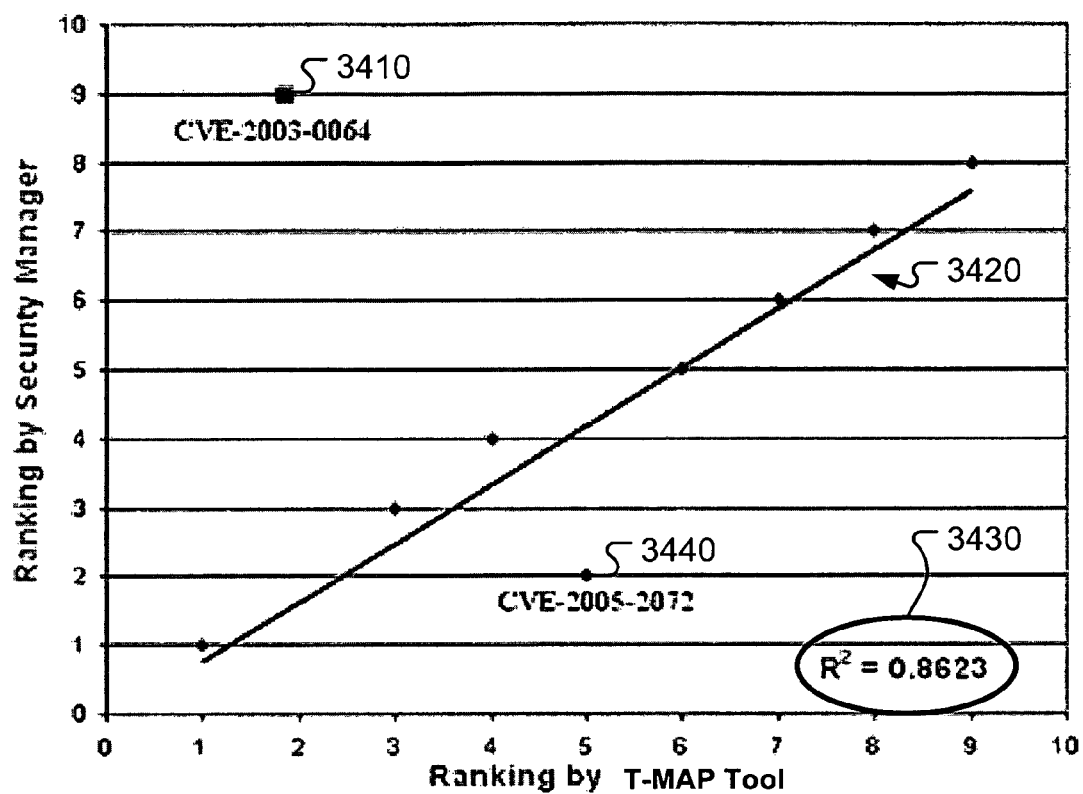
FIG. 34 shows an example comparison between manual rankings of a security manager and T-MAP rankings.

Particularly, a set of Server X vulnerabilities is sampled randomly from the T-MAP tool outputs. Then the security manager is asked to prioritize the sample vulnerabilities manually. FIG. 34 shows an example comparison between the manual rankings of the security manager and the T-MAP rankings. Excluding the irrelevant outlier of CVE-2003-0064 3410, the total number of clashes counting is 2. The total number of pair-wise comparisons made equals $C_8^2 = 1 + 2 + \ldots + 7 = 28$. Thus, the prioritization inaccuracy equals 2/28=7.1%. The regression line 3420 shows an R 3430 square value of 0.86 indicating a strong fit. The security manager ranked CVE-2003-0064 as the lowest priority because the relevant application "dtterm" is not enabled on Server X at all. The security manager ranked the CVE-2005-2072 3440 at a higher priority because a program is running as "setuid" with root privilege on Server X, which involved more security risks.

Furthermore, in comparisons between the security manager's and the T-MAP's outputs of the priorities of "organization values under most threat" and "top attackers", the T-MAP tool generated results well matching the security manager's opinions. The T-MAP tool's recommended optimal plan is convincing to the security manager and matched the experience on the Server X security context.

Referring back to FIG. 27, the economic curve shows that the top 30.2% vulnerabilities (32 out of 106) caused about 80% of the total threat in this case study. This result moderately matches the well known "20/80 rule" in security risk assessment. The top vulnerabilities identified by the T-MAP tool well met the security manager's experience except for a few outlier vulnerabilities that are associated with disabled services.

Second Example Case Study (Manual Art Senior High School (MASH)) Case Study Results Another case study was conducted on the Student Academic Progress Web System at the Manual Art Senior High School in Los Angeles. The system in this second case study example attempts to "provide a secure, user-friendly and always-available system to its students, and especially, their parents so that the website (i.e., website system) can be used at home, at local libraries or anywhere the Internet is available to help them understand where students stand vis-à-vis LAUSD graduation requirements, and allow them to realistically assess whether or not they are in the running for admission to specific sets of colleges."

Similar to the ServerX example, the following are performed: (1) the system stakeholder value propositions are identified, (2) the COTS security vulnerabilities with T-MAP are prioritized, and (3) the T-MAP priorities are computed with the network administrator's prioritization on a subset of randomly-selected vulnerabilities. The results for this second example are presented as follows.

Stakeholders and Values Propositions

FIG. 35 shows example system key stakeholder value propositions. In FIG. 35, the key stakeholders are identified as S1, S2 and S3. S1 represents MASH students; S2 represents student parents; and S3 represents school academic counselors. FIG. 35 includes the weight criteria in the first column 3510. In addition, the relevance of the weight criteria 3510 for each stakeholder is identified in the second column 3520. The "+" symbol represents that the criterion is relevant. The "++" symbol represents that the criterion is highly relevant. The criteria weights are derived from AHP through interviewing with the system administrator. Further, the organizational value description 3530 for each weight criterion is shown.

Through the interview, privacy is found to be not the primary concern of this system because there is no sensitive information involved in the system such as a social security number (SSN). However, there is a high requirement for the system to provide accurate student academic information so that student parents can easily access their children's academic progress at the high school.

FIG. 36 is a table showing example evaluation scores for possible security breach scenarios. Based on the system stakeholder value context, the severity score is derived of possible security breach scenarios through AHP. FIG. 36 shows in the first column, the weight criteria 3610. Then, the severity scores are shown for "confidentiality" 3620, "integrity" 3630 and "availability" 3640. In addition, the evaluation scores 3650 are shown for "confidentiality" 3620, "integrity" 3630 and "availability" 3640.

COTS Components

FIG. 37 is a table showing example COTS components. As a MS Windows based system, the COTS components in MASH Server of the second example are listed in the table shown in FIG. 37.

Vulnerability Ranking Comparison—System Manager vs. T-MAP

Figure 38:
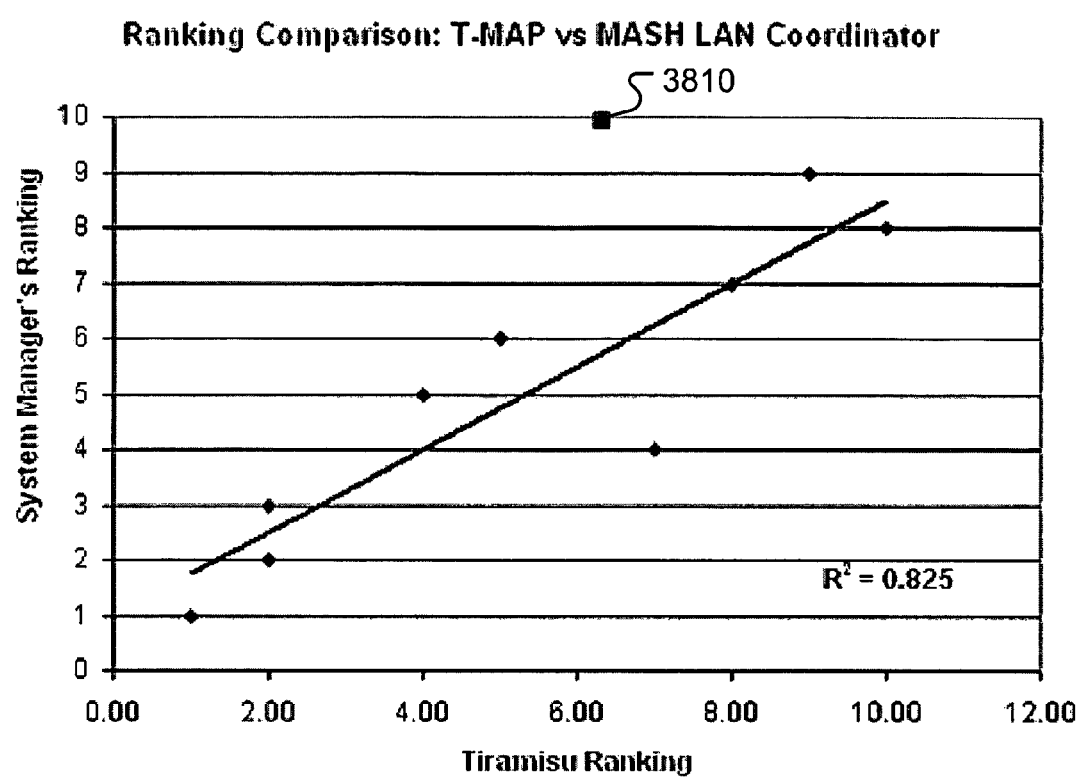
FIG. 38 shows a plot showing example comparison of the system manager's rankings against the T-MAP rankings.

With the above stakeholder value proposition and COTS information as input, T-MAP identified 94 system vulnerabilities in total in the second example. Twelve vulnerabilities are selected randomly from the list and the system manager is asked to prioritize them. In the second example, the system manager has 29 years experience in computer systems, network administration, and security. FIG. 38 shows a plot showing example comparison of the system manager's rankings against the T-MAP rankings.

As shown in FIG. 38, excluding the outliers, the total number of clash counting for T-MAP is 4. The total number of pair-wise comparisons made equals $C_9^2=1+2+\ldots+8=36$. Thus the prioritization inaccuracy equals 4/36=11.1%. The R square value of 0.825 between T-MAP ranking and the system manager's ranking indicates a strong fit. Of the 12 selected vulnerabilities, 3 are identified as outliers. Two of the outliers are associated with disabled services and not relevant. For illustration purpose, only one 3810 of the outliers, the CVE-2005-1214 is shown. The system manager assigned CVE-2005-1214 low priority because the system manager was very confident that the local system users will not make such mistakes that are necessary to enable such an exploit.

Third Example: CSSE Greenbay Server Case Study Results

Greenbay is a mission critical web server at CSSE. Greenbay provides web services to the CSSE hosted graduate level Software Engineering course which involves about 200-300 graduate students each year. As a key eServices projects collaboration point, Greebay also serves as a file server for about 20-30 on-going CSSE eServices projects each year that involves the CSSE clients from a wide range of organizations across academic, industry, and none-profit sectors, for example, the USC Library, IBM/Rational, African Millennium Foundation, etc. Besides the supports to CSSE Software Engineering course and eServices projects, Greenbay is the file server for several research projects conducted at the center as well.

Stakeholders and Values Propositions

FIG. 39 shows the system key stakeholder value propositions for Center for Systems and Software Engineering (CSSE) GreenBay case study example. In FIG. 39, the key stakeholders are identified as S1, S2 and S3. S1 represents researchers such as faculties and other CSSE researchers; S2 represents graduate students; and S3 represents CSSE eServices projects clients. FIG. 39 includes the weight criteria 3910 in the first column. In addition, the relevance 3920 of the weight criteria 3910 for each stakeholder is identified in the second column. The "+" symbol represents that the criterion is relevant. The "++" symbol represents that the criterion is highly relevant. The criteria weights are derived from AHP through interviewing with the CSSE system administrator and a CISSP security expert at CSSE.

Through the interview, the system key stakeholders are identified as researchers, graduate students, and the CSSE eService projects clients. The system security has strong impacts on the daily research and teaching activities. In addition, system security may affect the CSSE reputation because of the involvement of eService projects clients and large number of students. The regulation violation is not a concern for this system.

FIG. 40 shows derived severity scores for possible security breach scenarios. The severity score of possible security breach scenarios are derived through AHP based on the stakeholder value context.

FIG. 40 shows in the first column, the weight criteria 4010. Then, the severity scores are shown for "confidentiality" 4020, "integrity" 4030 and "availability" 4040. In addition, the evaluation scores 4050 are shown for "confidentiality" 4020, "integrity" 4030 and "availability" 4040.

COTS Components

FIG. 41 is a table showing example COTS components. As a Linux based system, the COTS components in CSSE Greenbay Server are listed in the table shown in FIG. 41.

Vulnerability Ranking Comparison—System Manager vs. T-MAP

Figure 42:
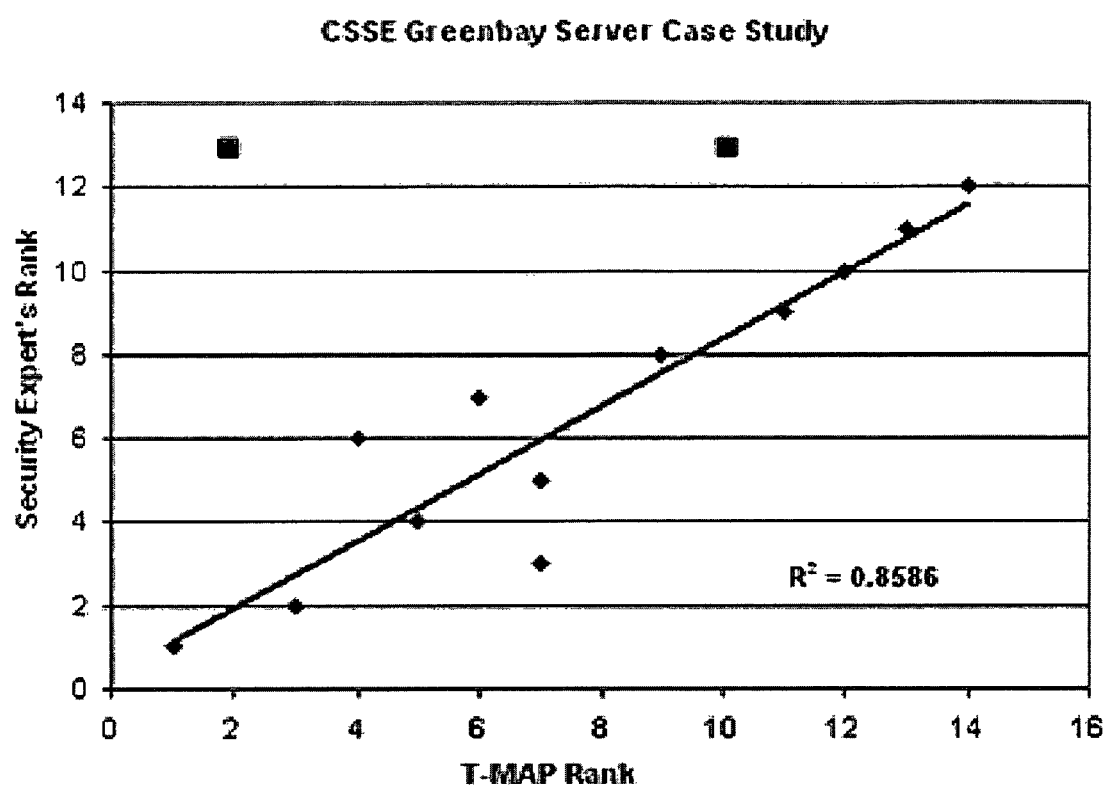
FIG. 42 shows an example comparison of the security expert rankings against the T-MAP output.

Based on the above stakeholder value proposition and COTS input, T-MAP identified 44 system vulnerabilities for the system for the third example case study. A total of fifteen vulnerabilities are selected randomly from the list and a CISSP certified security expert at CSSE is asked to prioritize them. The rankings of the security expert are compared with T-MAP output. FIG. 42 shows an example comparison of the security expert rankings against the T-MAP output.

As shown in FIG. 42, excluding the outliers, the total number of clash counting is 7. The total number of pair-wise comparisons equals $C_{12}^2=1+2+\ldots+11=66$. Thus, the prioritization inaccuracy equals 7/66=10.6%. The R square value of 0.86 between T-MAP ranking and the system manager's ranking indicates a strong fit. Of the 14 selected vulnerabilities, 2 are identified as outliers and thus not relevant to the system. For example, one of the outliers is identified as associated with the disabled Certificate Revocation List services which are not relevant. The other outlier is only exploitable by local users through complicated steps, which is very unlikely to happen according to the security expert.

Comparison of T-MAP with Value-Neutral Approaches

To test whether T-MAP, the proposed stakeholder value sensitive approach, can outperform the value-neutral approaches, the prioritization inaccuracy is measured and compared across the vulnerability ranking systems of T-MAP and the value-neutral approaches in the three example case studies described above. For example, the value-neutral approaches can include CVSS v2.0, CVSS v1.0, IBM ISS, and Microsoft.

Figure 43:
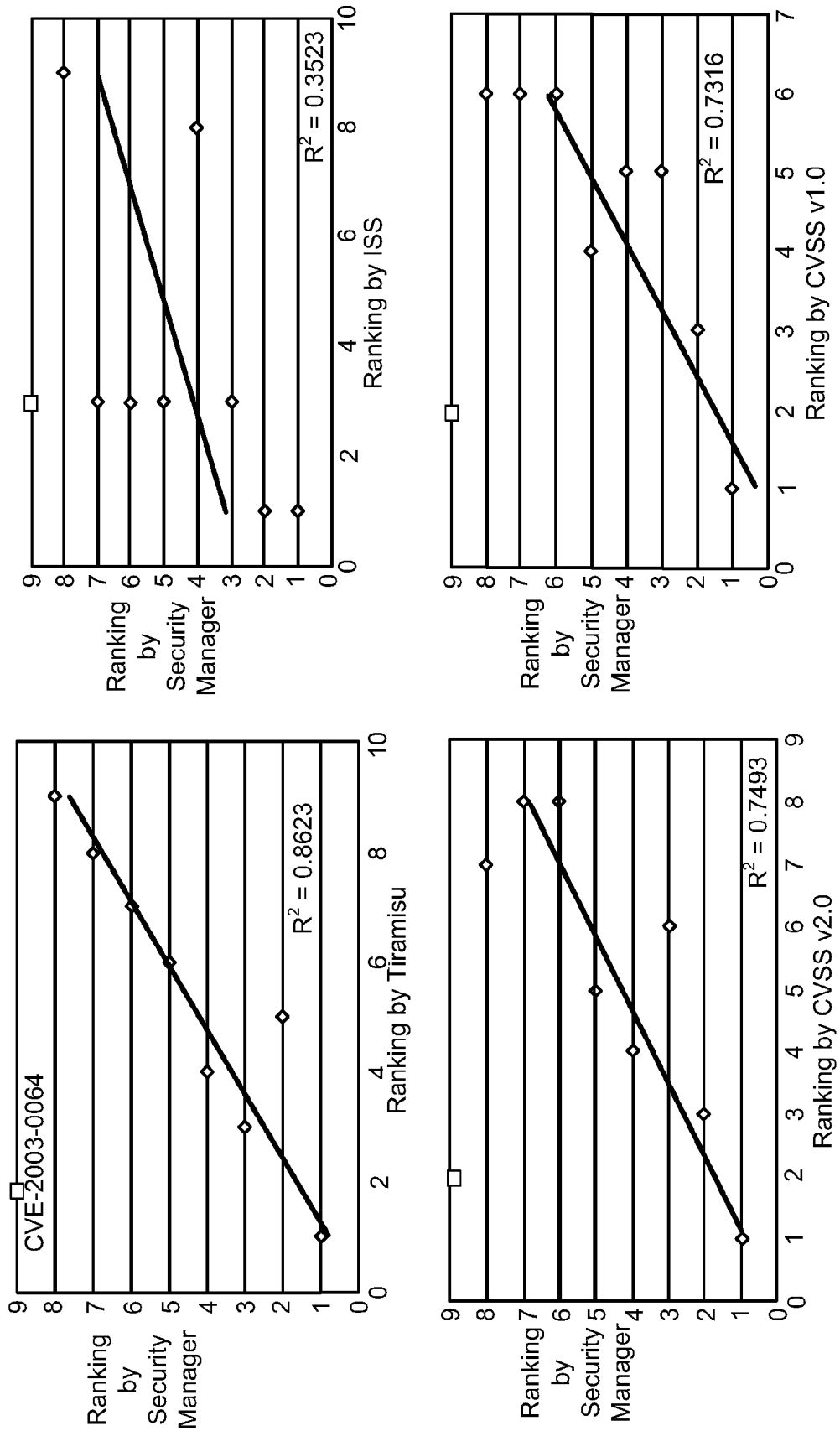
FIG. 43 shows an example T-MAP vs. Value Neutral Approaches comparison for a first example case study.
Figure 44A:
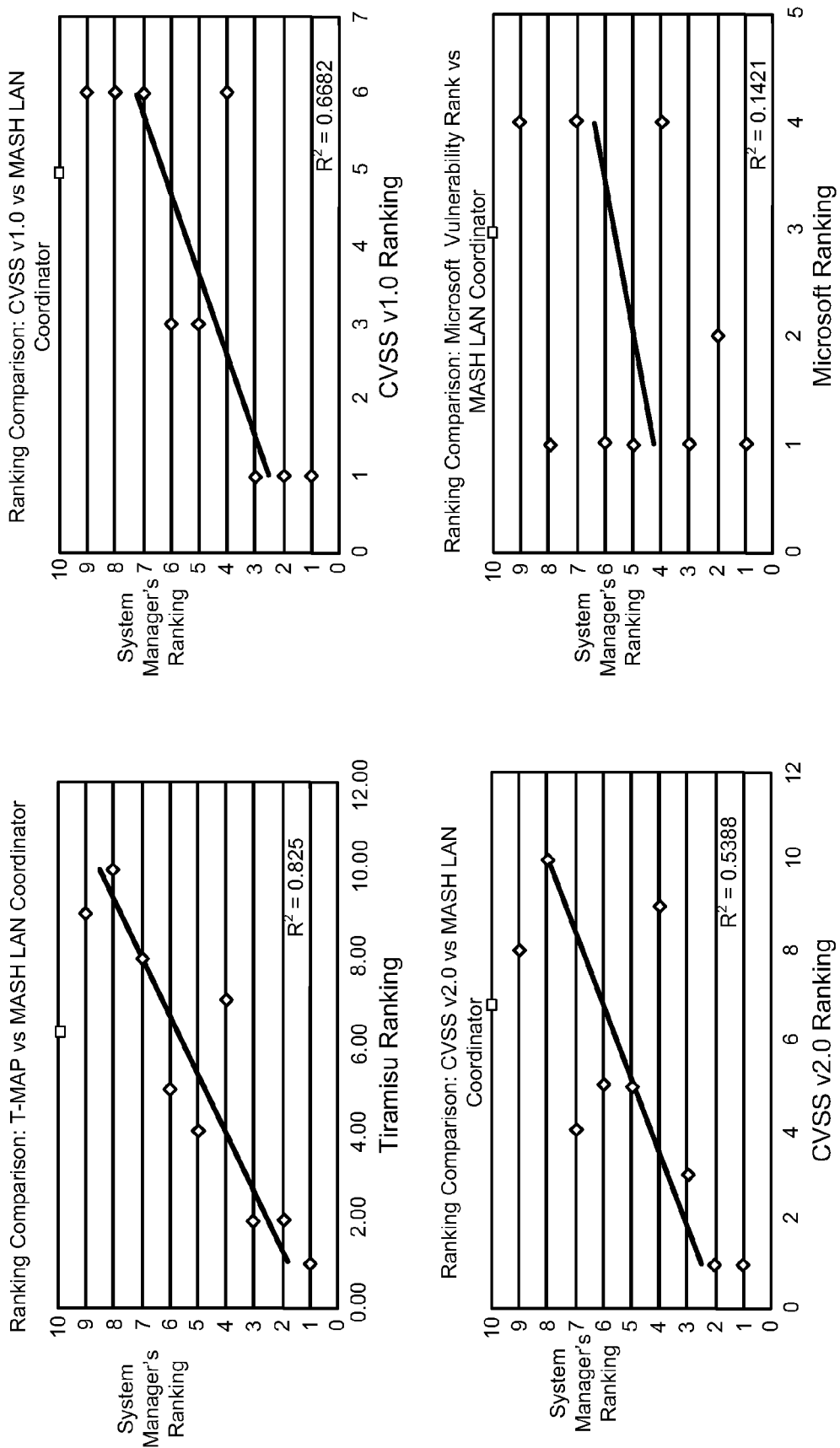
FIGS. 44a and 44b show an example T-MAP vs. Value Neutral Approaches comparison for a second example case study.
Figure 44B:
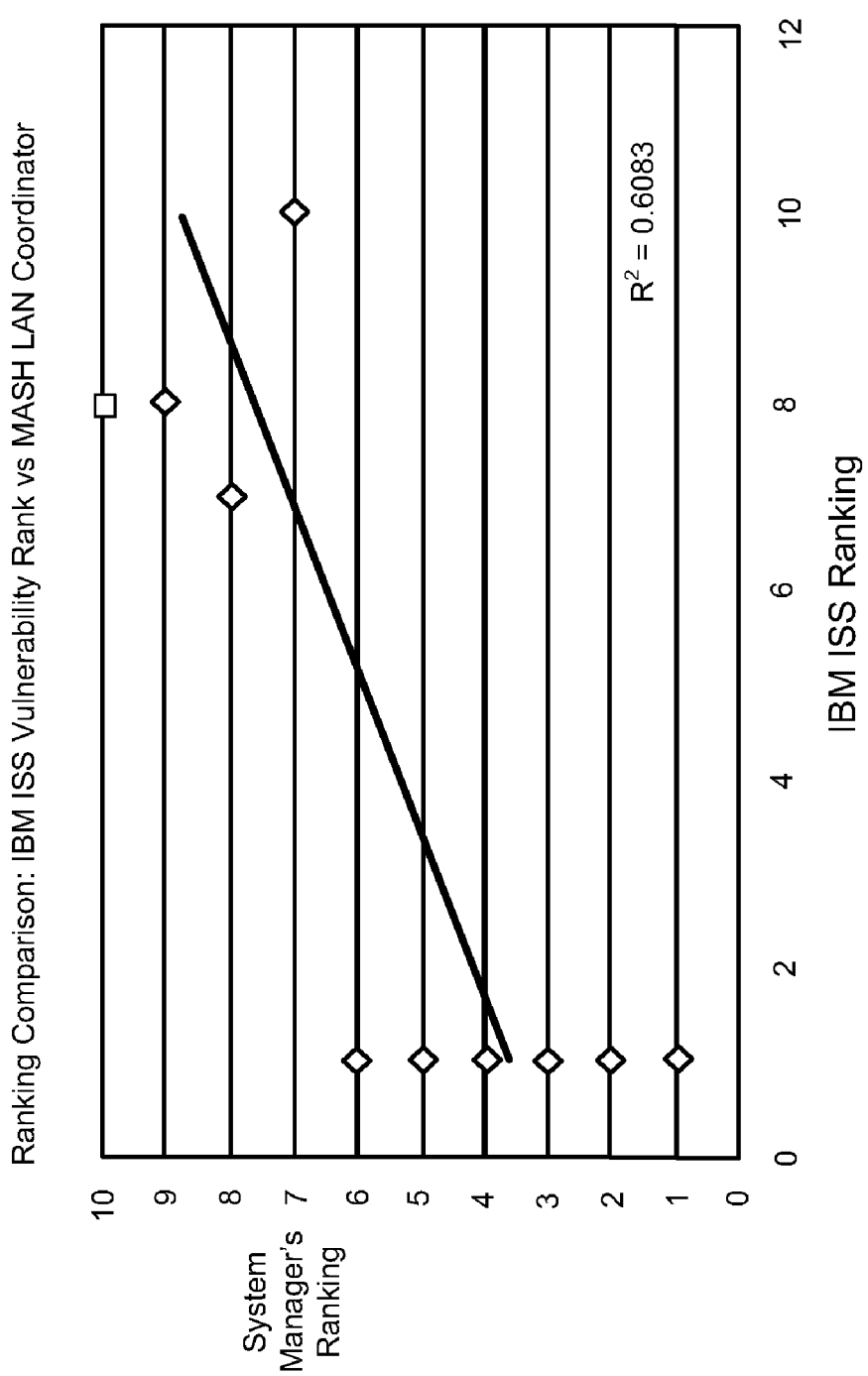
Figure 45:
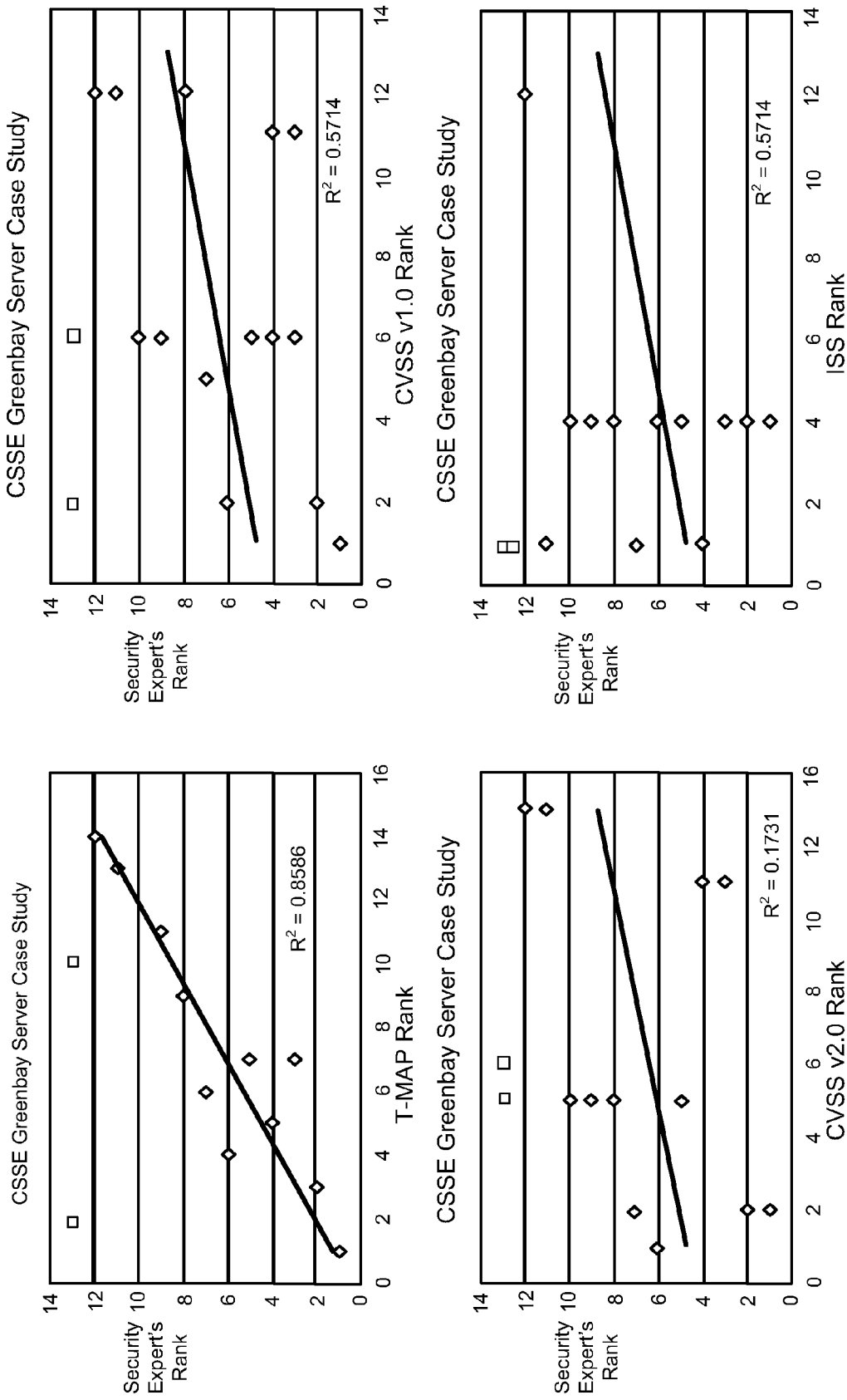
FIG. 45 shows an example T-MAP vs. Value Neutral Approaches comparison for a third example case study.

FIGS. 43, 44a. 44b and 45 show the comparison results. FIG. 43 shows an example T-MAP vs. Value Neutral Approaches comparison for the first example case study. FIGS. 44a and 44b show an example T-MAP vs. Value Neutral Approaches comparison for the second example case study. FIG. 45 shows an example T-MAP vs. Value Neutral Approaches comparison for the third example case study.

FIG. 46 is a table showing example comparisons that compares the prioritization performance across T-MAP and other value neutral approaches. Both CVSS v2.0 and CVSS v1.0 rankings are collected from the default score (base score) recommended in the NIST National Vulnerability Database (NVD). The case study data is categorized by columns. The ranking approaches are listed by rows. Some of the cells are marked with "N/A" because not all the vulnerabilities involved in the case study are available in the corresponding ranking system and thus the rankings data is not available. For example, the COTS systems for the first example case study (ITS Server X) and the third example case study (CSSE GreenBay) are Unix/Linux based systems. Thus, the vulnerabilities in these two systems are not available in the Microsoft vulnerability database.

Figure 47:
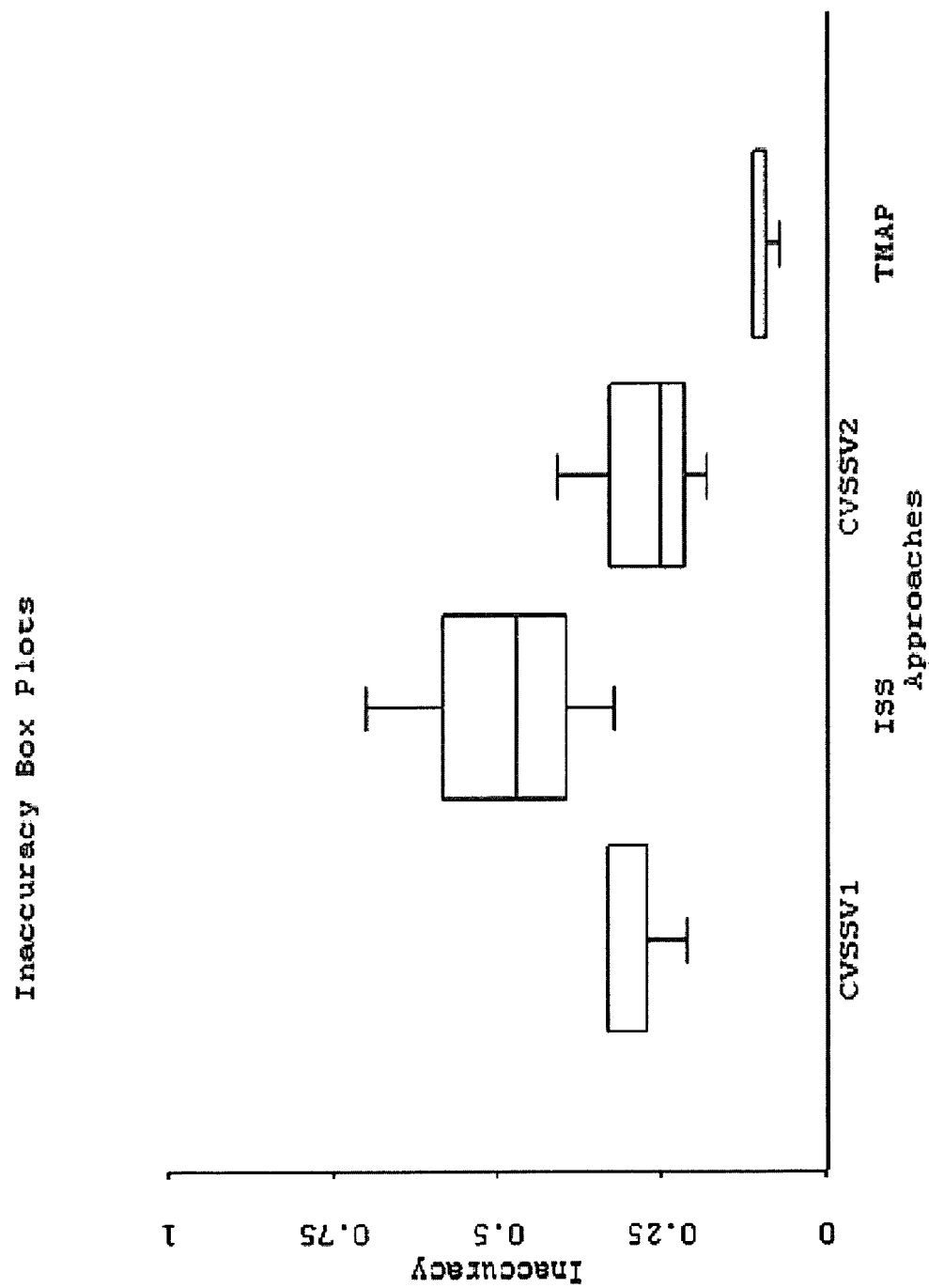
FIG. 47 shows example box plots of inaccuracy comparison results.

FIG. 47 shows example box plots of inaccuracy comparison results. The results illustrated with the example box plots demonstrate that compared to the existing mainstream value-neutral approaches, T-MAP achieved the lowest inaccuracy in all three case studies.

Across all three example case studies, a total number of 28+36+66=130 pair-wise comparisons were made between the security professional's priority and the ranking system recommended priority. The total number of clashes for T-MAP, CVSS v2, CVSS v1, and IBM ISS are 13, 41, 40, and 72 respectively. The overall inaccuracies for these approaches are 10.0%, 31.5%, 30.8, and 55.4%, respectively. T-MAP achieved the lowest overall inaccuracy of 10.0%.

In addition, T-test can be conducted on the three example case studies to analyze the inaccuracy differences between T-MAP and other value-neutral approaches respectively. However, because the T-test is conducted based on a limited number of case studies (3), the results may not be generalized in a statistical sense.

The analysis of the results show that T-MAP achieved a noticeably lower inaccuracy than the other value-neutral approaches in all three empirical case studies described above. Based on the 130 pair-wise comparisons made between the priorities generated by security professionals and ranking systems across all case studies, the T-MAP achieved the lowest overall inaccuracy of 10%, compared to the overall inaccuracy value of 31.5% by CVSSv2, 30.8% by CVSSv1, 55.4% by IBM ISS, and 58.3% by Microsoft®. The inaccuracy measurement to Microsoft® vulnerability ranking system is based on 36 pair-wise comparisons from one case study only. As a baseline, these results can at least serve as empirical evidences that T-MAP outperformed other mainstream value neutral approaches in COTS security vulnerability ranking.

Reasons for Ranking Mismatches

For the three case studies describe above, T-MAP may over-estimate and/or under-estimate rankings compared to the security professional's ranking. The ranking mismatches can be cause by various reasons. For example, mismatches can be due to disabled services/programs. Vulnerabilities that are associated with disabled programs are considered to be less important or even irrelevant. Mismatches can be due to the importance of running services. Security professionals tend to assign the vulnerabilities associated with critical operating system services higher rankings. Also, mismatches can be due to security professional's self-confidence on handling vulnerabilities. In addition, the pre-conditions of exploiting a vulnerability may be different. When the security professional is very confident that certain pre-conditions will not be easily met in his environment, he may assign the vulnerability lower rankings and vice verse.

In some instances, mismatches can be due to privileges of running programs. Not all programs are running with the default privileges. Security professionals tend to assign the vulnerabilities associated with high privileges higher rankings and vice verse. Further, Security manager's confidence on insiders may lead to mismatches. For example, how much security professionals trust the insiders and the insiders' technical skills may affect the rankings for the locally-exploit-able-vulnerabilities.

Factors That Affect Validity

Various factors can affect the T-MAP validity. For example, the number of example case studies that can be accomplished is limited for a given period of time. Only three example case studies have been presented. To show the effectiveness of T-MAP, additional studies can be performed to strengthen the results of T-MAP.

Various operations can be performed to mitigate the effect of limited example case studies used. For example, diverse COTS systems are selected from different platforms. Specifically, the three example case studies are conducted on Unix, Linux, and Windows based platforms respectively. Also, representative systems are selected and case studies are conducted with experienced security professionals to assure the quality of the case study data. Example case studies are conducted from real life systems.

Also, using the security manager's opinion as an approximation of the truth may add bias to the results. For example, stakeholder value/utilities are largely subjective by nature and can be difficult to measure objectively. In the three case studies described above, the security professional's opinions is used as the approximation of truth to evaluate the performance of vulnerability ranking systems.

To minimize the bias introduced to the validation process, the example case studies are conducted with experienced security professionals who are not only knowledgeable in security and vulnerability technologies, but also familiar with the organization value propositions. Such experienced security professionals can lend opinions that can serve as a better approximations of the truth.

FIG. 48 shows an example summary of the profiles of security professionals who participated in the example case studies. The average number of years of experience in security technology and the organization of security professionals is 11.66 years and 10.33 years, respectively. In addition, two out of three security professionals who participated our the example case studies are CISSP holders.

Further, the comprehensiveness of T-MAP vulnerability database 2930 can affect the results. T-MAP needs a comprehensive and up-to-date vulnerability database to generate meaningful results. The contents of the T-MAP vulnerability database 2930 is generated based on the current National Vulnerability Database, the largest publicly accessible vulnerability database maintained by NIST. In addition, an automated tool, the scrawling engine 2920 has been developed to scrawl Internet resources across authority organizations such as ISS, Microsoft, SANS, CERT, NIST/CVSS, Symantec BugTraq to grow and maintain an update-to-date vulnerability database critical to T-MAP. The database 2930 can contains at least 27,400 COTS vulnerability information.

Using T-MAP over Software Life-cycles

T-MAP is designed to (1) prioritize COTS security vulnerabilities with respect to stakeholder value context; (2) evaluate the security performance of COTS candidates; and (3) estimate the effectiveness of common security practices such as Firewall, Patching, and Data Encryptions. In addition, techniques and systems as described in this specification can be implemented to determine when and how T-MAP can be used in system and software life-cycle to maximize the value of T-MAP. T-MAP can be used in different software/system life-cycle processes in COTS intensive system development. In particular, T-MAP can be useful in at least following four representative software/system life-cycle models: (1) Boehm's spiral model [Boehm, B. W. (May 1988). "A Spiral Model of Software Development and Enhancement." IEEE Software]; (2) ISO 15288 system engineering life-cycle model [ISO 15288 (2002). Systems Engineering-System Life Cycle Processes]; (3) Royce's Waterfall model [Royce, Winston (August, 1970). "Managing the Development of Large Software Systems." Proceedings of IEEE WESCON 26]; and (4) Boehm's Incremental Commitment Model [Barry W. Boehm, Jo Ann Lane (October 2007). "Using the Incremental Commitment Model to Integrate System Acquisition, Systems Engineering, and Software Engineering." Crosstalk].

FIGS. 49, 50, 51 and 52 show example summaries for using T-MAP in Boehm's Spiral Model, ISO 15288 System Engineering Life-cycle Model, Royce's Waterfall Model and Boehm's Incremental Commitment Model (ICM). In each of FIGS. 49-52, the T-MAP capabilities are categorized into various columns including: (1) Vulnerability Prioritization 4910, 5010, 5110 and 5210; (2) COTS Evaluation and Selection 4920, 5020, 5120 and 5220; and (3) Effectiveness Estimation of Security Practices 4930, 5030, 5130 and 5230. The phases of each life-cycle model are listed in rows. The potential scenarios that T-MAP can help are described in the corresponding FIGS. 49-52.

Value Sensitive Firewall Rule Generation

Firewall is one of the most popular security practices that have been widely adopted for IT protections. According to the 2006 CSI/FBI survey, 98% of the organizations that participated in the survey deployed Firewalls. However, configuring Firewall policies can be fallible and effort consuming.

Ideally, a perfect set of Firewall rules should be implemented to open exactly the necessary network ports and blocks all others. In practice, the ideal status is difficult to achieve because setting up controls for every network port may involve a large volume of rules.

Implementing such a large volume of rules can significantly decrease the packet forwarding throughput on Firewalls and routers. In addition, maintaining Firewall rules can become more difficult and fallible. For example, the practical number of manually maintainable Firewall rules for single Firewall can be around 50-150.

However, in some instances, reducing the number of Firewall rules can also have negative effects. For example, reducing the number of Firewall rules can limit the granularity of control on network ports and may significantly increase system security risks by opening unnecessary ports. Thus, an ideal number of Firewall rules should determined to balance the various tradeoffs between (1) security and maintainability; and (2) security and usability.

Firewalls may be configured based on the security administrator's experience or best knowledge on vulnerability exploits through network ports. Instead, value-sensitive Firewall rules are generated based on T-MAP.

Security Risk Distribution Over Network Ports

Figure 53:
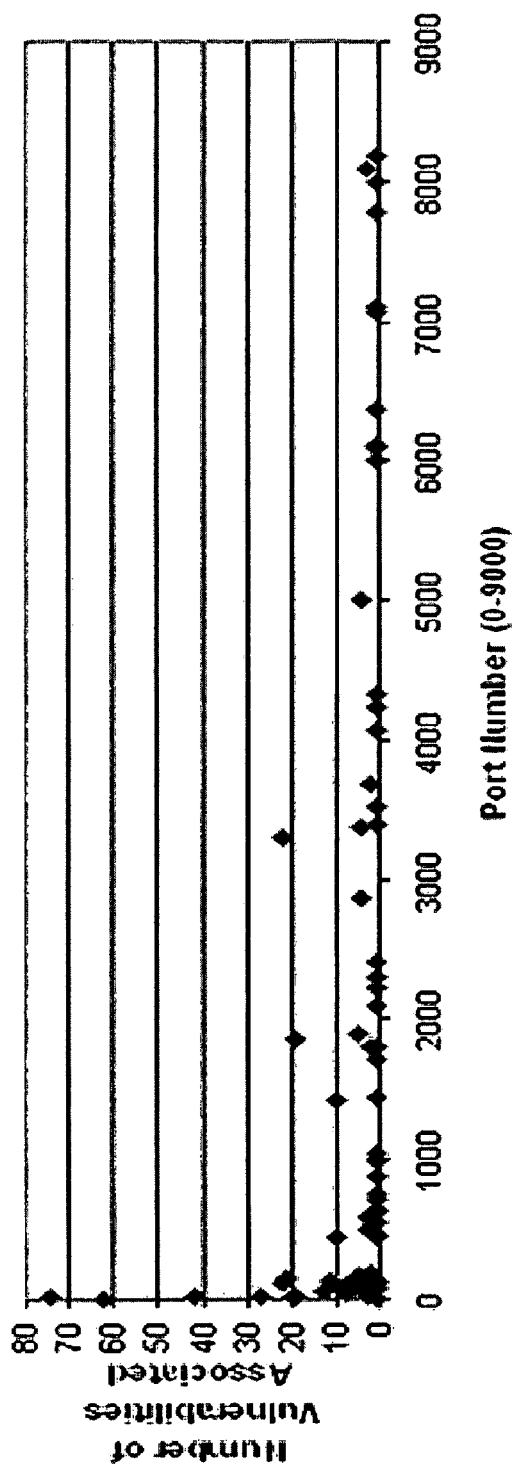
FIG. 53 shows an example distribution of vulnerabilities over network port numbers.

Different network ports are associated with different risks. The port information is collected for numerous COTS vulnerabilities. As an example, port information is collected for 717 COTS vulnerabilities that were published between 1999 and 2006. FIG. 53 shows an example distribution of vulnerabilities over network port numbers. The X axis represents the TCP/UDP port number, and the Y axis represents the number of vulnerabilities that are associated with the port. The only outlier that is not included is Port 80. Port 80 is associated with 347 vulnerabilities which is significantly higher than other ports. The plot in FIG. 53 shows that opening the ports between 0-1000 is highly risky in general.

How system stakeholder values may be impacted by security vulnerabilities also drives the risk distribution over network ports. Attackers can penetrate network port(s) through Firewalls. In addition, attackers can exploit system vulnerabilities that are accessible through the port(s). Further, attackers can damage the victim's systems and compromise system stakeholder values. So, different network port may be presented with different security risks depending on not only the vulnerabilities associated to the port, but also on the way the vulnerabilities may impact stakeholder values.

Stakeholder Value Driven Automated Firewall Rule Generation based on T-MAP

Ideally, a good Firewall rule set should suppress as much as possible risks with as less as possible number of rules. A stakeholder value driven approach based on T-MAP can be implemented to automatically generate Firewall rules and maximizes risk suppression.

Abstracting Firewall Rules

Firewall rules may specify whether data packets that go through a range of adjacent network ports should be permitted or denied. For simplicity, Firewall rules are selected to have the same protocols and source/destination IP addresses. For example, the following rule in Cisco format enables the access to port 100-200 on the host of 192.168.0.2 from any source IP: access-list 110 permit tcp any host 192.168.0.2 range 100 200.

The group number of 110 means this rule applies to the outbound packets; the word "tcp" specifies the network protocol; the word "any" specifies the source IP address; the words of "host 192.168.0.2" specifies the destination IP address, the words of "range 100 200" specifies the port range that is enabled.

Figure 54:
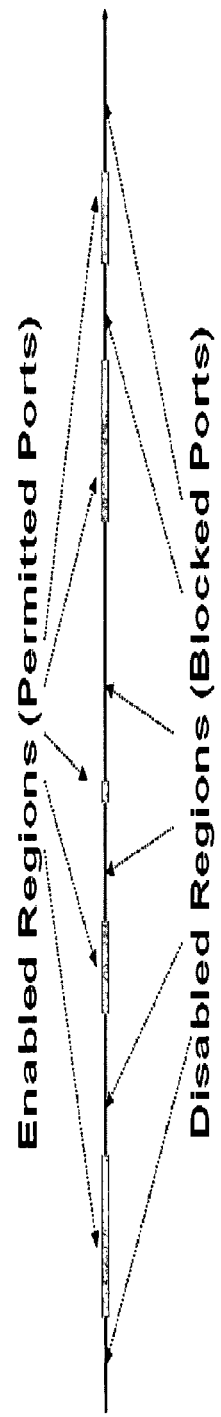
FIG. 54 shows example effects of Firewall Rules.

FIG. 54 shows example effects of Firewall Rules. When a set of Firewall rules are applied to a host, the port control can be visualized as shown in FIG. 54. All access to any port is set to "deny" by default. In another word, a port is accessible from the source to destination if and only if exist one of Firewall rule enables the access to it.

Stakeholder Value Driven Firewall Rule Generation Based on T-MAP

Techniques and systems can be implemented to find the optimal rule set that suppress the maximum of risks while keep the number of rules within acceptable range. For simplicity, Firewall rules are selected so that share the same attributes of protocol (e.g. TCP/UDP), source and dest IP, and the same network interface (e.g. network card) except for the starting and ending port.

Figure 55:
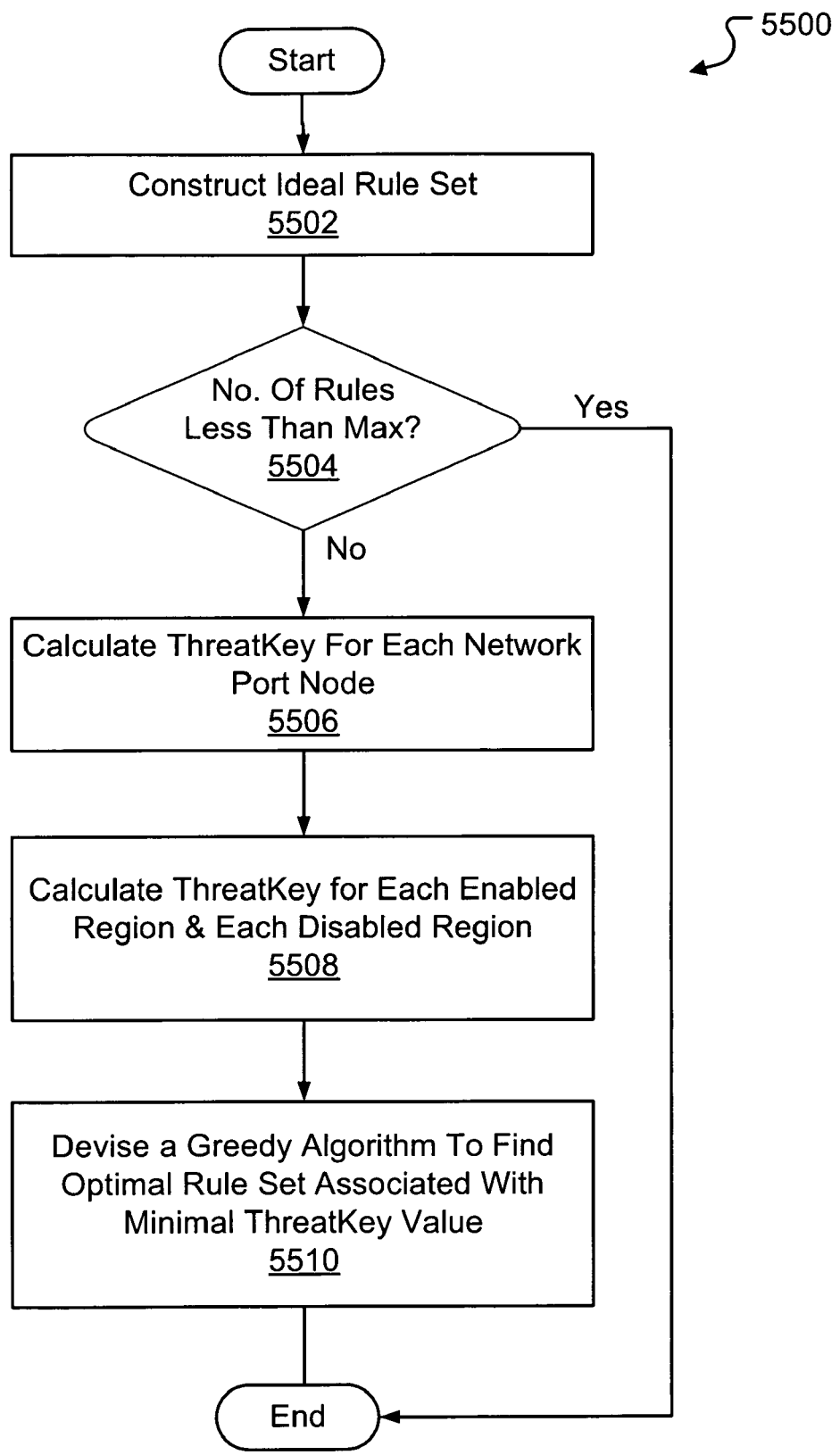
FIG. 55 shows an example process for generating a Firewall rule set.

FIG. 55 shows an example process 5500 for generating a Firewall rule set. When detected that (1) the acceptable max number of Firewall rules is n, and (2) the ports for that need to be enabled for the protected system is known, the desired Firewall rule set that involves minimal ThreatKey value can be derived by implementing the example process of FIG. 55.

An ideal rule set is constructed 5502 that enabled the ports exactly as needed, assuming the rules controlling adjacent ports are merged. When detecting 5504 that the number of rules constructed is less than the acceptable max number of rules, then no more work is needed. When detecting 5504 that the number of rules constructed is not less than acceptable max, for the protected system, go through the T-MAP processes and use a variance of the T-MAP Structured Attack Graph to calculate 5506 the ThreatKey for each network port node.

Figure 56:
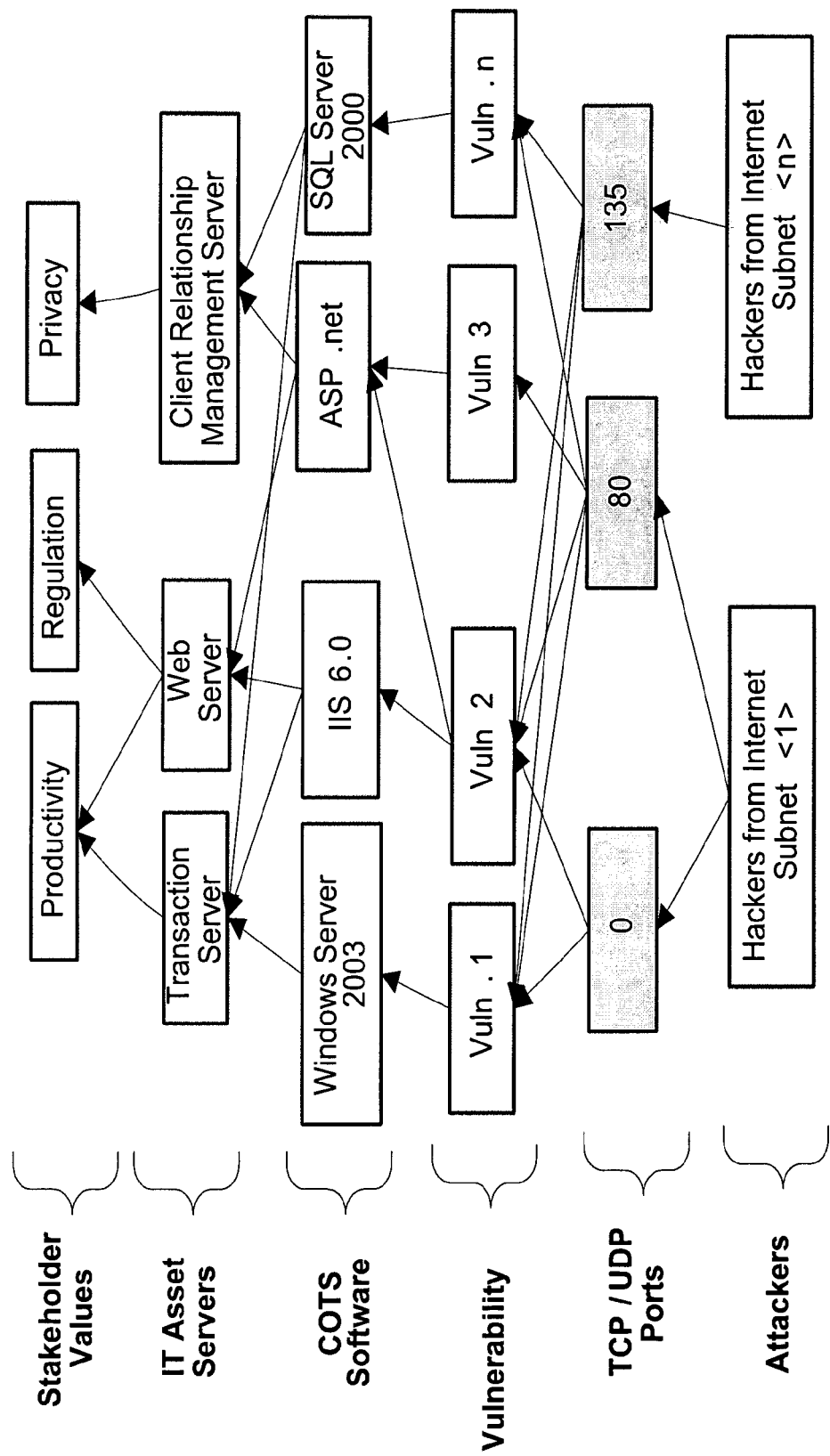
FIG. 56 shows an example structured attack graph with network port information.

FIG. 56 shows an example structured attack graph with network port information. The network ports are inserted into the original T-MAP structured attack graph as an explicit layer to measure the threat associated with each port. When an edge exists between a port node and a vulnerability node, then the edge represents that the vulnerability can be exploited through the associated port. Also, similar to the original ThreatKey definition, define: ThreatKey($Port_i$)=Σ(Weight of Associated Attacking Paths).

Referring back to FIG. 55, the ThreatKey for each "Enabled Region" and each "Disabled Region" are calculated 5506 as illustrated in FIG. 54 for the constructed ideal rule set. Because each Firewall rule usually controls a range of sequential network ports, a series of sequential ports are defined as a Region, marked as $$\text{Region}_{<start,\ end>}$$

where the word "start" stands for the starting port number, and the word "end" stands for the ending port number. Obviously, start and end are integers between 0-65535 and end≧start. So, $$ThreatKey(\text{Region} < start, end >) = \sum_{i=start}^{end} ThreatKey(Port_i)$$

Because the system stakeholder values have been taken into account in the port ThreatKey calculation, the ThreatKey value for Region is inherently sensitive to system stakeholder values as well. Assuming a set of Firewall rules share the same attributes of protocol (e.g. TCP/UDP), source and destination IP, and the same network interface (e.g. network card) except for the starting and ending port, the total threat associated with the rule set is quantified as:

$$ThreatKey(RuleSet) = \sum_{j=1}^{n} ThreatKey(\text{Enabled Region Of } Rule_j)$$

where n is the number of rules in the rule set.

A greedy algorithm can be devised 5510 to find the optimal rule set associated with the minimal ThreatKey value for a given limit on the max number of rules. In the identified 5502 ideal rule set, assume $Rule_x$ enables $\text{Region}<x_{start}, x_{end}>$, and $Rule_y$ enables $\text{Region}<y_{start}, y_{end}>$. Not losing generality, assume $y_{start} \geq x_{end}$. Then, $Rule_x$ and $Rule_y$ are defined as adjacent when (1) all ports in $\text{Region}<x_{end}, y_{start}>$ are blocked; or,
(2) $y_{start} - x_{end} = 1$, representing the case that the controlled regions of the two rules are adjacent to each other.

In addition, in the identified 5502 ideal rule set, assume $Rule_x$ and $Rule_y$ are two adjacent rules. We assume $Rule_x$ enables port $\text{Region}<x_{start}, x_{end}>$, and $Rule_y$ enables port $\text{Region}<y_{start}, y_{end}>$. Not losing generality, assume $y_{start} \geq x_{end}$. Then, merging $Rule_x$ and $Rule_y$ generates a new rule, say $Rule_z$, which enables the $\text{Region}<x_{start}, y_{end}>$.

To summarize, the Greedy Algorithm in FIG. 57 takes the identified 5502 ideal rule set as initial input. Next, the Greedy Algorithm continues to merge the adjacent rules that have the minimal ThreatKey value of the interim blocked region until the number of total rules equals n. FIG. 57 shows an example implementation of the Greedy Algorithm.

Further, a proof is provided to show that at every step during the merging process, the ThreatKey value of the generated rule set, optimalRuleSet, is minimal.
Proof:
Assume there are n rules in the originalIdealRuleSet. Because the originalIdealRuleSet enables exactly the ports that must be opened, by definition, it has the minimal ThreatKey value among all the rule sets that have n rules.

After i times of merges, n−i rules are left in the optimalRuleSet Assume after the i-th merge, the optimalRuleSet has the minimal ThreatKey among all the possible rule sets that have n−i rules.

Next, for the (i+1)-th merge based on Algorithm 5, the optima/RuleSet still has the minimal ThreatKey value among all the possible rule sets that have n-(i+1) rules. The only possibility of removing one rule from the existing n−i rules while still keeping all ports enabled by this rule open is to merge this rule with one of its adjacent rules. Assume $Rule_x$ and $Rule_{x+1}$ are the two adjacent rules that have the least value of ThreatKey of the interim Region. When detecting that there exists another two adjacent rules, say the $Rule_y$ and $Rule_{y+1}$, after merging them, the overall ThreatKey of the rule set will be less than merging $Rule_x$ and $Rule_{x+1}$. In another word, ThreatKey(optimalRuleSet after merging $Rule_y$ and $Rule_{y+1}$) <ThreatKey(optimalRuleSet after merging $Rule_x$ and $Rule_{x+1}$).

Then, based on the ThreatKey definition, after cancelling the ThreatKey values of the shared ports from each side of the above equation, we have: ThreatKey(Interim Region of $Rule_y$ and $Rule_{y+1}$)<ThreatKey(Interim Region of $Rule_x$ and $Rule_{x+1}$), which contradicts the initial assumption that the $Rule_x$ and $Rule_{x+1}$ are the two adjacent rules that have the least value of ThreatKey of the interim Region.

So, for the (i+1)-th merge following the Algorithm 5, the new rule set has the minimal ThreatKey value among all the rule sets that has n-(i+1) rules.
End of Proof.

Implementation Results

Figure 58:
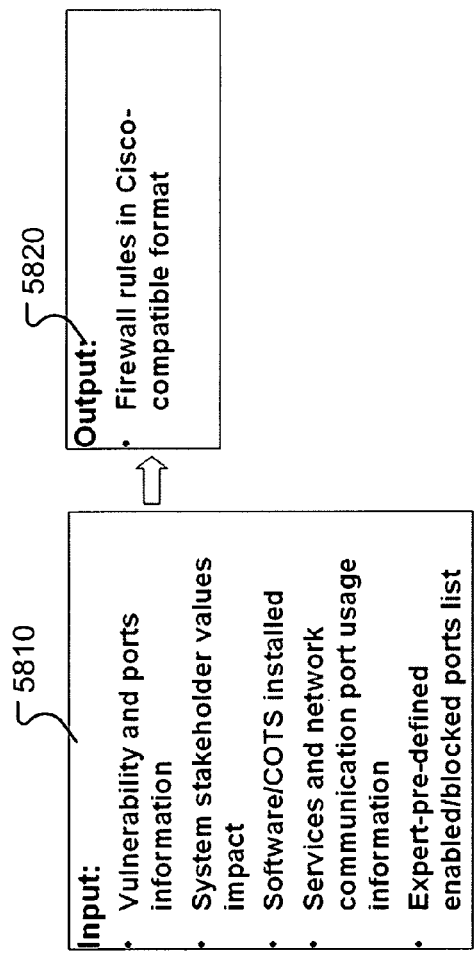
FIG. 58 shows example system inputs and outputs for Firewall rule generation.

As described in this specification, a concept-proof system for the above algorithm can be implemented as part of the T-MAP tool. FIG. 58 shows example system inputs and outputs for Firewall rule generation. For the inputs 5810, the T-MAP tool contains a special database that contains the information of vulnerabilities that can be exploited through network TCP/UDP ports. For example, the special database can include the port information of at least 717 vulnerabilities that were published during 1999-2007.

Figure 59:
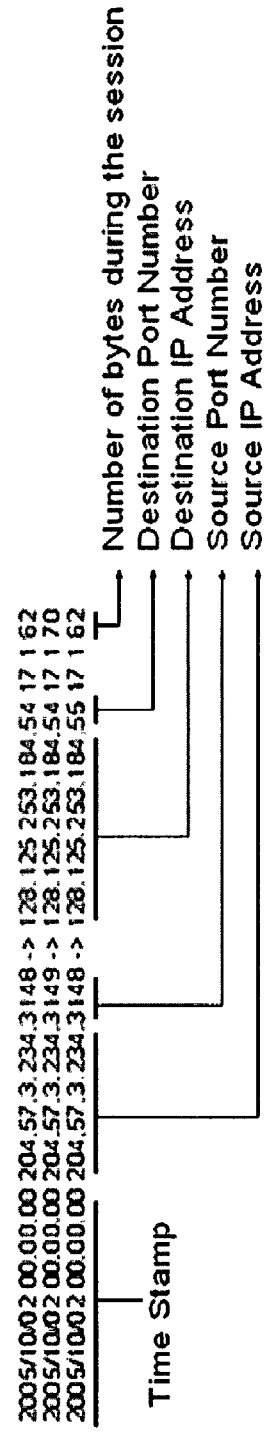
FIG. 59 shows an example of Netflow data that a T-MAP tool can process.

The system stakeholder values and possible impacts from COTS security vulnerabilities can be obtained through above described T-MAP process. The services and network communication ports usage information can be obtained through: (1) information on default port configuration of relevant services and software; (2) system design and deployment documents; and (3) the network data analyzing tools such as Tcpdump and Netflow. FIG. 59 shows an example of the Netflow data that the T-MAP tool can process.

Figure 60:
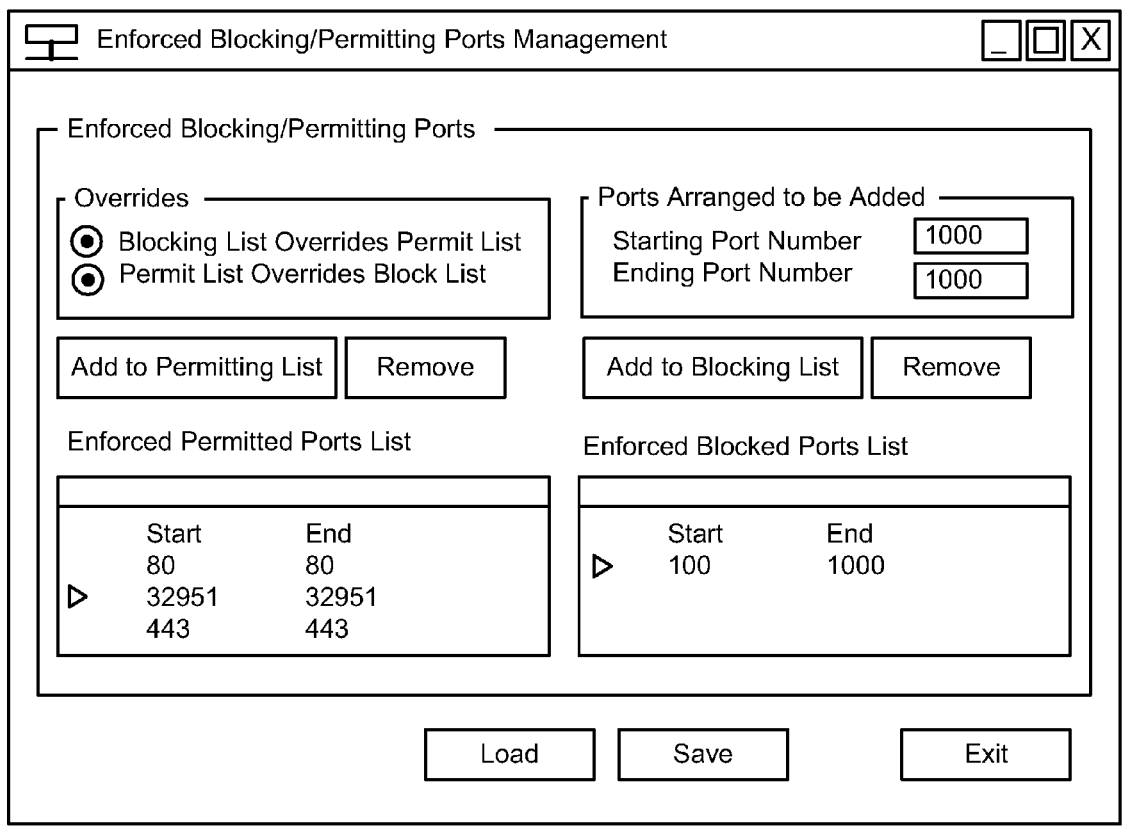
FIG. 60 shows an example user interface screenshot specifying enforced port control.

Also, the T-MAP tool enables security professionals to define the must-enforced enabled/disabled ports. FIG. 60 shows an example user interface screenshot specifying enforced port control.

Figure 61:
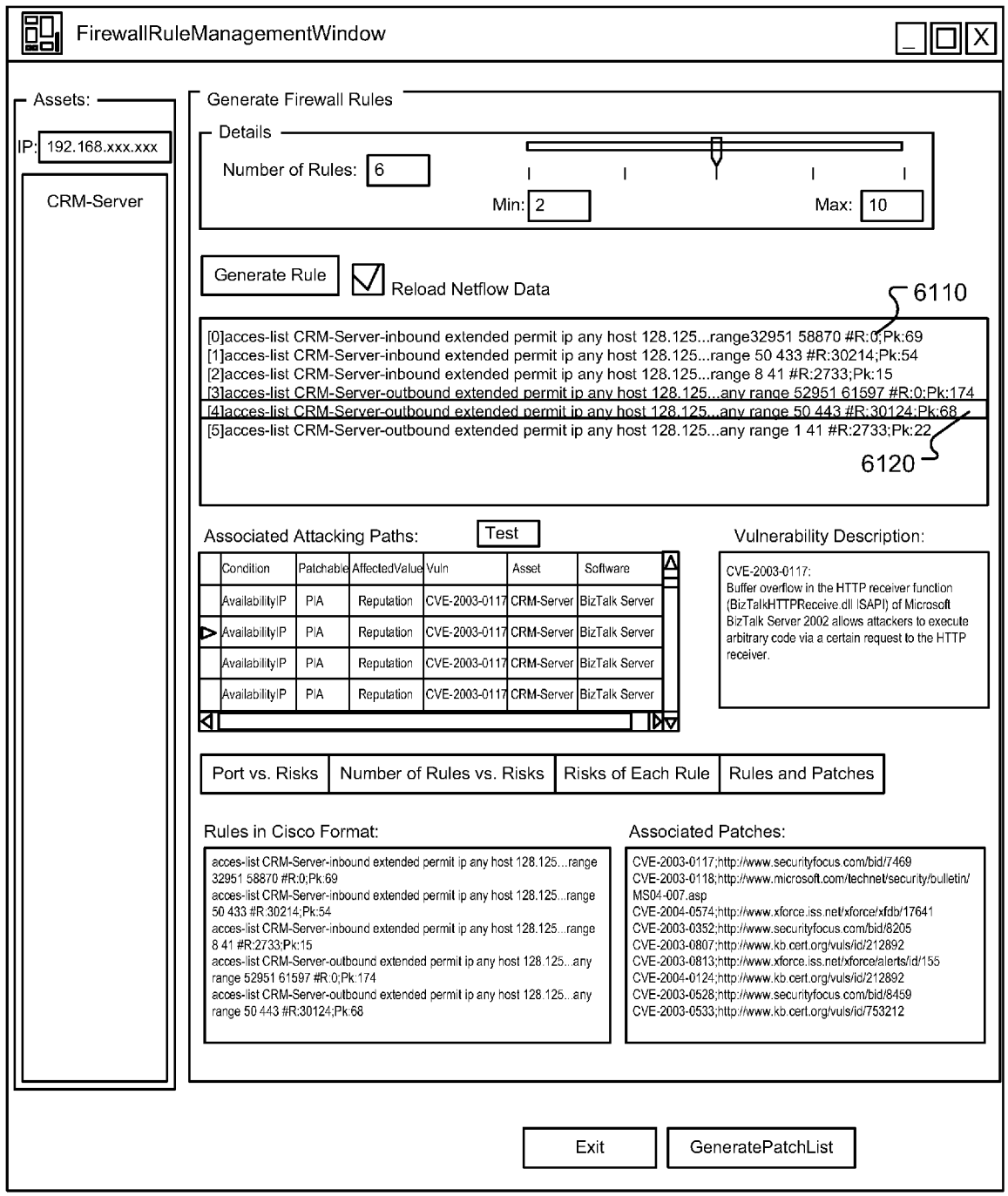
FIG. 61 shows another example screenshot.

In addition, FIG. 61 shows another example screenshot. Based on the pre-defined T-MAP system stakeholder value input, the screenshot of an example output is demonstrated in FIG. 61. The max number of allowed Firewall rules is defined as 6. The generated rule set is listed in the first big textbox 6110 on the top-right portion of the screenshot. As an example, for the highlighted 6120 rule #4, one of the associated vulnerabilities is CVE-2003-0117, a Microsoft BizTalk Server vulnerability that can be exploited through sending a "certain request to the HTTP receiver". Because the default TCP port number of the HTTP service is 80, it is within the port Region that is controlled by the rule #4 which enables the ports between 50 and 443.

Figure 62:
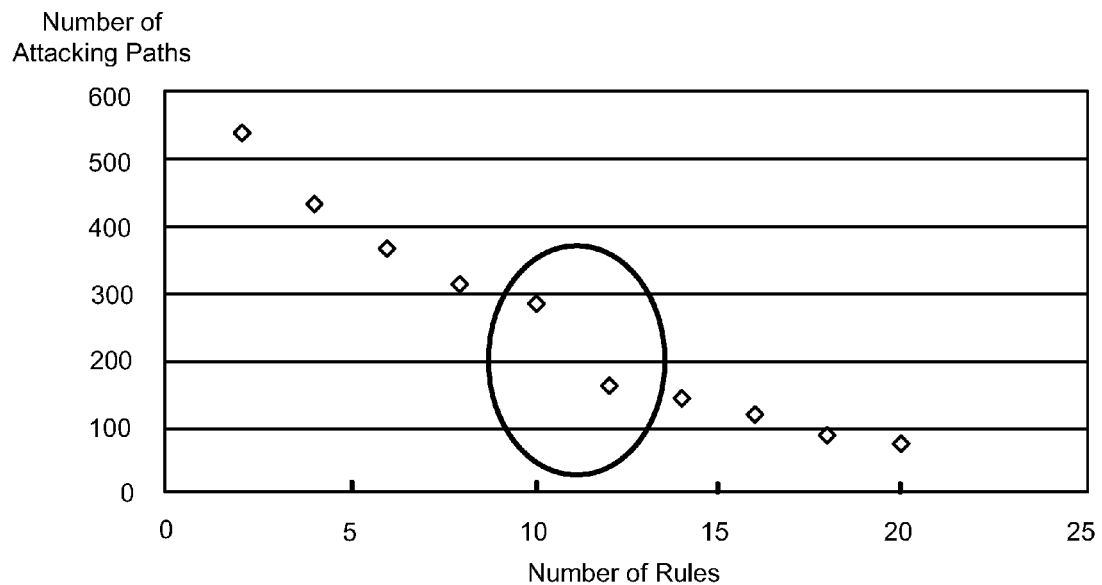
FIG. 62 shows example number of Firewall rules vs. example umber of exploitable attack paths.

FIG. 62 shows example number of Firewall rules vs. example umber of exploitable attack paths. FIG. 62 includes a plot of how a total number of exploitable Attack Paths that are associated with the rule set across all the rules decreases when the maximum number of rules in the rule set increases. This result confirms the notion that as more rules are allowed, better resolution of control can be implemented over the network ports. As lesser of the unused ports are opened because of the rule number limits, system becomes less risky.

The preliminary result also demonstrates a clear economic curve on reducing the number of Attack Paths when the acceptable number of Firewall rules increases: the number of rules hits its high-payoff point after getting increased to a certain level. Afterwards, in the diminishing return region, the number of Attack Paths becomes to decrease slowly.

Also, for the example system, a significant "gap point" is observed on the number of exploitable attack paths at the point where the number of rules increased from 10 to 12. It indicates increasing the number of rules from 10 to 12 is probably worthwhile to consider.

Figure 63:
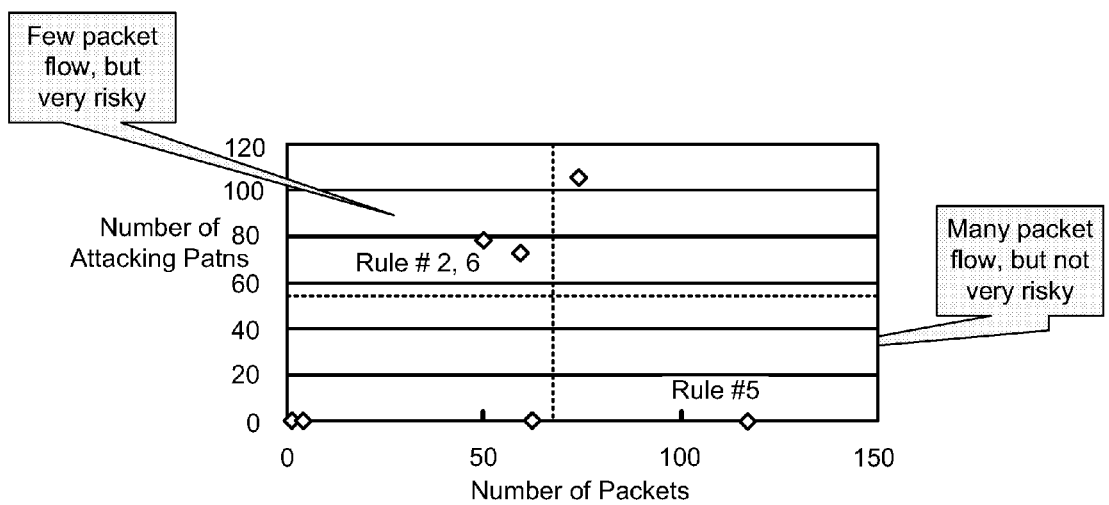
FIG. 63 shows example number of packets vs. number of exploitable attack paths.

Furthermore, based on the number of data packets counting on each port by the Netflow tool, the number of data packets and the number of exploitable attack paths are plotted for each rule. In particular, FIG. 63 shows example number of packets vs. number of exploitable attack paths.

The plots are divided into four regions. Type-1 region shows large number of attack paths as well as large volume of data packets flows. Type-2 region shows large number of attack paths but small volume of data packets flows. Type-3 region shows small number of attack paths but large volume of data packets flows. Type-4 region shows small number of attack paths and small volume of data packets flows.

In general, this information may help security professionals further analyze the Firewall rules. For example, data through the Type 1 rules should be checked further to determine whether the large volume of communications is generated by normal user applications or attacks. When the large volume of communication is generated by users, the system administrator may consider moving the data flow to less risky ports by re-configuring the system, because it can be difficult to detect the malicious data packets from large volume of the user data.

The Type-2 rules may be re-analyzed to determine whether it is really necessary to keep these ports open because these ports are not frequently used but involves high risks to stakeholder values. The Type-3 rules can be the most useful rules because they involves less risks than other types of rules but have frequent user packet flows. The Type-4 rules may be less important because they are less frequently used in network communications, but they are not very risky to open either.

A stakeholder value sensitive approach to generate Firewall rules based on T-MAP has been presented. A greedy algorithm can be devised and proved to generate the Firewall rule set with minimal ThreatKey value for given acceptable max number of rules. A concept-proof tool is developed as part of the T-MAP tool. The screenshots from an example system was presented and explained. The Firewall rule definition can be much more complex when other factors are taken into consideration. For example, the trust to source/desk IP addresses, technical characteristics of network protocols, etc can be also considered.

T-MAP is a stakeholder value centric security threat modeling approach devised in light of a large body of previous works across Value Based Software Engineering, Security Economics, COTS Vulnerability Studies, and Attack Graph. T-MAP defines a formal framework that prioritizes COTS security vulnerabilities under system stakeholder value context, distilling the technical details of thousands of published software vulnerabilities into executive-friendly language at a high-level. Furthermore, T-MAP establishes a quantitative framework to identify the sweet-spot in security investment as well as estimate the effectiveness of common security practices such as Firewall, data encryption, patching, and creating redundant systems. An O(n) algorithm was devised to calculate the associated threat weight (ThreatKey) in Structured Attack Graph, which considerably increased the T-MAP scalability to systems that involve large volume of hosts, software, and vulnerabilities. This scalability is achieved at the tradeoff on limiting the analyses scope to single-step-exploits. A stakeholder value sensitive Firewall rule generation method based on T-MAP was introduced. The output rule set was proven to have the minimal ThreatKey value among all the possible rule sets that have the same number of rules. A software T-MAP tool, such as the T-MAP tool, was developed to automate T-MAP, which significantly reduces the human effort involved in security threat evaluation.

Compared to value-neutral approaches, T-MAP systematically establishes the traceability and consistency from organizational-level value propositions to technical-level security threats and corresponding mitigation strategies. Compared to traditional risk management approaches, T-MAP does not require accurate values of probabilities, frequencies, and size of loss which are very difficult to estimate in practice.

In all the three case studies conducted on real-life systems, T-MAP well captured the stakeholder value priorities through AHP pair-wise comparisons and injected the value priorities in attack path evaluation. The vulnerability rankings generated by T-MAP demonstrated strong correlations with the rankings generated by security professionals manually, with the R square values vary from 0.82 to 0.86. In the total number of 130 pair-wise vulnerability-rank-comparisons across all case studies, the T-MAP achieved an overall inaccuracy of 10%, which is observably lower than other value-neutral approaches: the inaccuracy value of 31.5% by CVSSv2, 30.8% by CVSSv1, 55.4% by IBM ISS, and 58.3% by Microsoft Vulnerability ranks (the Microsoft result is based on one case study that involves 36 pair-wise comparisons). The results show that inaccuracy of T-MAP will not differ from existing value neutral approaches. The case study analyses also found that T-MAP generated the over-estimates and under-estimates mainly because of disabled services, the system privilege that the program were running, and the professionals' confidence on themselves, insiders, and the environment.

Based on the reasonably sound COTS vulnerability prioritization, T-MAP can be used to help to compare security practice alternative plans based on economic analyses in the ITS Server X case study, wherein T-MAP demonstrated significant strength in estimating the effectiveness of security practices: the recommendation generated by T-MAP is consistent with the security manager's experience.

So, we can conclude that at least in these case studies T-MAP well captured the human perceptions on stakeholder values through its method steps, and reflected these value propositions in the automated security threat evaluation. However, since the method and the tool still generate some vulnerability over-estimates and under-estimates, it is still important for security professionals to balance T-MAP recommendations with those based on expert judgment.

While the results presented are specific to the above described three example case studies based on single-host COTS systems, the method demonstrated some perceivable potential even for bigger systems. For example, T-MAP can help: (1) Executives using cost-effectiveness analyses for their security practices and investments; (2) Security administrators identifying key vulnerability based on organizational value preferences; and (3) IT system architects evaluating the security performance of COTS systems.

Examples for Additional Applications

The present specification has presented establishing the T-MAP conceptual framework, the methodology validation, and developing the T-MAP tool. In addition, T-MAP can be extended to support capturing the consensus of more than one security professionals. Using the consensus of a group of security experts' opinions may further reduce the human bias in method validation. Also, T-MAP can be integrated with System Engineering processes and refined from a system engineering perspective. Further, T-MAP can be implemented to improve the vulnerability data collection algorithm to achieve higher data collecting accuracy. Also, the vulnerability database 2930 can continued to grow in the T-MAP tool. Empirical case studies on larger systems can be performed to further validate the T-MAP framework. Further, the Automated Firewall Rule Generation method based on T-MAP can be expanded and matured.

Various terms used in this specification can be defined as follows. Commercial Off The Shelf (COTS) Product describes a product that is: 1) Sold, leased, or licensed to the general public; 2) Offered by a vendor trying to profit from it; 3) Supported and evolved by the vendor, who retains the intellectual property rights; 4) Available in multiple identical copies; 5) Used without source code modification. COTS product can also includes other Off The Shelf software such as open source software, and other possible third party software from which vulnerability information are publicly available. Common vulnerabilities and exposures (CVE) describe a list of standardized names for known vulnerabilities and other information security exposures. An exposure is a state in a computer system (or set of systems) which is not a universal vulnerability, but either: 1) allows an attacker to conduct information gathering activities; 2) allows an attacker to hide activities; 3) includes a capability that behaves as expected, but can be easily compromised; 4) is a primary point of entry that an attacker may attempt to use to gain access to the system or data; 5) is considered a problem according to some reasonable security policy. A universal vulnerability is a state in a computing system (or set of systems) which either 1) allows an attacker to execute commands as another user; 2) allows an attacker to access data that is contrary to the specified access restrictions for that data; 3) allows an attacker to pose as another entity; 4) allows an attacker to conduct a Denial of Service attack. A utility function is primarily used in trying to characterize the nature of a function relating a stakeholder's degree of preference for alternative (often multi-dimensional) outcomes. A value proposition is primarily used as a generic term encompassing both win conditions and utility function. A win condition is primarily used in the context of stakeholders negotiating mutually satisfactory or win-win agreements.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this application.

What is claimed is:

1. A method of analyzing security threats associated with software and computer vulnerabilities, the method comprising:
   identifying, stakeholder values relevant for a software system;
   quantifying the identified stakeholder values using a quantitative decision making approach to prioritize vulnerabilities of the software system;
   generating a structured attack graph that includes the quantified stakeholder values to define a scalable framework to evaluate attack scenarios, wherein the structured attack graph includes five or more nodes and at least five layers with each layer including one or more of the nodes, the at least five layers representing the identified stakeholder values, the software system, software installed on the software system, software vulnerabilities of the software installed on the software system and possible attackers;
   based on the generated structured attack graph, identifying structured attack paths, each of the structured attack paths including at least one node of the five or more nodes and representing a respective attack scenario, wherein each of the structured attack paths is associated with at least one threat relevant attribute rating;
   and calculating, by one or more computer system, a quantitative measure of criticalness of each respective node of the five or more nodes based on the at least one threat relevant attribute rating associated with each structured attack path that includes the respective node.

2. The method of claim 1, comprising calculating a weight of each of the structured attack paths by multiplying the calculated quantitative measure of criticalness corresponding to each node included in the respective structured attack path.

3. The method of claim 2, comprising
   providing a recommendation on a security investment plan including identifying the attack path with the largest weight to be suppressed using a security practice.

4. The method of claim 1, wherein identifying comprises identifying values that cannot be quantified in terms of tangible units.

5. The method of claim 1, wherein quantifying comprises quantifying the identified stakeholder values using a quantitative decision making approach that includes analytical hierarchy process.

6. The method of claim 1, wherein generating the structured attack graph comprises generating a structured attack graph that includes information on one or more communication ports.

7. The method of claim 6, further comprising calculating a quantitative measure of criticalness of each port in terms of security threats.

8. The method of claim 7, further comprising operating a greedy algorithm to calculate an optimal rule set that balances security and efficiency.

9. The method of claim 1, comprising:
   forming two trees from all the structured attack paths that include a given node, one tree below the given node and one tree above the given node; and
   calculating the quantitative measure of criticalness of the given node by recursively calculating a bottom-up-weight contributed by the tree below the given node and a top-down-weight contributed by the tree above the given node.

10. The method of claim 1, comprising:
    identifying one of the five or more nodes as a most vulnerable node based on the calculated quantitative measures of criticalness for the five or more nodes and
    providing a recommendation on a security investment plan that includes suppressing a security threat of the most vulnerable node.

11. A computer program product, embodied on a non-transitory computer-readable medium, operable to cause a data processing apparatus to perform operations comprising:
    identifying stakeholder values relevant for a software system;
    quantifying the identified stakeholder values using a quantitative decision making approach to prioritize vulnerabilities of the software system;
    generating a structured attack graph that includes the quantified stakeholder values to define a scalable framework to evaluate attack scenarios, wherein the structured attack graph includes two or more nodes and information on one or more communication ports;
    calculating a quantitative measure of criticalness of each port in terms of security threats;

based on the generated structured attack graph, identifying structured attack paths, each of the structured attack paths including at least one of the two or more nodes and representing a respective attack scenario, wherein each of the structured attack paths is associated with at least one threat relevant attribute rating; and calculating a quantitative measure of criticalness of each respective node of the two or more nodes based on the at least one threat relevant attribute rating associated with each attack path that includes the respective node.

12. The computer program product of claim 11 further operable to cause a data processing apparatus to perform operations comprising calculating a weight of each of the structured attack paths by multiplying the calculated quantitative measure of criticalness corresponding to each node included in the respective structured attack path.

13. The computer program product of claim 12 further operable to cause a data processing apparatus to perform operations comprising
providing a recommendation on a security investment plan including identifying the attack path with the largest weight to be suppressed using a security practice.

14. The computer program product of claim 11 further operable to cause a data processing apparatus to perform operations comprising identifying values that cannot be quantified in terms of tangible units.

15. The computer program product of claim 11 further operable to cause a data processing apparatus to perform operations comprising generating a structured attack graph that includes two or more layers with each layer including one or more of the nodes.

16. The computer program product of claim 15 further operable to cause a data processing apparatus to perform operations comprising generating the structured attack graph that includes at least five layers that represent the identified stakeholder values, the software system, software installed on the software system, software vulnerabilities of the software installed on the software system and possible attackers.

17. The computer program product of claim 11 further operable to cause a data processing apparatus to perform operations comprising quantifying the identified stakeholder values using a quantitative decision making approach that includes analytical hierarchy process.

18. The computer program product of claim 11 further operable to cause a data processing apparatus to perform operations comprising operating a greedy algorithm to calculate an optimal rule set that balances security and efficiency.

19. The computer program product of claim 11 further operable to cause a data processing apparatus to perform operations comprising:
forming two trees from all the structured attack paths that include a given node, one tree below the given node and one tree above the given node; and
calculating the quantitative measure of criticalness of the given node by recursively calculating a bottom-up-weight contributed by the tree below the given node and a top-down-weight contributed by the tree above the given node.

20. The computer program product of claim 11 further operable to cause a data processing apparatus to perform operations comprising:
identifying one of the two or more nodes as a most vulnerable node based on the calculated quantitative measures of criticalness for the two or more nodes; and
providing a recommendation on a security investment plan that includes suppressing a security threat of the most vulnerable node.

21. A system comprising:
a communication network; and
two or more servers connected to the network to implement a software system and to perform operations which comprise:
identify stakeholder values relevant for the software system implemented in the two or more servers;
quantify the identified stakeholder values using a quantitative decision making approach to prioritize vulnerabilities of the software system;
generate a structured attack graph that includes the quantified stakeholder values to define a scalable framework to evaluate attack scenarios, wherein the structured attack graph includes two or more nodes;
based on the generated structured attack graph, identify structured attack paths, each structured attack path including at least one node of the two or more nodes and representing a respective attack scenario and being associated with at least one attribute, where each attribute includes a rating value; and
calculate a quantitative measure of criticalness of each node of the two or more nodes, where the quantitative measure of criticalness for a given node is based on the rating value of the at least one attribute associated with each attack path that includes the given node.

22. The system as in claim 21, wherein a weight of each of the structured attack paths is calculated by multiplying the calculated quantitative measure of criticalness corresponding to each node included in the respective structured attack path.

23. The system as in claim 22, wherein the two or more servers perform operations which comprise:
providing a recommendation on a security investment plan including identifying the attack path with the largest weight to be suppressed using a security practice.

24. The system as in claim 21, wherein the two or more servers perform operations which comprise:
forming two trees from all the structured attack paths that include a given node, one tree below the given node and one tree above the given node; and
calculating the quantitative measure of criticalness of the given node by recursively calculating a bottom-up-weight contributed by the tree below the given node and a top-down-weight contributed by the tree above the given node.

25. The system as in claim 21, wherein the two or more servers perform operations which comprise:
identifying one of the two or more nodes as a most vulnerable node based on the calculated quantitative measures of criticalness for the two or more nodes; and
providing a recommendation on a security investment plan that includes suppressing a security threat of the most vulnerable node.

* * * * *